United States Patent [19]

Freeny, Jr.

[11] 4,112,421
[45] Sep. 5, 1978

[54] METHOD AND APPARATUS FOR AUTOMATICALLY MONITORING OBJECTS

[75] Inventor: Charles C. Freeny, Jr., Fort Worth, Tex.

[73] Assignee: Information Identification Company, Inc., Ft. Worth, Tex.

[21] Appl. No.: 568,671

[22] Filed: Apr. 16, 1975

[51] Int. Cl.² ............................................. G01S 3/02
[52] U.S. Cl. .................................. 343/112 D; 340/22; 340/346; 325/53; 325/117
[58] Field of Search .................. 340/22, 23, 24, 346; 325/4, 53, 55, 64, 117, 185, 186, 39, 67, 113, 158; 343/112 D

[56] References Cited

U.S. PATENT DOCUMENTS

| | | | |
|---|---|---|---|
| 2,989,625 | 6/1961 | Buffet | 325/186 |
| 3,068,415 | 12/1962 | Johnson | 325/185 |
| 3,310,741 | 3/1967 | Ultermark et al. | 325/158 |
| 3,366,958 | 1/1968 | Seaborn | 343/112 D |
| 3,644,883 | 2/1972 | Borman et al. | 340/23 |
| 3,668,526 | 6/1972 | Raskin | 325/4 |
| 3,697,941 | 10/1972 | Christ | 340/23 |
| 3,714,573 | 1/1973 | Grossman | 325/117 |
| 3,718,899 | 2/1973 | Rollins | 340/23 |
| 3,735,335 | 5/1973 | Kaplan et al. | 340/23 |
| 3,757,290 | 9/1973 | Ross et al. | 325/117 |
| 3,760,349 | 9/1973 | Keister et al. | 325/117 |
| 3,876,980 | 4/1975 | Haemmig et al. | 325/53 |

Primary Examiner—Maynard R. Wilbur
Assistant Examiner—T. M. Blum
Attorney, Agent, or Firm—Dunlap, Codding & McCarthy

[57] ABSTRACT

An improved method and apparatus for automatically monitoring objects, such as vehicles, for example, wherein signpost units are positioned at predetermined locations and each signpost unit transmits a binary signpost code for reception via units installed in the objects being monitored and the objects being monitored receive the signpost codes and store object location information. In one aspect, the present invention contemplates a method and an apparatus which has a multi-mode operation capability wherein the location of the monitored objects is reported when the monitored object enters a different coverage region in an automatic reporting mode, wherein only those monitored objects within a predetermined region or on a predetermined route report to the base station in a region or route reporting mode, and wherein only the locations of predetermined monitored objects are reported to the base station in a polling mode. In another aspect, the present invention contemplates an improved method and an apparatus for locating and operating the signpost units to reduce the total number of signpost units required to cover a given number of locations wherein each signpost unit establishes a uniquely identifiable near-field region and a uniquely identifiable far-field region, the signpost units being located to establish uniquely identifiable overlap regions wherein a portion of the far-field region of at least one of the signpost units overlaps a portion of the far-field region on another signpost unit. The method and apparatus of the present invention also provides a non-polling location technique eliminating the necessity of interrogating the monitored objects at regular intervals and reducing the radio channel time required for reporting object location. Further, the method and apparatus of the present invention contemplates signpost units constructed and operating to intermittently transmit the signpost codes in a manner allowing the use of relatively long life battery type electrical power sources reducing the installation expense, the equipment costs and the maintenance expense.

53 Claims, 14 Drawing Figures

METHOD AND APPARATUS FOR AUTOMATICALLY MONITORING OBJECTS

BACKGROUND OF THE INVENTION

1. Field of the Invention

The present invention generally relates to a method and apparatus for automatically monitoring objects and, more particularly, but not by way of limitation, to an improved automatic monitoring method and apparatus utilizing a direct proximity technique.

2. Brief Description of the Prior Art

In the past, various systems and devices have been proposed for monitoring at a central location the movement, position, location or the like of various objects, such as vehicles, people and the like, for example. With respect to systems and apparatus designed to monitor the location of vehicles, such systems have been referred to in the art generally as "Automatic Vehicle Monitoring" (AVM) systems.

One automatic vehicle monitoring system was disclosed in the U.S. Pat. No. 3,714,573, issued to Grossman. In general, the system disclosed in the Grossman patent utilized a pulse ranging technique and systems of this type are sometimes referred to in the art as "multilateration" since such systems generally require the simultaneous reception and processing of signals from several remote stations. Further, it has been found that systems of this type generally encounter multipath problems and the equipment costs are relatively high since computational equipment is required in addition to the automatic reporting and radio equipment. The Mitre Corporation, "Urban Field Tests of Four Vehicle Location Techniques", Report No. UMTA-VA-06-0012-73-1, April 1973, McLean, Virginia.

One other automatic vehicle monitoring system utilized in the past was generally referred to in the art as a "dead reckoning" type of system. In this type, a relatively small navigation apparatus was located on the vehicle and utilized to report vehicle direction and distance and, in some instances, vehicle acceleration to a central computer. In general, a dead reckoning type of system required communication between the monitored vehicle and the central computer at frequent intervals and periodic updating because errors would continuously accumulate unless reset manually or via some logic network.

The dead reckoning type of system and the pulse ranging type of system also are considered as "fail hard" systems; that is, utilizing either of these systems, the complete system became non-operational when any particular component unit failed or malfunctioned, except the system location reporting link.

On other additional automatic vehicle monitoring system utilized what was sometimes referred to as a "proximity" method or approach. In the systems utilizing the proximity method, an electronic unit was located at predetermined positions along a fixed, known route.

It should be noted that there are generally considered to be two basic types of proximity methods: one being sometimes referred to as "direct proximity"; and the other being sometimes referred to as "inverse proximity". The inverse proximity method utilizes electronic units located at predetermined locations for receiving data from vehicles when the vehicles are positioned within a predetermined distance from the particular electronic units, such a method being disclosed in the U.S. Pat. No. 3,586,161, issued to Paul, for example, the inverse proximity method is particularly suitable for applications requiring a relatively small number of electronic units positioned at fixed locations since relatively inexpensive coding devices can be placed on the objects to be monitored. However, in those applications wherein a relatively large number of objects are to be monitored, the inverse proximity method has been found to be relatively costly and, in most instances, systems employing the inverse proximity method are considered to be capacity limited since all of the monitored vehicle data must be communicated via a common data link. The direct proximity method is not considered to be capacity limited in a manner just mentioned in connection with the inverse proximity method. Applications employing the direct proximity method generally utilize an electronic unit located at predetermined positions and a relatively large number of monitored objects utilize the same electronic units, examples of systems employing the direct proximity method being disclosed in the U.S. Pat. Nos. 3,644,883 and 3,718,899, issued to Rollins, and the U.S. Pat. No. 3,757,290, issued to Ross, for example.

In the past, most applications employing the direct proximity method have been constructed to operate in relatively high frequency ranges, such as greater than one hundred (100) MHz, for example, which limited the area covered by each electronic unit positioned at the predetermined locations in order to provide acceptable resolution, such systems also utilizing equipment requiring relatively large amounts of electrical power for operating the electronic units positioned at predetermined locations which necessitated permanent electrical connections. Systems employing the direct proximity method have generally required the polling of the monitored objects or vehicles resulting in either the utilization of a relatively expensive and complicated timer in the monitored objects or in the central computer apparatus or, in some applications, in both the monitored objects and the central computer apparatus, or resulting in the utilization of a relatively fast polling rate. Further, systems employing the direct proximity method have generally required a dedicated radio channel, thereby increasing the system costs.

Various types of automatic vehicle monitoring systems have been described in the following publications: M. L. Reiss, et al., "Feasibility Study, Automatic Vehicle Identification System", June 1969, PB 185 387, NTIS, U.S. Department of Commerce, Springfield, Virginia. Martin Lukes, Raymond Shea, "Monitor-CTA", May 1973, Final Report, UMTA, Department of Transportation, Washington, D.C. Dr. Richard C. Larson, "Urban Police Patrol Analysis", 1972, Massachusetts Institute of Technology. R. Buck, et al., "Analysis and Comparison of Some Automatic Vehicle Monitoring Systems", July 1973 Interim Report, Department of Transportation, Washington, D.C. Raymond L. McLean, "Vehicle Location and Status Reporting System (LOCATES)", Report No. APD TECH-72-101, Phase I Final Report, 1972, City of Montclair Police Dept., Montclair, California. Stephen Riter, "Proceedings of a Conference on Automatic Vehicle Monitoring", Report No. 731, 1973, Texas A & M University, College Station, Texas.

BRIEF DESCRIPTION OF THE PREFERRED EMBODIMENT

Figure 1:
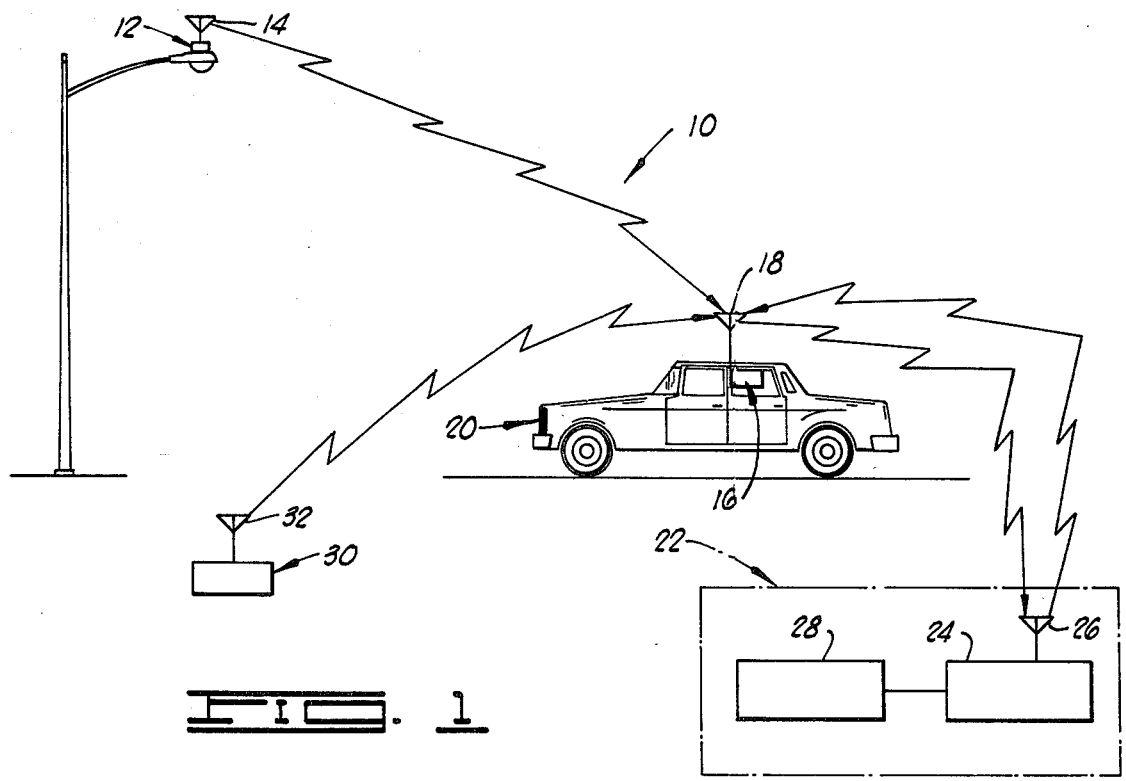
FIG. 1 is a diagrammatic, schematic view showing one preferred embodiment of the automatic vehicle monitoring apparatus of the present invention, only one signpost unit, one vehicle unit and one hand unit being shown in FIG. 1 along with the base station for clarity.

One operational embodiment of the automatic vehicle monitoring method and apparatus of the present invention is diagrammatically shown in FIG. 1 and designated therein via the general reference numeral 10. In general, the automatic vehicle monitoring apparatus 10 includes: a plurality of signpost units 12, each signpost unit 12 being located in accordance with a predetermined unique signpost configuration to be described in greater detail below and having a signpost antenna 14 connected thereto; a plurality of vehicle units 16, each vehicle unit 16 having a vehicle antenna 18 (in a preferred embodiment, the apparatus of the present invention is constructed to be interfaced on a non-interfering basis with an existing two-way radio which is normally utilized for voice communication and the antenna utilized in conjunction with the existing two-way radio is also utilized in conjunction with the apparatus of the present invention) and being located in one of the vehicles monitored via the automatic vehicle monitoring apparatus 10 (one vehicle being shown in FIG. 1, for example, and designated therein via the general reference numeral 20); and a base station 22 having a base station receiver-transmitter 24 with a base station antenna 26 connected thereto, the base station receiver-transmitter 24 being connected to a central processor unit 28 (the base station 22 is constructed to transmit, receive, encode and decode binary coded data and is constructed to be interfaced with existing two-way radio equipment, the display being a sophisticated computer controlled type of display or simply a teleprinter display controller or the like, for example). In one preferred form, the automatic vehicle monitoring apparatus 10 also includes a hand unit 30 having a hand unit antenna 32 connected thereto.

In one preferred embodiment, the automatic vehicle monitoring method and apparatus of the present invention are constructed to be operated in multiple reporting modes, including: an automatic reporting mode wherein the vehicle units 16 transmit a signal for reception by the base station 22 reporting the location of each vehicle unit 16 when the vehicle unit 16 enters a new or different coverage region; a region or route reporting mode wherein only those vehicle units 16 in a predetermined region or on a predetermined route transmit signals reporting locations for reception by the base station 22; and a vehicle polling mode wherein only the locations of predetermined vehicle units 16 are reported via signals transmitted for reception via the base station 22. Further, in one preferred embodiment, the apparatus of the present invention is constructed such that the vehicle units 16 can be automatically positioned in one of the reporting modes, in a manner to be described in greater detail with respect to the vehicle units shown in FIGS. 9 and 11.

Figure 2:
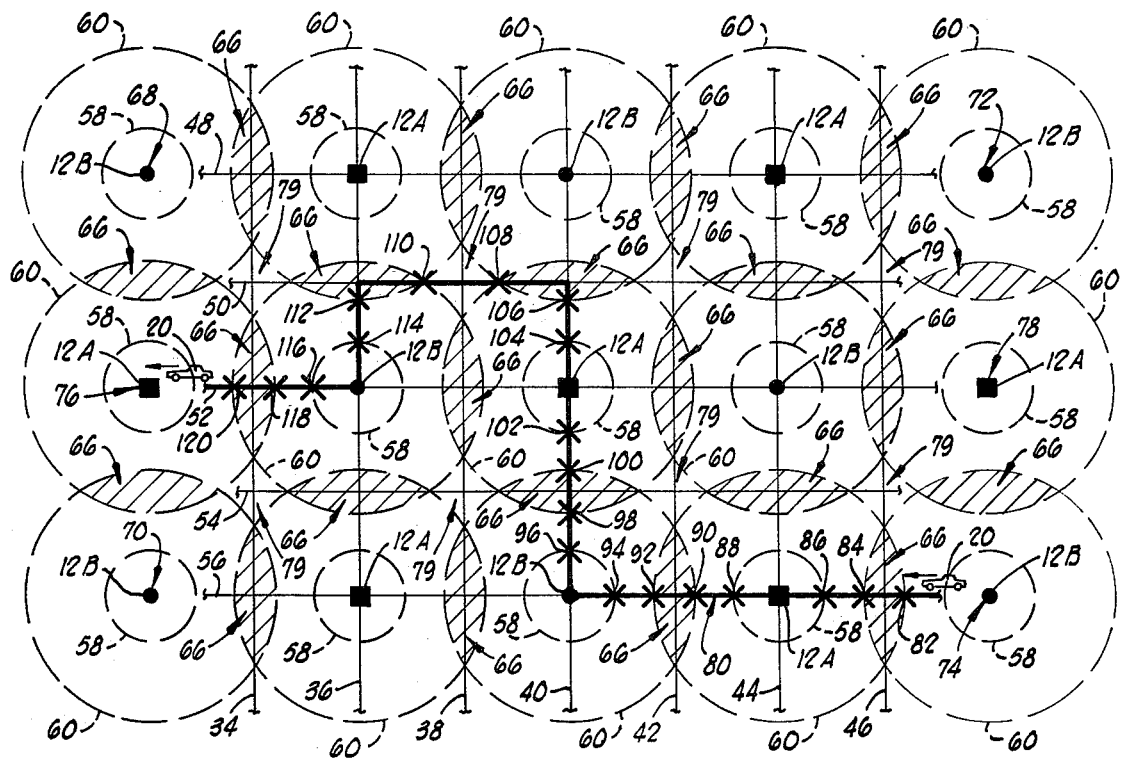
FIG. 2 is a diagrammatic, schematic view showing one preferred embodiment of the unique signpost configuration of the present invention with respect to one particular roadway configuration diagrammatically shown in FIG. 2.
Figure 3:
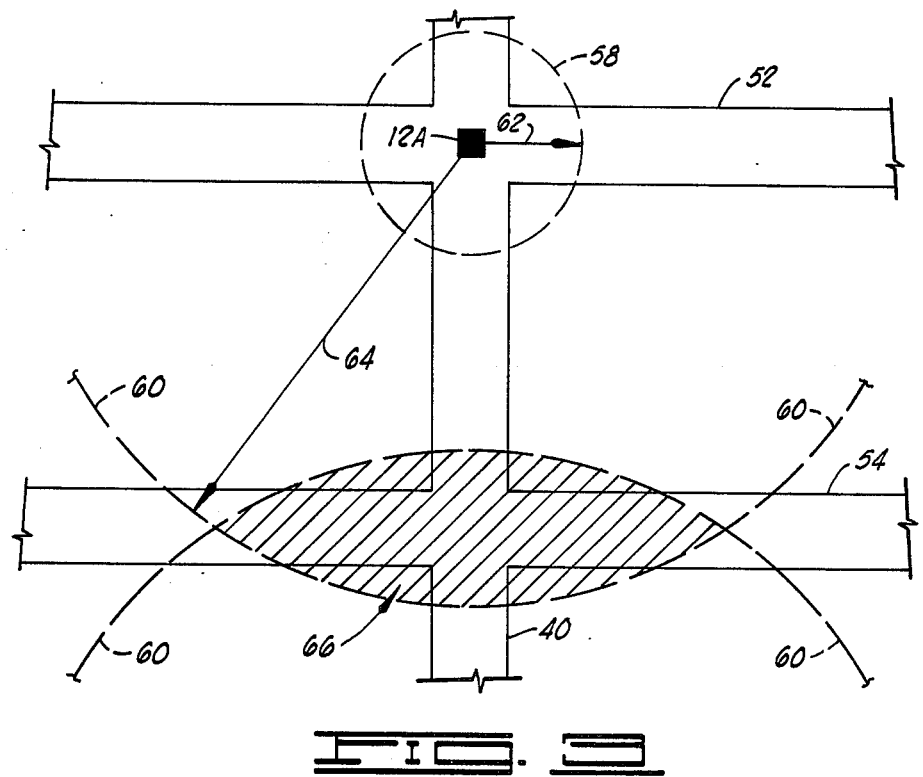
FIG. 3 is an enlarged view of a portion of the roadway configuration shown in FIG. 2.

One preferred embodiment of the unique signpost configuration of the present invention is illustrated in FIGS. 2 and 3 with respect to one street or roadway orientation, including: a plurality of roadways 34, 36, 38, 40, 42, 44 and 46 extending in one direction, and a plurality of roadways 48, 50, 52, 54 and 56 extending in another direction generally perpendicular to the roadways 34 through 46 and intersecting the roadways 34 through 46 forming intersections identified herein via the reference numerals associated with and identifying the particular roadways forming the particular intersection, i.e. the intersection 54–36 identifies the intersection formed at the location where the roadway 54 intersects or crosses the roadway 36, for example. It should be particularly noted that the roadway orientation illustrated in FIG. 2 is utilized herein only by way of example and for the purpose of illustrating and clearly describing the method and the apparatus of the present invention, particularly with respect to the unique signpost configuration of the present, and the method and apparatus, including the signpost configuration, are not limited to the roadway orientation shown in FIG. 2. It should also be noted that, although the method and apparatus of the present invention are particularly described herein with respect to the monitoring of vehicles, the method and apparatus are not limited to monitoring vehicles; rather, the present invention can be utilized to monitor the location and movement of any object, including human beings. Therefore, it is to be specifically understood that the term "vehicle" as used herein, either alone or in conjunction with some particular component or assembly, is not to be construed as limiting the present invention in any way to any particular type of object, the term "vehicle" being utilized solely for clarity and identification purposes in describing the method and the apparatus of the present invention.

Each signpost unit 12 has an "on" condition and an "off" condition and, in the "on" condition, each signpost unit 12 generates and produces a signal having a predetermined time division binary signpost code repetitively encoded therein, each signpost code uniquely identifying one particular, predetermined signpost unit 12, thereby uniquely identifying the location of the particular signpost unit 12 identified via the signpost code. Each signpost unit 12 is automatically positioned in the "on" condition for a predetermined period of time and in the "off" condition for a predetermined period of time, the ratio of the time the signpost unit 12 is in the "on" condition to the time the signpost unit 12 is in the "off" condition being referred to herein as the signpost unit "duty cycle". The signpost units 12 each are constructed to have a constant, fixed duty cycle although the signpost units 12 are positioned in the "on" condition for different periods of time, in a manner and for reasons to be described in greater detail below.

In one preferred operational embodiment, some of the signpost units 12 transmit the signpost code intermittently at a first predetermined pulse repetition frequency (sometimes referred to herein via the symbol "PRF$_1$"), and the remaining signpost units 12 each transmit the signpost code intermittently at a second predetermined pulse repetition frequency (sometimes referred to herein via the symbol "PRF$_2$"). For the purpose of clarity of description, the signpost units transmitting the signpost codes at the first pulse repetition frequency (PRF$_1$) are designated in FIGS. 2, 3 and 5 via the reference numeral 12A and the location of the signpost units 12A is identified via a square symbol, and the signpost units transmitting the signpost codes at the second pulse repetition frequency (PRF$_2$) are designated in FIGS. 2, 3 and 5 via the general reference numeral 12B and the location of the signpost units 12B is identified via a circle symbol.

Figure 4:
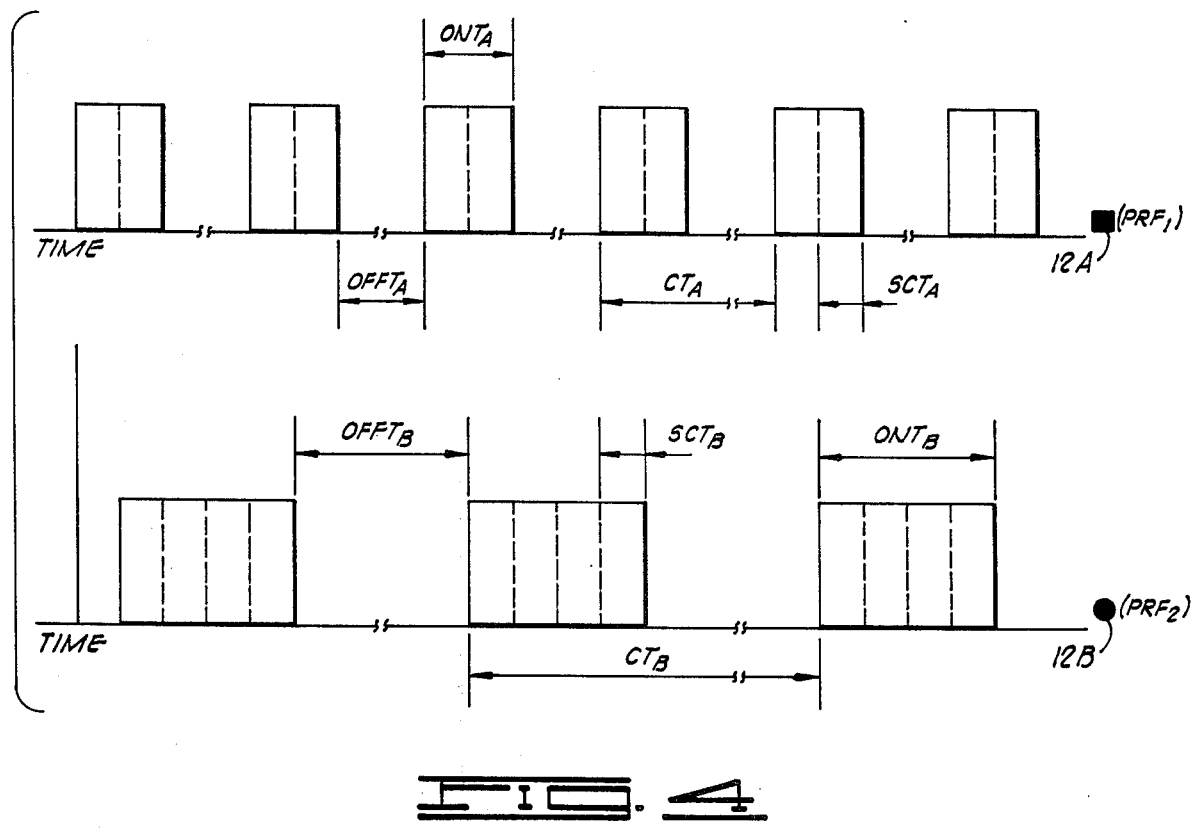
FIG. 4 is a timing diagram illustrating the relationship between the pulse repetition frequencies and the duty cycles of the signpost units of the present invention.

Timing diagrams are shown in FIG. 4 for the purpose of clearly describing and illustrating the relationship between the pulse repetition frequencies (PRF$_1$ and PRF$_2$) and the duty cycles of the signpost units 12A and 12B contemplated via the method and the apparatus of the present invention. As shown in FIG. 4, the signpost units 12A are positioned in the "off" condition for a predetermined period of time (OFFT$_A$) and in the "on" condition for a predetermined period of time (ONT$_A$). In the "on" condition, the signpost units 12A each transmit the signpost code 2 times, the period of time required for each of the signpost units 12A to transmit the entire signpost code 1 single time being designated in FIG. 4 via the reference (SCT$_A$). Further, each of the signpost units 12A have a predetermined cycle period of time (CT$_A$), the cycle period of time (CT$_A$) representing the sum of the period of time (OFFT$_A$) and the period of time (ONT$_A$), as diagrammatically shown in FIG. 4.

As shown in FIG. 4, the signpost units 12B are positioned in the "off" condition for a predetermined period of time (OFFT$_B$) and in the "on" condition for a predetermined period of time (ONT$_B$). In the "on" condition, the signpost units 12B each transmit the signpost code 4 times, the period of time required for each of the signpost units 12B to transmit the entire signpost code 1 single time being designated in FIG. 4 via the reference (SCT$_B$). Further, each of the signpost units 12B have a predetermined cycle period of time (CT$_B$), the cycle period of time (CT$_B$) representing the sum of the period of time (OFFT$_B$) and the period of time (ONT$_B$), as diagrammatically shown in FIG. 4.

The signpost units 12A and 12B are designed such that the period of time (ONT$_A$) during which the signpost units 12A are positioned in the "on" condition is not equal to or the same as the period of time (ONT$_B$) during which the signpost units 12B are positioned in the "on" condition. This design criteria can be expressed as follows:

$$ONT_A \neq ONT_B \qquad (1)$$

The signpost units 12A and 12B are designed such that the cycle period of time (CT$_A$) of the signpost units 12A is not equal to or the same as the cycle period of time (CT$_B$) of the signpost units 12B, and such that the cycle period of time (CT$_B$) of the signpost units 12B is greater than the cycle period of time (CT$_A$) of the signpost units 12B. These design criteria can be expressed as follows:

$$CT_A \neq CT_B \qquad (2)$$
$$CT_B > CT_A \qquad (3)$$

Further, the signpost units 12A and 12B are designed such that the duty cycles of the signpost units 12A and 12B are equal. The duty cycles of the signpost units 12A and 12B and the last-mentioned design criteria can be expressed as follows:

$$\frac{ONT_A}{CT_A} = \frac{ONT_B}{CT_B} = \text{Duty Cycle} \qquad (4)$$

Since the cycle period of time (CT$_B$) of the signpost units 12B is less than the cycle period of time (CT$_A$) of the signpost units 12A, the pulse repetition frequency (PRF$_2$) of the signpost units 12B is slower than the pulse repetition frequency (PRF$_1$) of the signpost units 12A. As shown in FIG. 4 and as generally referred to before, the signpost units 12B having the slowest pulse repetition frequency (PRF$_2$) are also constructed to repeatedly transmit the signpost code more times during the period of time (ONT$_A$) that the signpost units 12B are in the "on" condition as compared to the number of times the signpost code is repeatedly transmitted during the period of time (ONT$_B$) that the signpost units 12A are in the "on" condition. Thus, the signpost units 12A and 12B are constructed such that the ratio of the cycle period of time (CT$_A$) of the signpost units 12A to the cycle period of time (CT$_B$) of the signpost units 12B is greater than or equal to the period of time required to transmit one complete signpost code, and the period of time (SCT$_A$) required to transmit one complete signpost code via the signpost units 12A is equal to the period of time (SCT$_B$) required to transmit one complete signpost code via the signpost units 12B, these last-mentioned design criteria being expressed as follows:

$$(CT_A)/(CT_B) \geq SCT_A \text{ or } SCT_B \qquad (5)$$

$$SCT_A = SCT_B \qquad (6)$$

The signpost units 12A and 12B are each constructed to transmit signals encoded with the signpost codes in the high frequency range (27 MHz, for example) to produce a radiation pattern establishing a steep radiation field gradient between the near-field region and the far-field region, i.e. the strength of the signal expressed in terms of "db" produced via the signpost units 12A and 12B is recognizably higher within the near-field region and, by the same token, recognizably lower within the far-field region, the strength of the signal transmitted via the signpost units 12A and 12B changes relatively sharply and significantly between the far-field region and the near-field region. The near-field region of the signpost units 12 is diagrammatically represented in FIGS. 2, 3, 4, 5 and 6 via the dashed-line circle designated via the general reference numeral 58. The far-field region of the signpost units 12 is diagrammatically represented in FIGS. 2, 3, 4, 5 and 6 via the dashed-line circle designated via the general reference numeral 60. By designing the signpost units 12A and 12B for transmitting signals in the high frequency range to produce a steep field gradient, definite and identifiable regions are established extending circumferentially about each of the signpost units 12 at substantially predetermined radial distances within relatively close tolerance for the purpose of monitoring vehicles, i.e. a near-field region within the dashed-line circle 58 extending a radial distance 62 (50 feet to 100 feet in one operational embodiment, for example) from the transmitting signpost unit 12 where the strength of the transmitted signal is greater than a predetermined minimum signal strength or power level, and a far-field region within the dashed-line circle 60 extending a radial distance 64 (300 feet to 400 feet in one operational embodiment, for example) from the transmitting signpost unit 12 and outside the dashed-line circle 58 or, in other words, within the area between the dashed-line circles 58 and 60 where the strength or power level of the transmitted signal is recognizably less than the strength or power level of the transmitted signal within the near-field region 58 and greater than a predetermined minimum signal strength or power level. The design of high frequency transmitting units to produce a steep radiation field gradient between a near-field region and a far-field region is well-known in the art of electromagnetic radiation and a further detailed description of such phenomena is not required herein.

The dual range detection established via the near-field region and the far-field region of each of the signpost units 12 allows the vehicle units 16 to be constructed to identifiably distinguish between signals received within the near-field region and signals received within the far-field region via the strength or power level of the received signal. The vehicle units 16 are also constructed to detect a change in the signal strength level, thereby providing an indication that the particular vehicle unit 16 has moved drom the far-field region into the near-field region when the received signal strength level changes from a relatively strong signal having a signal strength level exceeding a predetermined minimum signal strength level to a relatively weak signal having a signal strength level less than a predetermined maximum signal strength level, and providing an indication that the particular vehicle unit 16 has moved from the near-field region into the far-field region when the received signal strength level changes from a relatively weak signal having a signal strength level less than the predetermined maximum signal strength level to a relatively strong signal having a signal strength level exceeding a predetermined minimum signal strength level.

Figure 5:
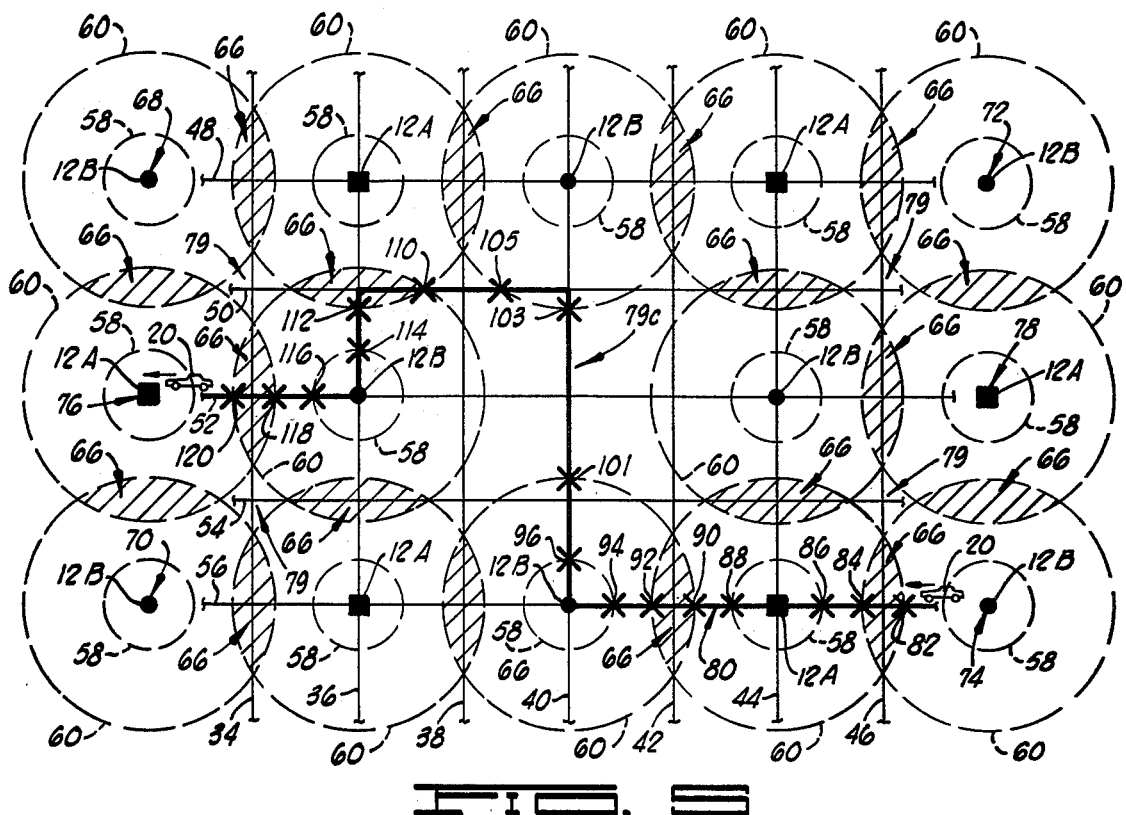
FIG. 5 is a diagrammatic, schematic view showing a roadway configuration exactly like the roadway configuration shown in FIG. 2; but, showing a modified signpost configuration and illustrating one operational aspect of the signpost configuration shown in FIG. 2.

In addition to the dual range detection aspect of the present invention, the signpost units 12A and 12B are positioned at predetermined locations to establish overlap regions encompassing predetermined locations where a portion of the far-field region 60 of a signpost unit 12A overlaps or is superimposed over a portion of the far-field region 60 of a signpost unit 12B, the overlap regions being shown in FIGS. 2, 3 and 5, represented by shaded areas and designated via the general reference numeral 66. Thus, in the overlap regions 66, a relatively weak signal having a signpost code encoded therein uniquely identifying one of the signpost units 12A and having a signal strength less than a predetermined maximum signal strength level indicating the signal is received within the far-field region of the signpost unit 12A transmitting the received signal, and a relatively weak signal, having a signpost code encoded therein uniquely identifying one of the signpost units 12B and having a signal strength less than a predetermined maximum signal strength level indicating the signal is received within the far-field region of the signpost unit 12B transmitting the received signal, are each present and receivable via vehicle units 16 located within any one of the overlap regions 66. Further, since the cycle period of time ($CT_A$) is less than and not equal to the cycle period of time ($CT_B$) and since the pulse repetition frequency ($PRF_2$) is slower or less than the pulse repetition frequency ($PRF_1$) and since the signpost units 12B having the slower pulse repetition frequency ($PRF_2$) transmit the signpost code more times during the period of time ($ONT_B$) is compared to the number of times the signpost units 12A transmit the signpost code during the period of time ($ONT_A$), a vehicle 16 will alternatingly receive signpost codes from the signpost units 12A and 12B while positioned or located within one of the overlap regions 66, the alternating signpost codes received by the vehicle unit 16 from the signpost units 12A and 12B being utilized to indicate and identify that the vehicle unit 16 receiving the alternating signpost codes is located within one of the overlap regions 66 and the particular alternatingly received signpost codes uniquely identifying the one specific overlap region 66. The development of uniquely identifiable overlap regions 66 eliminates the necessity of locating a signpost unit at the particular locations identified via an overlap region 66 and thus significantly reduces the cost of hardward, i.e. the number of signpost units, to provide a given location resolution within a particular area, this technique also reducing the time and cost for maintaining the automatic vehicle monitoring apparatus 10 as compared to systems requiring additional signpost units in lieu of the overlap regions 66 of the present invention.

The signpost units 12A and 12B are positioned such that each signpost unit 12A and 12B is positioned at one predetermined location and the signpost units 12A and 12B are spaced and located such that the overlap regions 66 are each formed via a portion of the far-field region 60 of one of the signpost units 12A overlapping a portion of the far-field region 60 of one of the signpost units 12B. Referring more particularly to the roadway configuration shown in FIG. 2 and in accordance with the unique signpost configuration of the present invention, the signpost units 12A are located at the intersections 48-36, 56-36, 52-40, 48-44 and 56-44, and the signpost units 12B are located at the intersections 52-36, 48-40, 56-40 and 52-44. In addition to the signpost units 12A and 12B located at specific intersections within the roadway configuration shown in FIG. 2, signpost units 12B are located at positions designated in FIG. 2 via the general references 68, 70, 72 and 74, and signpost units 12A are located at positions designated in FIG. 2 via the general references 76 and 78, these last-mentioned signpost units 12A and 12B being shown in FIG. 2 for the purpose of completeness since the far-field regions 60 of these last-mentioned signpost units 12A and 12B cooperate with some of the signpost units 12A and 12B located at particular designated intersections within the roadway configuration of FIG. 2 to form the overlap regions 66 encompassing and overlapping the intersections 48-34, 52-34, 56-34, 48-46, 52-46 and 56-46. The signpost units 12A and 12B ar each located and constructed such that the signpost configuration forms the three coverage regions, i.e. the overlap regions 66, the near-field regions 58, and the far-field regions 60, and the intersections of the roadway configuration shown in FIG. 2 are identified with respect to the signpost units 12A and 12B and the three coverage regions 66, 58 and 60, including open regions (designated in the drawings via the general reference numeral 79) formed at predetermined intersections within the roadway configuration, as indicated in the following "TABLE I".

TABLE I

| Intersections: 48-34; 52-34; 56-34; 50-36; 54-36; 48-38; 52-38; 56-38; 50-40; 54-40; 48-42; 52-42; 56-42; 50-44; 54-44; 48-46; 52-46; and 56-46; | Identified via an overlap region 66 formed by the overlapping portions of the far-field regions 60 of one of the signpost units 12A and one of the signpost units 12B. |
|---|---|
| Intersections: 50-34; 54-34; 50-38; 54-38; 50-42; 54-42; 50-46; and 54-46. | Identified via an open region 79 where a signpost unit 12A or 12 B is not positioned and where the location is neither encompassed via a near-field region 58, nor a far-field region 60, nor an overlap region 66. |
| Intersections: 48-36; 56-36; 52-40; 48-44; and 56-44. | Identified via the near-field region 58 of one of the signpost units 12A located at the particular intersections. |
| Intersections: 52-36; 48-40; 56-40; and 52-44. | Identified via the near-field region 58 of one of the signpost units 12B located at the particular intersections. |

It is particularly significant to note that a signpost unit 12 is not located at each of the intersections within the roadway configuration shown in FIG. 2; yet, each intersection is uniquely identifiable via the unique signpost configuration of the present invention since each intersection is within one of the coverage regions 58, 60 or 66 or within one of the open regions 79, each of the open regions 79 being located such that a vehicle unit 16 cannot enter or leave any one of the open regions 79 without passing through one of the coverage regions 58, 60 or 66. When a vehicle unit 16 is positioned within the near-field region 58 of one of the signpost units 12A or 12B, the position or location of the vehicle unit 16 is identifiable via the strength or power level of the signal and the unique signpost code encoded in the signal transmitted via the signpost unit 12A or 12B and received via the vehicle unit 16. When a vehicle unit 16 is positioned within the far-field region 60 of one of the signpost units 12A or 12B, the position or location of the vehicle unit 16 is identifiable via the strength or power level of the signal and the unique signpost code encoded in the signal transmitted via the signpost unit 12A or 12B and received via the vehicle unit 16. When the vehicle unit 16 is positioned within one of the overlap regions 66, the position or location of the vehicle unit 16 is identifiable via the lower power level or magnitude of the transmitted signals encoded with the signpost codes and the condition of receiving two signals each encoded with a different, distinct signpost code (one signpost code being encoded in the signal transmitted from a signpost unit 12A and one signpost code being encoded in the signal transmitted from one of the signpost units 12B), the vehicle unit 16 alternatingly receiving the two signpost codes transmitted via the signpost units 12A and 12B.

The location of the vehicle units 16 (each associated with a particular monitored object or vehicle) is reported on a non-polling basis in the automatic reporting mode, i.e. the location of any one particular vehicle unit 16 is reported only when the vehicle carrying the vehicle unit 16 enters or leaves one of the coverage regions 58, 60 and 66, in contrast to a polling type of system wherein the monitored objects or vehicles are each polled at regular intervals to determine the position of the monitored vehicles, the vehicle units 16 having a polling mode of operation wherein the location of particular monitored vehicles is reported to the base station 22. Further, in one preferred embodiment to be described in greater detail below, the entering and departing of any one of the monitored vehicles carrying the vehicle unit 16 is reported utilizing a radio unit usually installed in vehicles for the purpose of voice communication and only when the radio unit is not being utilized for the normal voice communication, i.e. the method and apparatus of the present invention are particularly adapted to be utilized with an existing radio unit normally utilized for voice communication in a manner such that the transmission of data is accomplished without interfering with normal voice communication. Thus, in one preferred form, the vehicle antenna 18, more particularly, is the vehicle radio antenna which is normally utilized in conjunction with the existing radio unit for voice communication, thereby eliminating the necessity of providing an extra or additional antenna for use in conjunction with the vehicle unit 16, as mentioned before.

The vehicle unit 16 is constructed to detect a change in the magnitude or power level of the signals received from the signpost units 12A and 12B indicating the vehicle unit 16 has entered into the near-field region 58 from the far-field region 60 of one of the signpost units 12A or 12B, or indicating the vehicle unit 16 has departed from the near-field region 58 and entered the far-field region 60 of one of the signpost units 12A or 12B, the vehicle unit 16 generating and storing a new location code for transmission to the base station 22 in response to detecting a change in the magnitude or power level of the signals received from the signpost units 12A or 12B.

The vehicle unit 16 is also constructed to detect the reception of signals transmitted from two or more signpost units 12A or 12B received in an alternating fashion and, when the vehicle unit 16 receives signals from two or more signpost units 12A and 12B in an alternating fashion, each having a magnitude indicating the vehicle unit 16 is located within the far-field region 60 of each signpost unit 12A and 12B transmitting the received signpost codes, the vehicle unit 16 generates and stores the alternating signpost codes along with a special code indicating the signpost codes were received in an alternating fashion for transmission to the base station 22, thereby indicating the vehicle unit 16 has been moved into the overlap region 66 formed by the overlapping portions of the far-field regions 60 of the signpost units 12A and 12B identified via the received signpost codes. It should be particularly noted that the overlap regions 66 can be identified via transmitting for reception at the base station 22 the two signpost codes and the signal indicating the two signpost codes were received in an alternating fashion; however, this particular operational embodiment requires additional radio transmission time as compared to the transmission of a single signpost code and the base station 22 must be equipped to identify the particular overlap region 66 formed by the overlapping far-field regions 60 of the signpost units 12 identified via the two received signpost codes. In a preferred form, the vehicle unit 16 is constructed to determine that two, different signpost codes are being received in an alternating fashion and to produce or generate a unique signpost code identifying the one particular overlap region 66 formed by the overlapping far-field portons 60 of the signpost units 12 identified via the two, alternatingly received signpost codes, the vehicle unit 16 storing for transmission to the base station 22 this artificial or pseudo-signpost code identifying the particular overlap region 66 and a code or signal indicating that the pseudo-signpost code identifies an overlap region thereby reducing the radio transmission time required via the automatic vehicle monitoring apparatus of the present invention. The pseudo-signpost code identifying the overlap regions 66 can be produced via various methods and apparatus; however, one preferred method and apparatus generally comprises substituting a predetermined number of bits of one of the alternatingly received signpost codes for the same predetermined number of bits of the other alternatingly received signpost code and substituting a bit indicating the two signpost codes were received in an alternating fashion for one other bit of the other alternatingly received signpost code. For example, assuming each signpost code has 20 bits, the state ("high" or "low") of 1 bit is utilized to indicate that two signpost codes were received in an alternating fashion (the bit being in the "high" state to indicate the signpost codes were alternatingly received, for example) and the last 4 bits of one of the alternatingly received signpost codes are to be replaced with 4 other bits to form the pseudo-signpost code, the last 3 bits of one of the alternatingly received signpost codes and 1 bit in the "high" state are substituted for the last 4 bits of the other alternatingly received signpost code to form the pseudo-signpost code identifying the one overlap region 66 formed by the overalapping portions of the far-field regions 60 of the two signpost units identified via the two alternatingly received signpost codes. If the overlap regions 66 are uniquely identified via the pseudo-signpost codes in a manner just described, then each signpost code uniquely identifying one particular signpost unit 12 must be unique with respect to the various pseudo-signpost codes and this design consideration can be easily accomplished when initially assigning particular signpost codes to each of the signpost units.

To illustrate the aspects of the present invention, generally described above, assume the vehicle 20 travels along a path of travel 80 through a portion of the roadway configuration shown in FIG. 2, the vehicle 20 traveling along the roadway 56 through intersections 56-46, 56-44, 56-42 and 56-40, then along the roadway 40 through intersections 54-40, 52-40 and 50-40, then along the roadway 50 through intersections 50-38 and 50-36, then along roadway 36 through intersection 52-36, and then along roadway 52 through intersection 52-34. The vehicle unit 16 located on the vehicle 20 receives the signpost codes transmitted via the signpost units 12A and 12B, and stores the received signpost codes or location codes for transmission to the base station 22 (shown in FIG. 1) when the vehicle unit 16 enters and when the vehicle unit 16 departs from the coverage regions 58, 60 and 66, as the vehicle 20 travels along the path of travel 80.

More particularly, a new signpost code or pseudo-signpost code is stored in the vehicle unit 16 indicating the position or location of the vehicle 20 for transmission to the base station 22 at the locations indicated in FIG. 2 via asterisks and identified via reference numerals 82, 84, 86, 88, 90, 92, 94, 96, 98, 100, 102, 104, 106, 108, 110, 112, 114, 116, 118 and 120, as the monitored object or, more particularly, the monitored vehicle 20 carrying the vehicle unit 16 travels along the path of travel 80. In the automatic reporting mode, the vehicle unit 16 automatically transmits a signal encoded with the signpost code or the pseudo-signpost code at each location identified in FIG. 2 via the asterisks thereby automatically reporting the location of the vehicle 20. The signals received and stored for transmission by the vehicle unit 16 as the vehicle 20 moves along the path of travel 80 are summarized below:

1. At the location 82, the vehicle unit 16 enters the overlap region 66 formed via the overlapping portions of the far-field regions 60 of the signpost unit 12A located at the intersection 56-44 and the signpost unit 12B located at the signpost location 74, and the vehicle unit 16 alternatingly receives the two signpost codes transmitted via signpost units 12A and 12B forming the overlap region 66 covering the intersection 56-46, the vehicle unit 16 storing for transmission to the base station 22 either a pseudo-signpost code or the two signpost codes encoded in the received signals along with a signal or, more particularly, an information bit indicating that the received signpost codes were alternatingly received thereby identifying the particular overlap region 66 or, in other words, indicating the vehicle 20 is entering the overlap region 66 encompassing or covering the intersection 56-46.

2. At the location 84, the vehicle unit 16 leaves or departs from the overlap region 66 covering the intersection 56-46, and enters the far-field region 60 of the signpost unit 12A located at the intersection 56-44. The vehicle unit 16 begins receiving only the one signal encoded with the signpost code uniquely identifying the signpost unit 12A located at the intersection 56-44, the magnitude or power level of the received signal indicating the vehicle unit 16 is located within the far-field region 60 formed by the signpost unit 12A uniquely identified via the received signpost code. At the location 84, the vehicle unit 16 stores for transmission to the base station 22 the signpost code uniquely identifying the signpost unit 12A located at the intersection 56-44 along with a signal or more particularly, a code indicating the location of vehicle unit 16 within the far-field region 60.

3. At the location 86, the vehicle unit 16 departs from the far-field region 60 and enters into the near-field region 58 of the signpost unit 12A located at the intersection 56-44. The vehicle unit 16 detects the change in the magnitude or power level of the received signal and stores for transmission to the base station 22 the signpost code uniquely identifying the signpost unit 12A located at the intersection 56-44 and a signal or code indicating the movement of the vehicle unit 16 into the near-field region 58 from the far-field region 60.

4. At the location 88, the vehicle unit 16 departs from the near-field region 58 and enters into the far-field region 60 of the signpost unit 12A located at the intersection 56-44. The vehicle unit 16 detects the change in the magnitude or power level of the received signal and stores for transmission to the base station 22 the signpost code uniquely identifying the signpost unit 12B located at the intersection 56-44 and a signal or code indicating the movement of the vehicle unit 16 into the far-field region 60 from the near-field region 58.

5. At the location 90, the vehicle unit 16 enters the overlap region 66 formed via the overlapping portions of the far-field regions 60 of the signpost unit 12A located at the intersection 56-44 and the signpost unit 12B located at the intersection 56-40, and the vehicle unit 16 begins to alternatingly receive the two signpost codes transmitted via the signpost units 12A and 12B forming the overlap region 66 covering the intersection 56-42, the vehicle unit 16 storing for transmission to the base station 22 either a pseudo-signpost code or the two signpost codes encoded in the received signals along with a signal or information bit indicating that the received signpost codes were alternatingly received thereby identifying the particular overlap region 66 or, in other words, indicating the vehicle 20 is entering the overlap region 66 covering the intersection 56-44.

6. At the location 92, the vehicle unit 16 departs from the overlap region 66 covering the intersection 56-42, and enters the far-field region 60 of the signpost unit 12B located at the intersection 56-40. The vehicle unit 16 begins receiving only the one signal encoded with the signpost code uniquely identifying the signpost unit 12B located at the intersection 56-40, the magnitude or power level of the received signal indicating the vehicle unit 16 is located within the far-field region 60. At the location 92, the vehicle unit 16 stores for transmission to the base station 22 the signpost code uniquely identifying the signpost unit 12B located at the intersection 56-40 along with a signal or code indicating the location of the vehicle unit 16 within the far-field region 60.

7. At the location 94, the vehicle unit 16 departs from the far-field region 60 and enters into the near-field region 58 of the signpost unit 12B located at the intersection 56-40. The vehicle unit 16 detects the change in the magnitude or power level of the received signal and stores for transmission to the base station 22 the signpost code uniquely identifying the signpost unit 12B located at the intersection 56-40 and a signal or code indicating the movement of the vehicle unit 16 into the near-field region 58 from the far-field region 60.

8. At the location 96, the vehicle unit 16 departs from the near-field region 58 and enters into the far-field region 60 of the signpost unit 12B located at the intersection 56-40. The vehicle unit 16 detects the change in the magnitude or power level of the received signal and stores for transmission to the base station 22 the signpost code uniquely identifying the signpost unit 12B located at the intersection 56-40 and a signal or code indicating the movement of the vehicle unit 16 into the far-field region 60 from the near-field region 58.

9. At the location 98, the vehicle unit 16 enters the overlap region 66 formed via the overlapping portions of the far-field regions 60 of the signpost unit 12B located at the intersection 56-40 and the signpost unit 12A located at the intersection 52-40, and the vehicle unit 16 begins to alternatingly receive the two signpost codes transmitted via the signpost units 12A and 12B forming the overlap region 66 covering the intersection 54-40, the vehicle unit 16 storing for transmission to the base station 22 either a pseudo-signpost code or the two signpost codes encoded in the received signals along with a signal or information bit indicating that the received signpost codes were alternatingly received thereby identifying the particular overlap region 66 or, in other words, indicating the vehicle 20 is entering the overlap region 66 covering the intersection 54-40.

10. At the location 100, the vehicle unit 16 departs from the overlap region 66 covering the intersection 54-40, and enters the far-field region 60 of the signpost unit 12A located at the intersection 52-40. The vehicle unit 16 begins receiving a signal encoded with the signpost code uniquely identifying the signpost unit 12A located at the intersection 52-40, the magnitude or power level of the received signal indicating the vehicle unit 16 is located within the far-field region 60. At the location 100, the vehicle unit 16 stores for transmission to the base station 22 the signpost code uniquely identifying the signpost unit 12A located at the intersection 52-46 along with a signal or code indicating the location of the vehicle 20 within the far-field region 60.

11. At the location 102, the vehicle unit 16 departs from the far-field region 60 and enters the near-field region 58 of the signpost unit 12A located at the intersection 52-40. The vehicle unit 16 detects the change in the magnitude or power level of the received signal and stores for transmission to the base station 22 the signpost code uniquely identifying the signpost unit 12A located at the intersection 52-40 and a signal or code indicating the movement of the vehicle unit 16 into the near-field region 58.

12. At the location 104, the vehicle unit 16 departs from the near-field region 58 and enters the far-field region 60 of the signpost unit 12A located at the intersection 52-40. The vehicle unit 16 detects the change in the magnitude or power level of the received signal and stores for transmission to the base station 22 a signpost code uniquely identifying the signpost unit 12A located at the intersection 52-40 and a signal or code indicating the movement of the vehicle unit 16 into the far-field region 60 from the near-field region 58.

13. At the location 106, the vehicle unit 16 enters the overlap region 66 formed via the overlapping portions of the far-field regions 60 of the signpost unit 12A located at the intersection 52-40 and the signpost unit 12B located at the intersection 48-40, and the vehicle unit 16 begins to alternatingly receive the two signpost codes transmitted via the signpost units 12A and 12B forming the overlap region 66 covering the intersection 50-40, the vehicle unit 16 storing for transmission to the base station 22 either a pseudo-signpost code or the two signpost codes encoded in the received signals along with a signal or information bit indicating that the received signpost codes were alternatingly received thereby identifying the particular overlap region 66 or, in other words, indicating the vehicle 20 is entering the overlap region 66 covering the intersection 50-40.

14. At the location 108, the vehicle unit 16 departs from the overlap region 66 covering the intersection 50-40 and enters into the open region 79 covering the intersection 50-38, where the vehicle unit 16 does not receive a signal from either a signpost 12A or signpost 12B, the vehicle unit 16 storing for transmission to the base station 22 a signal or code indicating the departure from the overlap region 66 covering the intersection 50-40 and the location of the vehicle unit 16.

15. At the location 110, the vehicle unit 16 departs from the open region 79 covering the intersection 50-40 and enters the overlap region 66 formed via the overlapping portions of the far-field regions 60 at the signpost unit 12A located at the intersection 48-36 and the signpost unit 12B located at the intersection 52-36, and the vehicle unit 16 begins to alternatingly receive the two signpost codes transmitted via the signpost units 12A and 12B forming the overlap region 66 covering the intersection 50-36, the vehicle unit 16 storing for transmission to the base station 22 either a pseudo-signpost code or the two signpost codes encoded in the received signals along with a signal or information bit indicating that the received signpost codes were alternatingly received thereby identifying the particular overlap region 66 or, in other words, indicating the vehicle 20 is entering the overlap region 66 covering the intersection 50-36.

16. At the location 112, the vehicle unit 16 departs from the overlap region 66 covering the intersection 50-36, and enters the far-field region 60 of the signpost unit 12B located at the intersection 52-36. The vehicle unit 16 begins receiving a signal encoded with the signpost code uniquely identifying the signpost unit 12B located at the intersection 52-36, the magnitude or power level of the received signal indicating the vehicle unit 16 is located within the far-field region 60. At the location 112, the vehicle unit 16 stores for transmission to the base station 22 the signpost code uniquely identifying the signpost unit 12B located at the intersection 52-36 along with a signal or code indicating the location of the vehicle unit 16 within the far-field region 60.

17. At the location 114, the vehicle unit 16 departs from the far-field region 60 and enters into the near-field region 58 of the signpost unit 12B located at the intersection 52-36. The vehicle unit 16 detects the change in magnitude or power level of the received signal and stores for transmission to the base station 22 the signpost code uniquely identifying the signpost unit 12B located at the intersection 52-36 and a signal or code indicating the movement of the vehicle unit 16 into the near-field region 58.

18. At the location 116, the vehicle unit 16 departs from the near-field region 58 and enters into the far-field region 60 of the signpost unit 12B located at the intersection 52-36. The vehicle unit 16 detects the change in the magnitude or power level of the received signal and stores for transmission to the base station 22 the signpost code uniquely identifying the signpost unit 12B located at the intersection 52-36 and a signal or code indicating the movement of the vehicle unit 16 into the far-field region 60.

19. At the location 118, the vehicle unit 16 enters the overlap region 66 formed via the overlapping portions of the far-field regions 60 of the signpost unit 12B located at the intersection 52-36 and the signpost unit 12A located at 76, and the vehicle unit 16 begins to alternatingly receive the two signpost codes transmitted via the signpost units 12A and 12B forming the overlap region 66 covering the intersection 52-34, the vehicle unit 16 storing for transmission to the base station 22 either a pseudo-signpost code or the two signpost codes encoded in the received signals along with a signal or information bit indicating that the received signpost codes were alternatingly received thereby identifying the particular overlap region 66 or, in other words, indicating the vehicle unit 16 is entering the overlap region 66 covering the intersection 52-34.

20. At the location 120, the vehicle unit 16 departs from the overlap region 66 covering the intersection 52-34, and enters the far-field region 66 of the signpost unit 12A located at 76. The vehicle unit 16 begins receiving a signal encoded with the signpost code uniquely identifying the signpost unit 12A located at 76, the magnitude or power level of the received signal indicating the vehicle unit 16 is located within the far-field region 60. At the location 120, the vehicle unit 16 stores for transmission to the base station 22 the signpost code uniquely identifying the signpost unit 12A located at 76 along with a signal or code indicating the location of the vehicle unit 16 within the far-field region 60.

The signpost units 12A and 12B are located and spaced within the roadway configuration of FIG. 2 such that the intersections (50-34, 50-38, 54-38, 50-42, 54-42, 50-46 and 54-46) identified via open regions 79 are specifically located to assure that a vehicle unit 16 cannot enter or leave any open region without being detected. More particularly, the open regions 79 are spaced within the signpost configuration such that a vehicle unit 16 cannot enter or leave any open region 79 without passing through either one of the overlap regions 66 or one of the far-field regions 60. As shown in FIG. 2, the roadway configuration is oriented such that a vehicle unit 16 will enter into one of the overlap regions 66 when the vehicle unit 16 departs in any direction from any one of the open regions 79 and a vehicle unit 16 will depart from one of the overlap regions 66 when the vehicle unit 16 enters from any direction any one of the open regions 79.

In summary, each signpost unit 12A and 12B generates and transmits a predetermined signpost code uniquely identifying the particular signpost unit 12A or 12B, thereby indicating the location or position since the signpost units 12A and 12B are positioned at predetermined locations within the area controlled via the automatic vehicle monitoring apparatus 10 of the present invention, the signpost units 12A each transmit the signpost code at the first pulse repetition frequency ($PRF_1$) and the signpost units 12B each transmit the signpost codes at the second pulse repetition frequency ($PRF_2$). The signpost units 12A and 12B are located and spaced within a roadway configuration (an area within which the movement or position of vehicles or other objects is monitored via the method and apparatus of the present invention) such that predetermined locations are positioned within identifiable coverage regions (near-field regions 58, far-field regions 60 and overlap regions 66) and each of the open regions 79 (locations within the area monitored via the automatic vehicle monitoring apparatus which are not positioned within the coverage regions, i.e. near-field regions 58, far-field regions 60 and overlap regions 66) is located such that a monitored object cannot move into any open region 79 or move out of any open region 79 without leaving or entering one of the coverage regions (near-field regions 58, far-field regions 60 or overlap regions 66). Thus, the movement or, more particularly, the location of the monitored objects within the area monitored via the automatic vehicle monitoring apparatus of the present invention is monitored and identified via the movement of the monitored objects into and from the coverage regions established via the signpost units 12A and 12B.

Each monitored object is equipped with a receiver (such as the vehicle units 16) and each receiver receives the signpost codes transmitted via the signpost units 12A and 12B. The receiver on each monitored object detects a change from the strong radiation field created within the near-field regions 58 to the weaker radiation field created within the far-field regions 60 and a change from the weak radiation field created within the far-field regions 60 to the stronger radiation field created within the near-field regions 58, the vehicle unit 16 storing a signpost code for transmission to a base station (the base station 22) in either event indicating the movement of the monitored-object from an identified far-field region 60 into an identified near-field region 58 or the movement of the monitored-object from an identified near-field region 58 into an identified far-field region 60. Further, the vehicle unit 16 on each monitored object detects the reception of alternating signpost codes within the overlap regions 66 and stores the received signpost codes or the unique pseudo-signpost code for transmission to the base station 22 along with a special code indicating the alternating reception of the received signpost codes, thereby indicating the movement of the monitored object into an identified overlap region 66, the particular overlap region 66 being identified via the two, distinct received signpost codes identifying the two signpost units 12 having the overlapping far-field regions 60 creating the particular overlap region 66. In a preferred embodiment, the vehicle units 16 develop a pseudo-signpost code uniquely identifying each overlap region 66 for transmission to the base station 22 in a manner described before.

The different pulse repetition frequencies ($PRF_1$ and $PRF_2$) are determined such that each signpost unit 12A and 12B is radiating or transmitting the signpost code for a relatively small percent of time or, in other words, the duty cycle of each signpost unit 12A and 12B is relatively low (1-to-30 in one operational embodiment, for example), thereby reducing the transmitting or "on" time of the signpost units 12A and 12B and substantially increasing the overall operating life of each signpost unit 12A and 12B consequently eliminating the necessity of replacing the electrical power source (batteries, for example) at frequent, uneconomical time intervals. Thus, the signpost units 12A and 12B of the present invention are constructed to utilize a battery type of electrical power supply and are constructed to facilitate the utilization of a relatively long life battery, such as lithium batteries, for example, the relatively low duty cycle further increasing the operating life of the battery type power source. The utilization of batteries for the electrical power source of the signpost units 12 enhances the reliability of the automatic vehicle monitoring apparatus of the present invention since operation is neither interrupted nor subject to interruption during emergency situations such as storms, electrical brownouts, or other such civil emergencies, this last-mentioned feature being particularly important when monitoring civil patrol vehicles since the location of such vehicles is particularly important during such civil emergency conditions.

Each signpost unit 12A and 12B operates in the high frequency region (27 MHz in one operational embodiment, for example) with a power output below one hundred milliwatts, in one operational embodiment, for example, to allow a relatively wide bandwidth system (several channels, for example) to be constructed utilizing reliable and relatively inexpensive components. In addition, the operation of the signpost units 12A and 12B is substantially immune to citizen band interference due to the relatively short range of operation (typically one to three blocks, for example). The operation of the signpost units 12A and 12B in the high frequency range (27 MHz, for example) reduces the initial equipment costs because fewer electrical components are required for operation in this frequency range. Further, the operation of the signpost units 12A and 12B in the high frequency range (27 MHz, for example) is within the present rules and regulations promulgated by the Federal Communication Commission (FCC), thereby eliminating the expense and inconvenience of obtaining a special license for operating the automatic vehicle monitoring apparatus of the present invention, the operation of the signpost units 12A and 12B also allowing the multiple area coverage (the establishment of the near-field regions and the far-field regions).

The utilization of signpost units 12 to provide coverage of a predetermined area establishes a "fail-safe" type of automatic vehicle monitoring apparatus, i.e. when a single signpost unit fails for any reason, only the movement of monitored objects within the one portion of the area covered by that signpost unit [plus or minus one (±) block, for example] will not be reported to the base station 22. Thus, the failure of one signpost unit 12A or 12B will not render the automatic vehicle monitoring apparatus of the present invention inoperable, an aspect of the present invention to be made more apparent below in connection with the description of FIG. 5.

The operation of the signpost units 12A and 12B and the cooperating vehicle units 16 and the base station 22 in the high frequency (27 MHz, for example) provide reliable transmission and reception of the various signals notwithstanding foul weather conditions, such as rain and snow, for example. With respect to operation of the automatic vehicle monitoring apparatus 10 during foul weather conditions, it should be noted that the utilization of the lithium batteries to provide the operating electrical power source for the signpost units 12A and 12B assures continued operation of the automatic vehicle monitoring apparatus 10 in extreme temperature conditions since lithium batteries are operational in a temperature range from approximately −55° F. to approximately +165° F.

Referring to the automatic reporting mode, the "non-polling" feature of the automatic vehicle monitoring apparatus 10 eliminates the necessity of providing each monitored vehicle with a radio, in some operational circumstances. Further, the "non-polling" aspect of the present invention provides an automatic vehicle monitoring apparatus 10 which is not dependent on the continued operation of a base station polling computer, it is not dependent on the continued operation of a base station transmitter and, since the automatic vehicle monitoring apparatus 10 has a substantially reduced channel time requirement as compared to monitoring systems employing a "polling" technique, substantially error-free location and status message reporting are realized via the use of a proprietary digital encoding and decoding system providing the signpost-to-vehicle or monitored-object communication data link, as will be made more apparent below.

Finally, the method and the apparatus of the present invention are constructed to be operated in multiple reporting modes (the automatic reporting mode, the region or route reporting mode and the vehicle polling mode, for example) and, in one preferred embodiment, the vehicle units 16 are constructed to be automatically positioned in a particular reporting mode. The region or route reporting mode and the vehicle polling mode will be described more fully with respect to the vehicle units shown in FIGS. 9 and 11.

EMBODIMENT OF FIG. 5

The roadway configuration shown in FIG. 5 is exactly like the roadway configuration shown in FIG. 2, and the modified signpost configuration shown in FIG. 5 is exactly like the signpost configuration shown in FIG. 2, except a signpost unit 12 is not located at the intersection 52-40. Since a signpost unit 12 is not located at the intersection 52-40 overlap regions 66 are not formed to encompass or cover the intersections 54-40, 52-42, 50-40 and 52-38 in a manner similar to that shown in FIG. 2, i.e. the elimination of the far-field region 60 established via the signpost unit 12 at the intersection 52-40 eliminates the overlap regions 66 which were formed via portions of the far-field region 60 of the signpost unit 12 located at the intersection 52-40, and creates a relatively larger area open region 79c encompassing the intersection 52-40.

In some applications, it may be desirable to eliminate a particular signpost unit 12 because of the particular roadway configuration or other such design consideration and, in such applications, the signpost units 12 are spaced according to the present invention such that a monitored object cannot enter or leave the open region 79c without entering or leaving one of the coverage regions, i.e. the near-field regions 58, the far-field regions 60 and the overlap regions 66. For example, assuming the vehicle path of travel 80 through the roadway configuration shown in FIG. 5, a new signpost code or pseudo-signpost code is stored in the vehicle unit 16 indicating the position or location of the vehicle 20 for transmission to the base station 22 at the locations indicated in FIG. 5 via asterisks and identification via numerals 82, 84, 86, 88, 90, 92, 94, 96, 110, 112, 114, 116, 118 and 120 in a manner exactly like that described before with reference to FIG. 2; however, a new signpost code or pseudo-signpost code is not stored in the vehicle unit 16 indicating the position or location of the vehicle 20 at the reference numerals 98, 100, 102, 104, 106 and 108, as the vehicle 20 moves along the roadway 40 through the intersection 52-40 to the intersection 50-40 and along the roadway 50 toward the intersection 50-36 in a manner like that described before with reference to FIG. 2. Rather, a new signpost code or pseudo-signpost code is stored in the vehicle unit 16 indicating the position or location of the vehicle 20 at locations designated via the reference numerals 101, 103 and 105 and identified via the associated asterisk symbols.

The signals received and stored for transmission by the vehicle unit 16 as the vehicle 20 moves along the path of travel 80 through the locations 101, 103 and 105 may be summarized as follows, the other locations 82, 84, 86, 88, 90, 92, 94, 96, 110, 112, 114, 116, 118 and 120 being described in detail before in connection with FIG. 2:

1. As the vehicle 20 moves along the roadway 40 between the reporting locations 96 and 101, the vehicle 20 is located within the far-field region 60 of the signpost unit 12B located at the intersection 56-40, the signal strength or power level and the signpost code encoded in the signal received via the vehicle unit 16 indicating the position of the vehicle 20 within the particular far-field region 60 of the signpost unit 12B located at the intersection 56-40.
2. At the location 101, the vehicle 20 moves from the far-field region 60 of the signpost unit 12B located at the intersection 56-40 and moves into or enters the open region 79c. In the open region 79c, no signals are received via the vehicle unit 16 as the vehicle 20 moves along the roadway 40 through the intersection 52-40 toward the reporting location 103.
3. At the location 103, the vehicle 20 moves into or enters the far-field region 60 of the signpost unit 12B located at the intersection 48-40, the location or position of the vehicle 20 being identified via the strength or power level of the signal received via the vehicle unit 16 and the signpost code encoded in the signal received via the vehicle unit 16.
4. As the vehicle 20 moves along the roadway 50 between the reporting locations 103 and 105 toward the intersection 50-38, the vehicle 20 remains within the far-field region 60 of the signpost unit 12B. At the location 105, the vehicle 20 moves from the far-field region 60 of the signpost unit 12B located at the intersection 48-40 and moves into or enters the open region 79 encompassing the intersection 50-38 and, while in the open region 79, the vehicle unit 16 does not receive signals encoded with signpost codes.

Thus, even though a signpost unit 12 is not positioned at the location or intersection 52-40, the position of the vehicle 20 is reportable and monitored via the automatic vehicle monitoring apparatus 10 of the present invention without any substantial loss in resolution, i.e. the location of the monitored vehicle 20 is identified within a reasonable distance encompassing less than a one-block area (the distance "one-block" being utilized sometimes herein to refer to the distance between any two intersections along a path of travel following one of the roadways). More particularly, the location of the vehicle 20 within the open region 79c is reportable at reporting locations spaced a distance of less than one block in any direction from the intersection 52-40, which provides a sufficient, acceptable resolution in most automatic vehicle monitoring applications. It should be noted that the precise resolution is controlled via the spacing of the signpost units 12 and the radius of the far-field regions established via the signpost units 12.

If the vehicle 20 turned at the intersection 52-40 and traveled along the roadway 52 toward the intersection 52-38, the vehicle unit 16 would not receive any signals indicating any change in the vehicle 70 path of travel different from the vehicle 20 path of travel 80. However, assuming this new path of travel, the vehicle 20 will enter the far-field region 60 of the signpost unit 12A located at the intersection 52-36 and the entering of the vehicle 20 into this far-field region 60 will be indicated via the signal strength or power level along with the signpost code encoded in the signal received via the vehicle unit 16.

As mentioned before, some roadway configurations may dictate the spacing of the signpost units 12 to establish open regions such as the open region 79c shown in FIG. 5, and, in some applications, it may be desirable to establish such open regions to reduce the total number of signpost units 12 required to form the unique signpost configuration of the present invention. In addition to the foregoing, the modified signpost configuration shown in FIG. 5 illustrates the "fail-safe" aspect of the present invention, i.e. if one of the signpost units 12 fails for any reason such as the signpost located at the intersection 52-40, the automatic vehicle monitoring apparatus 10 is not rendered inoperable, the only result being that the resolution within the open region created via the non-operating signpost unit is increased; however, the resolution remains within acceptable tolerances for most automatic vehicle or object-monitoring applications as illustrated via the foregoing description with reference to FIG. 5 where a signpost unit located at the intersection 52-40 was eliminated.

EMBODIMENT OF FIG. 6

Figure 6:
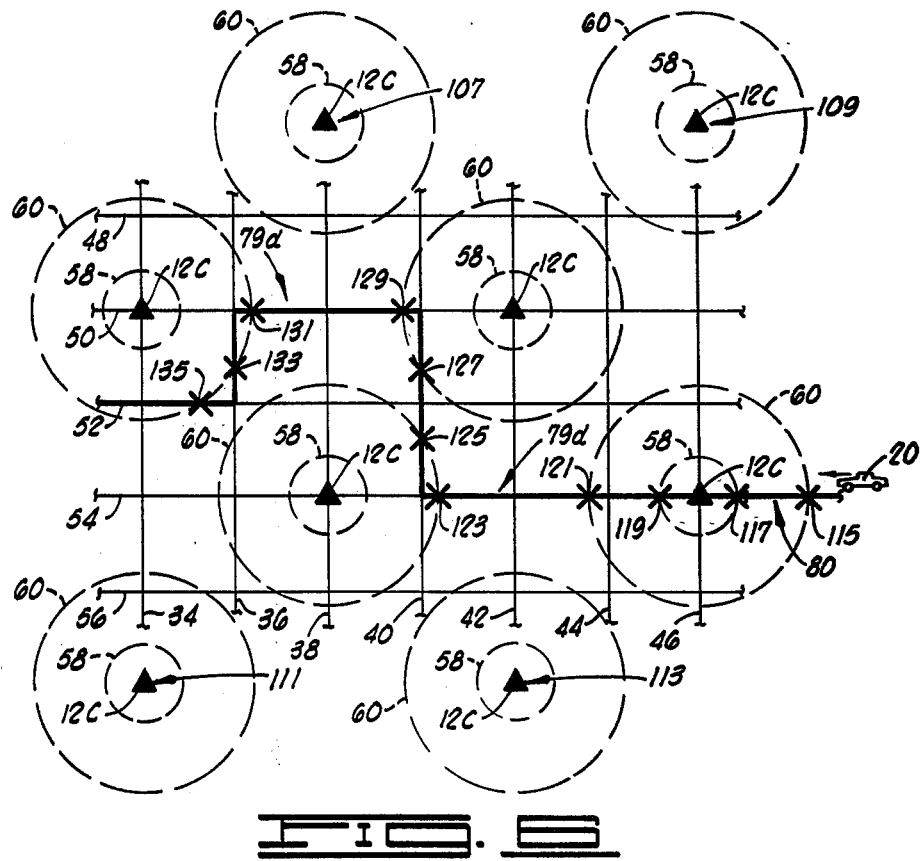
FIG. 6 is a diagrammatic, schematic view showing a roadway configuration exactly like the roadway configuration shown in FIG. 2; but, showing another modified signpost configuration.

The roadway configuration shown in FIG. 6 is exactly like the roadway configuration shown in FIGS. 2 and 5; however, a modified signpost configuration is shown in FIG. 2 which may be desirable in some applications. It should be noted that the signpost configuration as shown in FIG. 6 can be utilized in combination with the signpost configurations shown in FIGS. 2 and 5, each signpost configuration being utilized to provide coverage in selected portions of the monitored area and, in some applications, the signpost configuration shown in FIG. 6 may be utilized in total to provide the coverage in the monitored area.

As shown in FIG. 6, signpost units 12c are spaced through the roadway configuration and the signpost units 12c are constructed exactly like the signpost units 12 described before, except the signpost units 12c are not constructed to operate at a first and a second pulse repetition frequency. Each of the signpost units 12c establishes a near-field region 58 and a far-field region 60 in a manner and for reasons described before with respect to signpost units 12, including the signpost units 12A and 12B; however, utilizing the modified signpost configuration of FIG. 6, the signpost units 12C are not positioned and spaced within the monitored area or roadway configuration to establish overlap regions similar to the overlap regions 66, described before. Since the signpost units 12C are not spaced to establish overlap regions, there is no need to construct the signpost units 12C to operate at two, distinct pulse repetition frequencies like that described before with respect to the signpost units 12A and 12B and the pulse repetition frequencies $PRF_1$ and $PRF_2$.

The signpost units 12C are positioned at the intersections 50-34, 54-38, 50-42 and 54-46 and at locations 107, 109, 111 and 113 within the roadway configuration shown in FIG. 6 in accordance with the modified signpost configuration, the signpost units 12C being positioned to establish the near-field regions 58, the far-field regions 60 and open regions 79d. In a manner like that described before with respect to the open regions 79 and 79c, the signpost units 12C are spaced within the monitored area to establish the open regions 79d such that a monitored object cannot enter or leave any of the open regions 79c without entering or leaving one of the coverage regions established via the signpost units 12C, i.e. the near-field regions 58 and the far-field regions 60. For example, assuming the vehicle path of travel 80 through the roadway configuration shown in FIG. 6, the position or location of the vehicle 20 is reportable at the locations indicated in FIG. 6 via asterisks and identified via the reference numerals 115, 117, 119, 121, 123, 125, 127, 129, 131, 133 and 135. The signals received and transmittable by the vehicle unit 16 as the vehicle 20 moves along the path of travel 80 through the reporting locations 115, 117, 119, 121, 123, 125, 127, 129, 131, 133 and 135, may be summarized as follows:

1. At the location 115, the vehicle unit 16 moves into the far-field region 60 established via the signpost unit 12C located at the intersection 54-46, and the signal strength or power level and the signpost code encoded in the signal received via the vehicle 16 indicates the position of the vehicle 20 within the far-field region 60 of the signpost unit 12C located at the intersection 54-46.
2. At the location 117, the vehicle unit 16 moves from the far-field region 60 into the near-field region 58 of the signpost unit 12C located at the intersection 54-46, and the signal strength or power level and the signpost code encoded in the received signal indicates the position of the vehicle 20 within the near-field region 58 of the signpost unit 12C located at the intersection 54-46.
3. At the location 119, the vehicle unit 16 moves from the near-field region 58 into the far-field region 60 of the signpost unit 12C located at the intersection 54-46, and the signal strength or power level and the signpost code encoded in the received signal indicates the position of the vehicle 20 within the far-field region of the signpost unit 12C located at the intersection 54-46.
4. At the location 121, the vehicle 20 moves from the far-field region 60 of the signpost unit 12C located at the intersection 54-46 and moves into or enters the "open region" 79d. In the open region 79d, no signals are received via the vehicle unit 16 as the vehicle 20 moves along the roadway 56 through the intersection 54-42 toward the reporting location 123.
5. At the location 123, the vehicle unit 16 moves into the far-field region 60 established via the signpost unit 12C, located at the intersection 54-38 and the signal strength or power level and the signpost code encoded in the signal received via the vehicle 16 indicates the position of the vehicle 20 within the far-field region 60 of the signpost unit 12C located at the intersection 54-38.
6. At the location 123, the vehicle 20 moves from the far-field region 60 of the signpost unit 12C located at the intersection 54-38 and moves into or enters the open region 79d. In the open region 79c, no signals are received via the vehicle unit 16 as the vehicle 20 moves along the roadway 40 through the intersection 52-40 toward the reporting location 127.
7. As the vehicle 20 moves along the roadway 40 and 50 between the reporting locations 127 and 129, the vehicle 20 is located within the far-field region 60 of the signpost unit 12C located at the intersection 50-42, the signal strength or power level and the signpost code encoded in the signal received via the vehicle unit 16 indicating the position of the vehicle 20 within the particular far-field region 60 of the signpost unit 12C located at the intersection.

8. At the location 129, the vehicle 20 moves from the far-field region 60 of the signpost unit 12C located at the intersection 50-42 and moves into or enters the open region 79d. In the open region 79d, no signals are received via the vehicle unit 16 as the vehicle 20 moves along the roadway 50 through the intersection 50-38 toward the reporting location 131.

9. At the location 131, the vehicle unit 16 moves into the far-field region 60 established via the signpost unit 12C located at the intersection 50-34, and the signal strength or power level and the signpost code encoded in the signals received via the vehicle 16 indicates the position of the vehicle 20 within the far-field region 60 of the signpost unit 12C located at the intersection 50-34.

10. As the vehicle 20 moves along the roadway 50 and 36 between the reporting locations 131 and 133, the vehicle 20 is located within the far-field region 60 of the signpost unit 12C located at the intersection 50-34, the signal strength or power level and the signpost code encoded in the signal received via the vehicle unit 16 indicating the position of the vehicle 20 within the particular far-field region 60 of the signpost unit 12C located at the intersection 50-34.

11. At the location 133, the vehicle 20 moves from the far-field region 60 of the signpost unit 12C located at the intersection 50-34 and moves into or enters the open region 79d. In the open region 79d, no signals are received via the vehicle unit 16 as the vehicle 20 moves along the roadway 36 through the intersection 52-36 and then along the roadway 52 toward the reporting location 135.

12. At the location 135, the vehicle unit 16 moves into the far-field region 60 established via the signpost unit 12C located at the intersection 50-34, and the signal strength or power level and the signpost code encoded in the signal received via the vehicle 16 indicates the position of the vehicle 20 within the far-field region 60 of the signpost unit 12C located at the intersection 50-34.

The signpost configuration shown in FIG. 6 does not provide the relatively high resolution provided via the signpost configuration shown in FIG. 2; however, the location of the vehicle 20 is identifiable within a relatively short radius area ($\pm$ one block, for example) which may be acceptable in some object-monitoring applications. As described before with respect to the signpost configuration of FIG. 5, it may be desirable to utilize the signpost configuration of FIG. 2 to monitor some portion of a particular monitored area where the roadway configuration is such that it is not feasible to position the signpost units 12 to establish the overlap regions. However, it should be noted that the signpost configuration and the signpost construction utilizing the two, distinct pulse repetition frequencies described before in connection with FIGS. 1 through 4, inclusive, represent the preferred embodiments of the present invention and should be adaptable to most monitored area configurations.

SIGNPOST UNIT AND HAND UNIT

Figure 7:
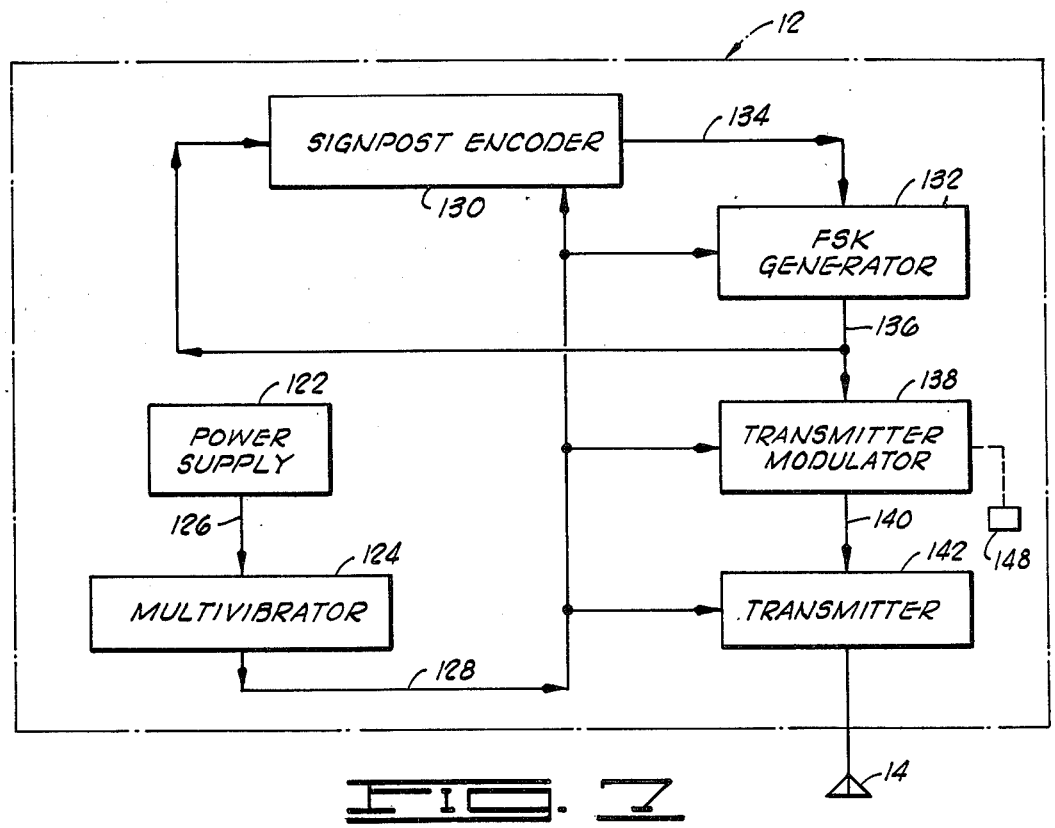
FIG. 7 is a schematic view of the signpost unit of the present invention diagrammatically shown in FIG. 1.

One preferred embodiment of the signpost unit 12 (the numeral designation "12" being utilized herein to refer generally to the signpost units of the present invention and including the signpost units designated via the numeral references 12A, 12B and 12C) is diagrammatically shown in greater detail in FIG. 7, and includes: an electrical operating power supply 122 which is a lithium battery, in one preferred form, for example; a low power drain monostable multivibrator 124 connected to the power supply 122 via a signal path 126; a serial complementary multiplexer digital encoder, designated in FIG. 5 and referred to herein as the "signpost encoder" 130, the signpost encoder 130 receiving the multivibrator 124 output signal via a signal path 128 providing the operating power for the signpost encoder 130 in the "on" condition of the multivibrator 124; an FSK generator 132 receiving the signpost encoder 130 output signal via a signal path 134 and providing an output signal via a signal path 134 and providing an output signal on a signal path 136 and receiving the multivibrator 124 output signal providing the operating power for the FSK generator 132 in the "on" condition of the multivibrator 124, the FSK generator 132 output signal provided on the signal path 136 being connected to and received by the signpost encoder 130; a transmitter modulator 138 receiving the FSK generator 132 output signal on the signal path 136 and the multivibrator 124 output signal on the signal path 128 for providing the operating power for the transmitter modulator 138 in the "on" condition of the multivibrator 124 and providing an output signal on a signal path 140; and a signpost transmitter 142 receiving the transmitter modulator 138 output signal on the signal path 140 and the multivibrator 124 output signal on the signal path 128 for providing operating power for the transmitter 142, the transmitter 142 providing an output signal connected to the signpost antenna 14 in the "on" condition of the multivibrator 124.

The multivibrator 124 has an "on" condition and an "off" condition and the multivibrator 124 provides the output signal on the signal path 128, having a predetermined frequency, for a fixed, predetermined period of time in the "on" condition (sometimes referred to in the art as the "oscillating state") of the multivibrator 124. The period of time during which the multivibrator 124 is in the "on" condition is determined by the time constant of the multivibrator 124, and the period of time during which the multivibrator 124 is in the "off" condition is also predetermined, the period of time during which the multivibrator 124 is in the "off" condition being predetermined via the multivibrator 124 construction and being independent of the period of time during which the multivibrator 124 is in the "on" condition.

In a preferred form, some of the signpost units 12 are constructed such that the multivibrator 124 remains in the "on" condition for the predetermined period of time $ONT_A$ and in the "off" condition for the predetermined period of time $OFFT_A$, the remaining signpost units 12 being constructed such that the multivibrator 124 remains in the "on" condition for the predetermined period of time $ONT_B$ and in the "off" condition for the predetermined period of time $OFFT_B$, for the reasons described before. Monostable multivibrators constructed to operate in a manner described herein with respect to the multivibrator 124 are commercially available.

The signpost encoder 130 receives the multivibrator 124 output signal on the signal path 128 in the "on" condition of the multivibrator 124 and provides the signpost encoder 130 output signal on the signal path 134, the signpost encoder 124 output signal having voltage levels (sometimes referred to herein as "logic levels") varying between two values, one value representing a logical "one" and one value representing a logical "zero". The signpost encoder 130 is encoded with the predetermined binary signpost code uniquely identifying the particular signpost unit 12 and the output signal varies to provide a signal having logic levels corresponding to the encoded signpost code in a serial manner.

In one preferred form, the signpost encoder 130 successively generates each message bit of the signpost code followed by the complement of the previously generated message bit (sometimes referred to herein as the message bit complement) for each message bit of an (N) bit binary signpost code, and generates a synchronization signal (the synchronization signal being comprised of a predetermined number of synchronization bits), the synchronization bits having the same logic level or value as the first message bit of the (N) bit signpost code. The synchronization bits are generated via the signpost encoder 130 prior to the generation of the (N) bit signpost code. The synchronization bits and the bits generated via the signpost encoder 130 are connected via the signal path 134 to the control input of the FSK generator 132.

The FSK generator 132 has an "off" condition and an "activated" or "on" condition and is constructed to receive the signpost encoder 130 output signal via the signal path 134 and to provide the output signal on the signal path 136, the FSK generator 132 being conditioned in the "on" condition in response to receiving the multivibrator 124 output signal on the signal path 128. The FSK generator 132, more particularly, generates an output signal having one of two distinct frequencies ($f_s$) or ($f_m$) in response to the received digital encoder 18 output signal, the FSK generator 132 being constructed to generate an output signal having a frequency ($f_s$) in response to a received signpost encoder 130 output signal having a voltage level representing a logical "zero" and to generate an output signal having a frequency ($f_m$) in response to a received signpost encoder 130 output signal having a voltage level representing a logical "one". In practice, the frequency values of the FSK generator 132 output signal ($f_s$) and ($f_m$) are typically selected such that the difference between the two frequencies $[(f_m) - (f_s)]$ is equal to an amount corresponding to the transmission bit rate multiplied by the numeral 2, the transmission bit rate being sometimes referred to in the art and herein as the BAUD rate. In other words, it is typical in the art to construct the FSK generator such that: $[(f_m) - (f_s)] = $ BAUD rate $\times$ 2.

The output signal of the FSK generator 132 supplies the drive voltage for operating the transmitter 142. In response to the received transmitter modulator 138 output signal, the transmitter 142 provides the output signal which is connected to the signpost antenna 14. The signal strength or power level of the signal radiated via the signpost unit 12 is controlled via a power level adjust 148, shown in FIG. 7 mechanically connected to the transmitter modulator 138. Thus, the power level of the signal radiated or transmitted via the signpost unit 12 is raised and lowered via the power level adjust 148, thereby controlling the power level of the signpost unit 12 output signal within the far-field region 60. In one preferred operational embodiment, the transmitter modulator 138 is constructed such that the power level of the signpost unit 12 output signal is controlled (raised and lowered) via a screwdriver adjustment and, in this embodiment, the power level adjust 148 represents a screwdriver mechanically connected to a portion of the transmitter modulator 138, in a manner known in the art and requiring no further detailed description herein.

The transmitter 142, more particularly, generates an output signal having a predetermined frequency which is selected considering the particular data link (the communication data link between the signpost unit 12 and vehicle unit 16 and between the vehicle unit 16 and the base station) utilized for the transmission or communication of data between the signpost unit 12 and the vehicle unit 16 and for the transmission or communication of the signal generated via the transmitter 142 being sometimes referred to herein as the "data link carrier signal", or simply as the "carrier signal", for the purpose of signal identification. The transmitter 142 receives the transmitter modulator 138 output signal via the signal path 140 and the data link carrier signal generated via the transmitter 142 is modulated via the frequency of the received transmitter modulator 138 output signal. As mentioned before, the FSK generator 132 output signal has a frequency of either ($f_s$) or ($f_m$), and the data link carrier signal is thus modulated by a frequency of either ($f_s$) or ($f_m$) depending upon the logic level of the data bit being transmitted, the modulated data link carrier signal being connected to signpost antenna 14.

The FSK generator 132 output signal is also connected to the signpost encoder 130 and provides the clock pulses for operating the signpost encoder 130, the FSK generator 132 output signal providing what is sometimes referred to herein as the signpost master clock signal generating the required signpost master clock pulses for operating the signpost encoder 130, in a manner and for reasons to be described in greater detail below.

The transmitter modulator 138 is operative when receiving the multivibrator 124 output signal via the signal path 128 modulating the data link carrier signal for transmission and the transmitter modulator 138 is rendered inoperative in the "off" condition of the multivibrator 124. The multivibrator 124 remains in the "off" condition providing the signal on the signal path 128 for a predetermined period of time, as described before, and the signpost unit 12 does not transmit the signpost code or provide the signpost unit output signal via the signpost antenna 14 during this period of time.

Figure 8:
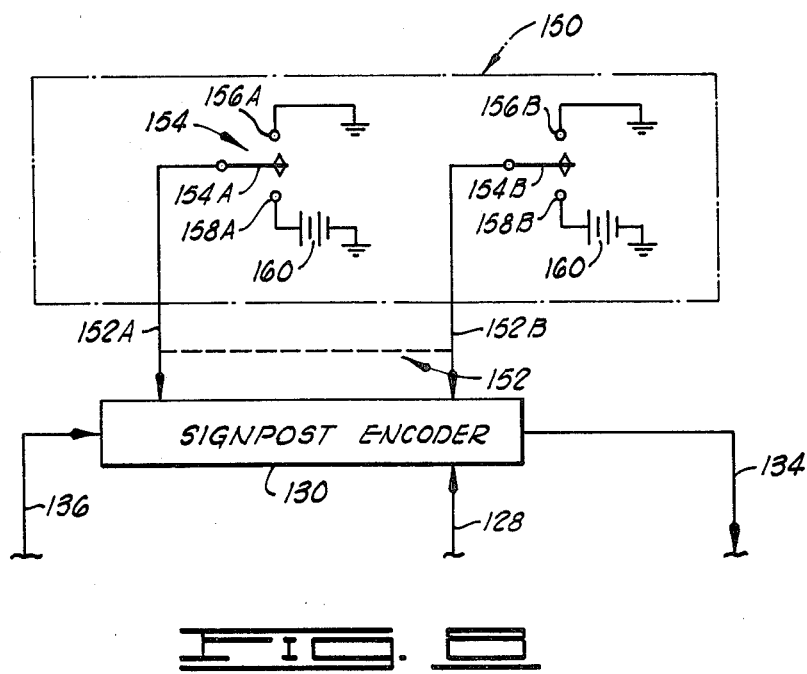
FIG. 8 is a schematic view showing a portion of the hand unit of the present invention diagrammatically shown in FIG. 1.

As mentioned before, the automatic vehicle monitoring apparatus 10 includes a hand unit 30 and the hand unit 30 is constructed exactly like the signpost unit 12 except the hand unit 30 also includes a data entry assembly 150 which is connected to the signpost encoder 130 by a predetermined number (J) of parallel data entry signal paths 152, the first and the last or (Jth) data entry signal path being specifically shown in FIG. 8 and designated therein via the reference numerals 152A and 152B for the purpose of clarity. In one preferred form, the data entry assembly 150 is constructed to permit the predetermined message bits comprising the signpost code to be manually entered into the data entry assembly 150 in a predetermined code format (the sequence of "ones" and "zeros" comprising the signpost code) and connected to the digital encoder 130 via the data entry signal paths 152. More particularly, one switch 154 is interposed in each signal path, the switch interposed in the first and the last signal paths 152A and 152B being shown in FIG. 8 and designated therein via the reference numerals 154A and 154B for clarity. Each switch 154 has 3 positions: an "off" position (shown in FIG. 8); a first position wherein the switch arm contactingly engages a terminal 156 connecting the signpost encoder 130 to ground via one of the signal paths 152; and a second position wherein the switch arm contactingly engages a terminal 158 connecting the signpost encoder to a 5 volt DC power supply 160 via one of the signal paths 152 (the switches 154 and associated elements being designated in FIG. 8 via reference numerals and the letters "A" and "B" for clarity). Thus, when any one of the switches 154 is positioned in the first position connecting the signal path to ground, a voltage level representing a logical "zero" is entered into the signpost encoder 130 and when any one of the switches 154 is positioned in the second position connecting the signal path to a five volt power supply, a voltage level representing a logical "one" is entered into the signpost encoder 130.

The hand unit 30 provides a mobile, transportable unit capable of transmitting a predetermined code for reception via a vehicle unit 16 in a manner like that described before with respect to the signpost units 12. The utilization of a transportable unit for transmitting predetermined codes is feasible with the automatic vehicle monitoring apparatus 10 since the signpost units 12 do not transmit signpost codes continuously; rather, the signpost units 12 transmit the signpost codes intermittently at predetermined intervals, as described before, and, the code transmitted via the hand unit 30 is receivable on a non-interfering basis during the period of time when the signpost unit 12 is not transmitting the signpost code for reception via the vehicle unit 16.

Vehicle Unit

Figure 9:
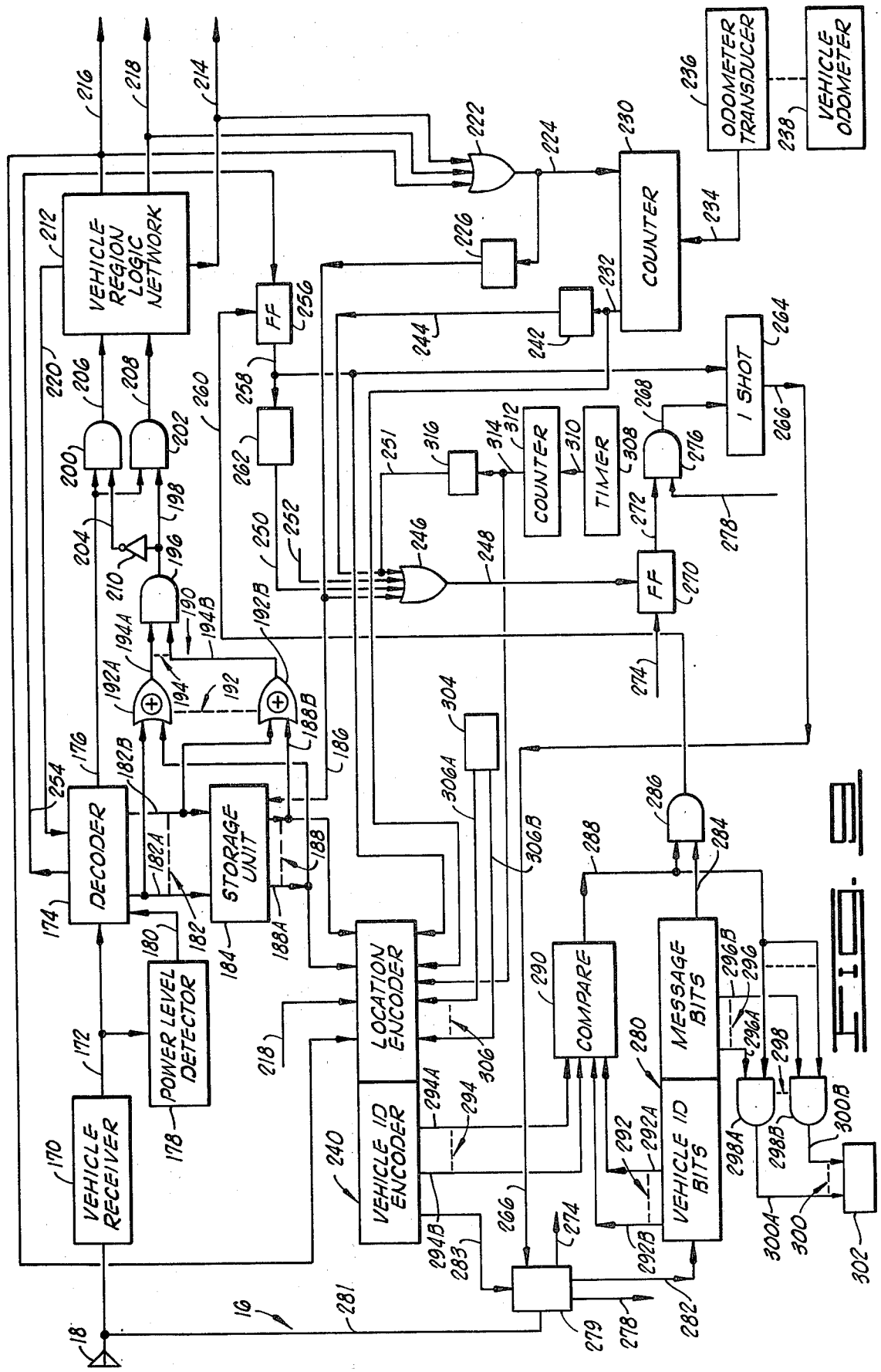
FIG. 9 is a schematic view showing the vehicle unit of the present invention diagrammatically shown in FIG. 1.

One preferred embodiment of the vehicle unit 16 is diagrammatically and schematically shown in greater detail in FIG. 9. The vehicle unit 16 includes a vehicle receiver 170 connected to the vehicle antenna 18 for receiving the signals transmitted via the signpost units 12 encoded with the predetermined signpost codes, the vehicle antenna 18 being the antenna normally utilized in conjunction with an existing vehicle radio unit for voice communication, in one preferred form, as mentioned before. The vehicle receiver 170, more particularly, is a high frequency type of receiver which is preferably capable of operating within a relatively high frequency range, including a frequency of 27 MHz, for example, the high frequency operating range of the vehicle receiver 170 being compatible with the operating frequency of the signpost units 12 and the hand units 30.

The vehicle receiver 170 receives and detects the signals transmitted via the signpost units 12, the detected signals providing a vehicle receiver 170 output signal on a signal path 172. The vehicle receiver 170 is constructed to provide the output signal on the signal path 172 when the signal strength or the power level of the received signal exceeds a predetermined threshold level, and the predetermined threshold level is set via the components of the vehicle receiver 170 such that a vehicle receiver 170 output signal is provided on the signal path 172 only when the power level of the received signal is at least as great as the power level of the signals transmitted via any one of the signpost units 12 within the far-field regions 60, thereby assuring the vehicle receiver 170 provides an output signal only in response to received signals having a minimum, predetermined power level corresponding to the minimum power level of the signals transmitted via the signpost units 12 within the far-field regions. The signpost codes and the accompanying synchronization signal transmitted via the signpost unit 12 or the hand unit 30 are superimposed on the data link carrier signal and communication data link between the signpost units 12 and the vehicle units 16 utilizes the frequency shift key (FSK) encoding technique, the same FSK encoding technique being utilized to establish the data link for the communication data between the hand unit 30 and the vehicle unit 16. The vehicle receiver 170 detects or separates the received FSK frequencies [$(f_s)$ and $(f_m)$] from the data link carrier signal, and the signal frequency of the vehicle receiver 170 output signal has a frequency of $(f_s)$ of $(f_m)$.

The detected signpost receiver 170 output signal on the signal path 172 is connected to a decoder 170, the detected signals encoded with the signpost codes being received by the decoder 170 when the power level of the signal received via the vehicle receiver 170 corresponds to a power level at least equal to the minimum power level of the signals transmitted via the signpost units 12 and received within one of the far-field regions established via the signpost units 12. The decoder 170 demodulates the received FSK vehicle receiver 170 output signal converting the received FSK signals to a binary coded data type of signal and the decoder 174 provides a valid data strobe or signal on signal path 176 in response to a received signal encoded with a signpost code having a predetermined signpost code format. In one preferred form, the valid data signal on the signal path 176 is provided in response to a received predetermined correct code format which is repeatable a predetermined number of times thereby assuring that a correct, valid, predetermined code format derived from the incoming signal received at the vehicle antenna 18 has been entered into a portion of the decoder 174.

The vehicle receiver 170 output signal on the signal path 172 is also connected to and received via a power level detector 178. The power level detector 178 receives the vehicle receiver 170 output signal on the signal path 172 and provides an output signal in the "high" state on a signal path 180 in response to a received signal having a power level or signal strength exceeding a predetermined minimum power level, the predetermined minimum power level of the power level detector 178 being larger than the predetermined minimum power level or threshold setting of the vehicle receiver 170. The minimum power level of the vehicle receiver 170 corresponds to the minimum power level of the signpost unit 12 transmitted signals within the established far-field regions 60 and the minimum power level of the power level detector 178 corresponds to the minimum power level of the signpost unit 12 transmitted signals within the established near-field regions 58. Thus, the vehicle receiver 170 output signal appears on the signal path 172 and the power level detector 178 output signal on the signal path 180 in the "low" state when the vehicle unit 16 is receiving signals transmitted via one of the signpost units 12 within the established far-field region 60, and a vehicle receiver 170 output signal appears on the signal path 172 and the power level detector 178 output signal on the signal path 180 is in the "high" state when the vehicle unit 16 is receiving signals transmitted via one of the signpost units 12 within the established near-field region 58, the state ("high" or "low") of the power level detector 178 indicating the position of the vehicle unit 16 with respect to the near-field regions 58 and the far-field regions 60 established via the signpost units 12.

More particularly, the power level detector 178 output signal on the signal path 180 is connected to a particular bit position in the storage portion of the decoder 174 and the signpost code received in the decoder 174 is modified by the additional code bit provided via the power level detector 174 output signal on the signal path 180 (sometimes referred to herein as "power level bit" or "power level signal"). Thus, when the received signal has a power level or signal strength below the predetermined minimum power level of the power level detector 178 indicating the location of the vehicle unit 16 within the far-field region 60, the power level detector 178 output signal on the signal path 180 is in the "low" state and the signpost code received in the decoder 174 along with the power level bit in the "low" state identifies the location of the vehicle unit 16 as being within the far-field region 60 of the signpost unit 12 identified via the received signpost code. By the same token, when the received signal has a power level or signal strength exceeding the predetermined minimum power level of the power level detector 178, the power level detector 178 output signal on the signal path 180 is in the "high" state and the signpost code received in the decoder 174 along with the power level bit in the "high" state identifies the location of vehicle unit 16 as being within the near-field region 58 of the signpost unit 12 identified via the received signpost code.

The decoder 174 provides the received, decoded signpost code via parallel signal paths 182 connected between the decoder 174 and a storage unit 184 (only the first and the last signal paths 182 being specifically shown in FIG. 9 and designated therein via the reference numerals 182A and 182B for the purpose of clarity), the signal on each of the parallel signal paths 182 representing one binary bit of the signpost code and the signal on one of the signal paths 182 representing the power level bit. The storage unit 184 is constructed to receive and store a signpost code and accompanying power level bit connected thereto from the decoder 174 via the signal paths 182 in response to receiving a signal in the "high" state via a signal path 186, the storage unit 184 providing the stored signpost code and accompanying power level bit via parallel signal paths 188 connected between the storage unit 184 and a comparison logic network 190 (only the first and the last of the parallel signal paths being shown in FIG. 9 and designated via the reference numerals 188A and 188B, respectively, for clarity). The storage unit 184 is a commercially available parallel out type of digital shift register storage unit of the type well-known in the art, in a preferred form.

Each of the signpost codes and accompanying power level bits received via the decoder 174 is stored in the storage unit 184 and the next received signpost code and accompanying power level bit is compared with the signpost code and accompanying power level bit previously stored in the storage unit 184 in response to a signal in the "high" state on the signal path 186. The received signpost code and accompanying power level bit and the previously received signpost code and accompanying power level bit are compared via the comparison logic network 190.

The comparison logic network 190 includes a predetermined number of exclusive OR gates 192, only two of the OR gates 192 being shown in FIG. 2 and designated therein via the reference numerals 192A and 192B for clarity. Each of the signal paths 182 is connected to one of the exclusive OR gates 192 and thus each of the exclusive OR gates 192 receives a signal representing one of the bits of the signal code including the accompanying power level bit stored in the decoder 174 via one of the exclusive OR gate 192 intputs, the signal path 182A being shown in FIG. 9 connected to the input of the exclusive OR gate 192A and the signal path 182B being shown in FIG. 9 connected to the input of the exclusive OR gate 192B. Each of the signal paths 188 is connected to one of the OR gates 188 and thus each of the OR gates 188 receives a signal representing one of the bits of the signpost code including the accompanying power level bit stored in the storage unit 184 via one of the exclusive OR gates 192 inputs, the signal path 188A being shown in FIG. 9 connected to the input of the exclusive OR gate 192A and the signal path 188B being shown in FIG. 9 connected to the input of the exclusive OR gate 192B.

Each of the exclusive OR gates 192 provides an output signal on one of the signal paths 194 connected thereto, only the first and the last signal paths 194 being shown in FIG. 9 and designated therein via the reference numerals 194A and 194B. As shown in FIG. 9, the signal path 194A more particularly is connected to the exclusive OR gate 192A and the signal path 194B more particularly is connected to the exclusive OR gate 192B, the remaining signal paths 194 (not specifically shown in FIG. 9) being connected to the remaining exclusive OR gates 192 (not specifically shown in FIG. 9) in a manner similar to that described before with respect to the exclusive OR gates 192A and 192B and the signal paths 194A and 194B.

If each bit of the signpost code including the accompanying power level bit in the decoder 174 is identical to each corresponding bit of the signpost code including the accompanying power level bit stored in the storage unit 184, then the signal on each of the signal paths 182 will be identical to the signal on the corresponding signal path 188, i.e. the signal on the signal path 182A will be identical to the signal on the signal path 188A, the signal on the signal path 182B will be identical to the signal on the signal path 188B and the same will be true for the remaining signal paths 182 and 188 which are not specifically shown in FIG. 9. In this mode of operation, assuming each bit of the signpost code including the accompanying power level bit in the decoder 174 is identical to each bit of the signpost code including the accompanying power level bit stored in the storage unit 184, the input signals to each of the exclusive OR gates 192 will be identical and both input signals will be either "high" or "low" depending on the logical state of the bit of the signpost code including the power level bit represented via the particular input signals, each exclusive OR gate 192 providing an output signal on one of the signal paths 194 in the "low" state in response to identical, received signals. If any bit of the signpost code including the accompanying power level bit in the decoder 174 is not identical to the corresponding bit of the signpost code and accompanying power level bit stored in the storage unit 184, the input signals on the signal paths 182 and 184 representing the logical level of the particular bits of the two signpost codes including the accompanying power level bits are different and the exclusive OR gate 192 receiving the two different input signals provides an output signal in the "high" state. Thus, an exclusive OR gate 192 output signal in the "high" state on any one of the signal paths 194 indicates that the signpost code and the accompanying power level bit received in the decoder 174 differs from the signpost code and the accompanying power level bit stored in the storage unit 184, i.e. the signpost codes including the accompanying power level bits in the decoder 174 and the storage unit 184 are not identical.

The output signals from the exclusive OR gates 192 provided on the signal paths 194 are each connected to the input of a NAND gate 196, the NAND gate 196 receiving each of the exclusive OR gate 192 output signals and providing a NAND gate 196 output signal in the "high" state on a signal path 198 if any one of the received signals on the signal paths 194 is in the "high" state. Thus, if one bit of the signpost code including the accompanying power level bit received in the decoder 174 is not identical to the corresponding bit of the signpost code including the accompanying power level bit stored in storage unit 184, then one of the exclusive OR gate 192 output signals will be in the "high" state and the NAND gate 196 provides an output signal in the "high" state indicating the signpost codes including the accompanying power level bits in the decoder 174 and the storage unit 184 are not identical. A NAND gate 196 output signal provided on the signal path 196 in the "low" state indicates that the signpost codes including the accompanying power level bits in the decoder 174 and the storage unit 184 are identical.

The comparison logic network 190 includes a first AND gate 200 and a second AND gate 202. The first AND gate 200 receives the valid data signal provided on the signal path 176 and a signal on a signal path 204, the first AND gate 200 providing an output signal in the "high" state on a signal path 206 in response to receiving signals on the signal paths 176 and 204 in the "high" state. The second AND gate 202 receives the valid data signal provided on the signal path 176 and the NAND gate 196 output signal on the signal path 198, the second NAND gate 202 providing an output signal on a signal path 208 in the "high" state in response to receiving signals on the signal paths 176 and 198 in the "high" state.

An inverter 210 is interposed in the signal path 204. The inverter 210 receives the NAND gate 196 output signal on the signal path 198 and provides the inverter 210 output signal on the signal path 204. The inverter 210 provides an output signal in the "high" state in response to receiving a signal in the "low" state and provides an output signal in the "low" state in response to receiving a signal in the "high" state.

When the signpost codes including the accompanying power level bits in the decoder 174 and the storage unit 184 are identical, each of the exclusive OR gate 192 output signals are in the "low" state, the NAND gate 196 output signal is in the "low" state and the AND gate 202 output signal is in the "low" state since the input signal on the signal path 176 is in the "high" state and the input signal on the signal path 198 is in the "low" state, the AND gate 200 output signal on the signal path 206 being in the "high" state since the received signal on the signal path 176 is in the "high" state and the signal on the signal path 204 is in the "high" state (the inverter 210 receiving the NAND gate 196 output signal in the "low" state and providing the output signal on the signal path 204 in the "high" state). Thus, the comparison logic network 190 receives the signpost codes and accompanying power level bits in the decoder 174 and the storage unit 184 and provides an output signal on the signal path 206 in the "high" state in response to received, identical signpost codes and power level bits.

When the signpost codes and accompanying power level bits in the decoder 174 and the storage unit 184 are different, one or more of the exclusive OR gate 192 output signals is in the "high" state, the NAND gate 196 output signal is in the "high" state and the AND gate 202 output signal on the signal path 208 is in the "high" state since the input signal on the signal path 176 is in the "high" and the input signal on the signal path 198 is in the "high" state, the AND gate 200 output signal on the signal path being in the "low" state since the received signal path 176 is in the "high" state and the signal on the signal path 204 is in the "low" state (the inverter 210 receiving the NAND gate 196 output signal in the "high" state and providing the output signal on the signal path 204 in the "low" state). Thus, the comparison logic network 190 receives the signpost codes and accompanying power level bits in the decoder 174 and the storage unit 184 and provides an output signal on the signal path 208 in the "high" state in response to received, different signpost codes and power level bits.

A vehicle region logic network 212 receives the comparison logic network 190 output signals on the signal paths 206 and 208. The vehicle region logic network 212 is constructed to determine whether a signpost code being received via the vehicle unit 16 and the accompanying power level bit are identical to the signpost code previously received via the vehicle unit 16 and the accompanying power level bit, the vehicle region logic network 212 providing an output signal in the "high" state on a signal path 214 in response to a new signpost code being received consecutively and repeatably a predetermined number of times. The vehicle region logic network 212 also is constructed to determine whether two different signpost codes are being received in an alternating manner a predetermined number of times via the vehicle unit 16, the vehicle region logic network 212 providing an output signal in the "high" state on a signal path 216 in response to the alternatingly received signpost codes. The vehicle region logic network 212 also is constructed to determine when the vehicle unit 16 ceases to alternatingly receive two different signpost codes and begins to receive one signpost code indicating a vehicle unit 16 has moved from one of the overlap regions 66, the vehicle region logic network 212 providing an output signal in the "high" state on a signal path 218 in response to the condition indicating a vehicle unit 16 has moved from one of the overlap regions 66. The vehicle region logic network 212 also is constructed to determine whether the same signpost code is being repeatably received via the vehicle unit 16 and the vehicle region logic network 212 provides a reset signal on a signal path 220 in response to such condition. Thus, the vehicle logic network 212 provides the output signal on the signal path 214 indicating the vehicle unit 16 has moved from one of the near-field regions 58 into one of the far-field regions 60 or from one of the far-field regions 60 into one of the near-field regions 58; the vehicle region logic network 212 provides a signal on the signal path 216 indicating the vehicle unit 16 is located within one of the overlap regions 66; the vehicle region logic network 212 provides a signal on the signal path 218 indicating the vehicle unit 16 has moved from one of the overlap regions 66; and the vehicle region logic network 212 provides a reset signal on the signal path 220 indicating the vehicle unit 16 has remained within one of the near-field regions 58 or within one of the far-field regions 60.

The vehicle region logic network 212 output signals on the signal paths 214, 216 and 218 are each connected to and received by an OR gate 222 and the OR gate 222 provides an output signal on a signal path 224 in the "high" state when any one of the received signals on the signal paths 214, 216 and 218 is in the "high" state, the OR gate 222 output signal on the signal path 224 being in the "low" state when the signals on the signal paths 214, 216 and 218 are each in the "low" state. The OR gate 222 output signal on the signal path 224 is connected to and received via a one-shot multivibrator 226, and the one-shot multivibrator 226 provides an output signal on the signal path 186 in response to a received signal on the signal path 224 in the "high" state, the one-shot multivibrator 226 output signal in the "high" state having a predetermined duration and providing the strobe signal received via the storage unit 184 causing the signpost code and accompanying power level bit in the decoder 174 to be transferred to the storage unit 184 via the signal paths 182.

The OR gate 222 output signal is connected to and received via a digital counter 230 which is constructed to provide an output signal in the "high" state on a signal path 232 in response to receiving a predetermined number of input pulses via a signal path 234. The OR gate 222 output signal provides what is sometimes referred to herein as the "counter 230 reset signal", and the counter 230 is constructed such that the counter 230 is reset and must receive the predetermined number of input pulses before providing the output signal in the "high" state.

In the embodiment of the invention shown in FIG. 9, the counter 230 input signal pulses on the signal path 236 are provided via an odometer transducer 236. The odometer transducer 236 is mechanically connected to the vehicle 20 odometer 238 and the odometer transducer 236 provides an output signal pulse in response to the mechanical movement of the odometer 238 indicating the movement of the vehicle 20 a predetermined distance. Thus, the counter 230 output signal on the signal path 232 provides an indication of the distance of travel of the vehicle 20; however, the counter 230 output signal indicating the distance of travel of the vehicle 20 is provided only when the vehicle 20 has traveled a predetermined distance sufficient to produce the required predetermined number of input pulses to the counter 230 on the signal path 234 and the vehicle unit 16 has not received a signpost code at any time during the travel of the vehicle 20 through this predetermined distance since the counter 230 is reset via the OR gate 222 output signal in the "high" state and the OR gate 222 output signal is produced in the "high" state in response to a received signal in the "high" state on any of the signal paths 214, 216 and 218 indicating the vehicle unit 16 is receiving one or more signpost codes.

The counter 230 output signal on the signal path 232 is connected to and received via a predetermined bit position of an encoder 240 causing a predetermined bit (sometimes referred to herein as a "distance code bit") to be encoded in the encoder 240 in response to a received counter 230 output signal in the "high" state indicating the travel of the vehicle 20 through a predetermined distance without receiving at least one signpost code, for reasons to be described in greater detail below.

The encoder 240 includes a predetermined number of bit positions permanently encoded with a vehicle identification code uniquely identifying the vehicle unit 16 or, in other words, uniquely identifying the particular vehicle 20, the bit positions permanently encoded with the vehicle identification code being symbolically shown in FIG. 9 and designated via the reference "VEHICLE ID ENCODER". The encoder 240 also includes a predetermined number of bit positions for receiving signpost codes and accompanying power level bits indicating the location of the vehicle within the monitored area, the bit positions receiving the signpost codes and power level bits being symbolically shown in FIG. 9 and designated via the reference "LOCATION ENCODER".

The encoder 240 also receives the vehicle region logic network 212 output signal on the signal path 216 connected to a predetermined bit position in the LOCATION ENCODER portion of the encoder 240, the state ("high" or "low") of the signal on the signal path 216 encodes a binary coded bit in the encoder 240, the encoded bit indicating that the vehicle unit 16 has alternatingly received two signpost codes a predetermined number of times thereby indicating the vehicle unit 16 location within the overlap region 66 defined via the alternatingly received signpost codes. The location encoder portion of the encoder 240 more particularly receives and stores the pseudo-signpost codes uniquely identifying the various overlap regions 66 along with the bit indicating the pseudo-signpost code identifies an overlap region 66.

The distance reporting mode of the vehicle unit 16, in part, controlled via the odometer 238, the odometer transducer 236 and the counter 230, is particularly useful in those applications where the monitored vehicles travel along known, fixed routes and it is not economically feasible to locate signpost units 12 along the fixed route at a spacing sufficient to monitor the vehicle 20 movement or location at each point along the fixed route utilizing the signpost units 12, such as when monitoring vehicles like buses traveling along crosscountry routes, for example. The operation of the distance reporting aspect of the vehicle unit 16 is automatically disengaged or disabled via the OR gate 222 output signal in the "high" state indicating the vehicle unit 16 is receiving at least one signpost code and thus the same vehicle unit 16 is also operational when the vehicle 20 is located within an area monitored via the signpost units 12, i.e. the operation of the distance reporting aspect of the present invention and the operation of the signpost unit 12 monitoring of the present invention are mutually exclusive and the vehicle unit 16 is constructed to utilize both features on a non-interfering basis. The number of distance bits comprising the distance code encoded in the encoder 240 depends upon the resolution and the signpost configuration in a particular application. For example, assuming a signpost unit 12 is located at one mile intervals (12 block intervals) and the odometer or distance reporting is selected at three block intervals, then the distance code can comprise two distance bits and the signal path 232 connected to the encoder 240, more particularly, would include a signal path connected to two bit positions in the encoder 240. In this example, when the vehicle 20 is located at a signpost unit 12 location, the signal paths 232 would each be in the "low" state thereby encoding a distance code of "0—0" in the encoder 240. When the vehicle 20 moves from the signpost unit 12 location through a distance of three blocks, one of the signal paths 232 is switched to the "high" state thereby encoding a distance code of "0–1" in the encoder 240. When the vehicle 20 moves through a second three block distance (i.e. six blocks from the signpost unit 12 location), one of the signal paths 232 is switched to the "high" state and the other signal path 232 remains or is switched to the "low" state depending on the initial condition thereof, thereby encoding a distance code of "1-0" in the encoder 240. When the vehicle 20 moves through a third three block distance (i.e. nine blocks from the signpost unit 12 location), each of the signal paths 232 are switched to the "high" state, thereby encoding a distance code of "1-1" in the encoder 240. When the vehicle 20 moves through a fourth three block distance (i.e. twelve blocks from the initial signpost unit 12 location), the signal paths 232 are each switched to the "low" state, thereby encoding a distance code of "0-0" in the encoder 240 since the vehicle 20 will be located at another signpost unit 12 location due to the twelve block or one mile distance reporting resolution as mentioned before.

The counter 230 output signal on the signal path 232 is connected to and received by a one-shot multivibrator 242 and the one-shot multivibrator 242 provides an output signal on a signal path 244 in response to a received counter 230 output signal in the "high" state, the one-shot multivibrator 242 output signal in the "high" state having a predetermined duration. The one-shot multivibrator 242 output signal on the signal path 244 is connected to and received via one of the inputs of a multi-input OR gate 246, the OR gate 246 providing an output signal in the "high" state on a signal path 248 in response to a received input signal on any one of the input signal paths connected thereto. The OR gate 246 also receives the one-shot multivibrator 226 output signal on the signal path 186, a signal on a signal path 250, a signal on a signal path 251, and a signal on a signal path 252, the OR gate 246 providing an output signal in the "high" state on the signal path 248 in response to receiving any one of the input signals in the "high" state on the input signal paths 186, 244, 250, 251 and 252.

The decoder 174 is also constructed to receive predetermined special time division binary codes sometimes referred to herein as "emergency codes", and the decoder 174 includes a network for sensing or detecting such special codes, networks constructed to detect special codes received via digital shift registers being well-known in the art. The decoder 174 provides a signal in the "high" state on a signal path 254 in response to detecting a received, special or emergency code, the signal on the signal path 254 being received by and connected to a flip-flop network 256.

The flip-flop network 256 provides an output signal in the "high" state on a signal path 258 in response to a received signal in the "high" state on the signal path 254. The flip-flop network 256 output signal on the signal path 258 remains in the "high" state until the flip-flop network 256 receives a reset signal in the "high" state via a signal path 260 causing the flip-flop network 256 output signal on the signal path 258 to be changed from the "high" to the "low" state.

The flip-flop network 256 output signal on the signal path 258 is connected to and received by a monostable multivibrator 262. The monostable multivibrator 262 is conditioned in the "on" condition operating at a fixed, predetermined rate in response to a received signal in the "high" state on the signal path 258, and the multivibrator continues to provide the output signal on the signal path 250 until the flip-flop network 256 output signal on the signal path 258 changes or returns from the "high" to the "low" state, for reasons to be described in greater detail below.

The flip-flop network 256 output signal on the signal path 258 is also connected to and received by a one-shot multivibrator 264. The one-shot multivibrator 264 provides an output signal on a signal path 266, and the time period of the one-shot multivibrator 264 output signal is a predetermined, fixed value, the vehicle units 16 being constructed such that the time constant of the one-shot multivibrator 264 has a different value for each vehicle unit 16, i.e. each one-shot multivibrator 264 has a predetermined time constant which is unique to the particular vehicle unit 16 and is different from any other vehicle unit 16 monitored via the automatic vehicle monitoring apparatus 10 of the present invention (the predetermined time constant of the multivibrator 264 being sometimes referred to herein as the "operating time constant"). Further, the one-shot multivibrator 264 receives a signal via the signal path 258 and the one-shot multivibrator 264 is constructed such that the time constant is lowered to a predetermined fixed value sometimes referred to herein as the "priority time constant", the priority time constant being lower or shorter than the predetermined operating time constant of any of the vehicle units 16 monitored via the automatic vehicle monitoring apparatus 10 of the present invention. Thus, in response to a received emergency code, the time constant of the one-shot multivibrator 264 is lowered to the "priority time constant" to facilitate the transmission of signals from the vehicle unit 16 receiving the emergency code.

The flip-flop network 256 output signal on the signal path 258 is also connected to a predetermined bit position of the encoder 240. When the flip-flop network 256 output signal is in the "high" state, the predetermined special code bit position in the encoder 240 is caused to go "high", thereby encoding a special bit in the encoder 240 sometimes referred to herein as an "emergency code bit".

The OR gate 246 output signal on the signal path 248 is connected to and received via a flip-flop network 270. The flip-flop network 270 provides an output signal in the "high" state on a signal path 272 in response to a received signal in the "high" state on the signal path 248 and the flip-flop network 270 output signal remains in the "high" state until the flip-flop network 270 receives a reset signal in the "high" state via a signal path 274 causing the flip-flop network 256 output signal to be changed from the "high" to the "low" state, a signal in the "high" state being produced on the signal path 274 when the transmission of binary coded data from the vehicle unit 16 to the base station 22 is completed, in a manner and for reasons to be described in greater detail below.

The flip-flop network 270 output signal on the signal path 272 is connected to one of the inputs of an AND gate 276 and a signal on a signal path 278 is connected to the other input of the AND gate 276. The AND gate 276 receives the signals on the signal paths 272 and 278 and produces an AND gate 276 output signal in the "high" state on the signal path 268 in response to receiving signals on the signal paths 272 and 278 in the "high" state.

The signal on the signal path 278 is produced by the radio interface connected to the vehicle existing radio transmitter-receiver and the radio interface is constructed to produce a signal in the "high" state on the signal path 278 when the radio transmitter-receiver is not being utilized for voice communication, the signal on the signal path 278 in the "high" state indicating the radio transmitter-receiver is available for transmission and reception of binary coded data. The radio interface also is constructed to provide the output signal in the "high" state on the signal path 274 indicating the completion of the transmission of the binary coded data via the vehicle unit 16.

As mentioned before, the vehicle unit 16 is constructed to be utilized with an existing radio transmitter-receiver of the type normally utilized for voice communication between the base station 22 and the vehicle 20, the existing radio transmitter-receiver including the radio interface being diagrammatically shown in FIG. 9 and designated therein via the reference 279. The vehicle transmitter-receiver 279 is connected to the vehicle antenna 18 via a signal path 281, the vehicle transmitter-receiver 279 being utilized to transmit binary coded data received from the vehicle unit 16 via a signal path 283 to the base station 22 via the vehicle antenna 18 and to receive binary encoded signals transmitted from the base station 22 and received via the vehicle antenna 18 when the radio transmitter-receiver 279 is not being utilized for voice communication.

Figure 14:
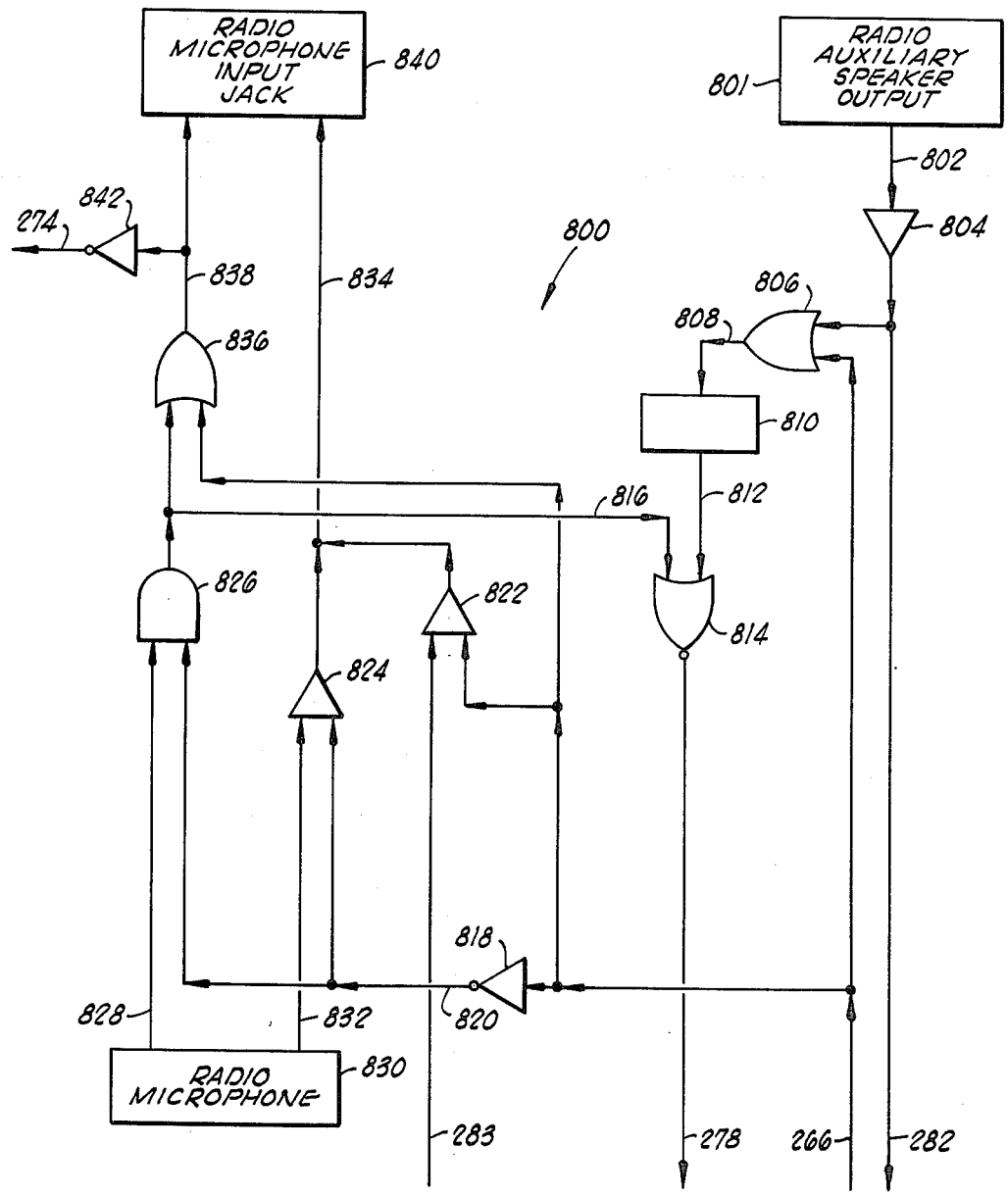
FIG. 14 is a schematic view showing one preferred embodiment of the radio interface of the present invention.

The construction of one preferred embodiment of a radio interface is shown in FIG. 14 and the construction and the operation of the radio interface shown in FIG. 14 will be described in greater detail below. In any event, when the vehicle radio transmitter-receiver 279 is available for the transmission or the reception of binary coded data, the signal on the signal path 278 is "high" and, if the flip-flop network 270 is producing an output signal in the "high" state, the AND gate 276 output signal on the signal path 268 is in the "high" state causing the time constant of the one-shot multivibrator 264 to be changed from the operating time constant to the priority time constant.

The one-shot multivibrator 264 output signal on the signal path 266 is "high" in response to receiving a signal in the "high" state on the signal path 248 and the one-shot multivibrator 264 output signal remains in the "high" state for a predetermined period of time, the one-shot multivibrator 264 output signal changing from the "high" state to the "low" state after the lapse of the predetermined period of time. The multivibrator 264 output signal on the signal path 266 is connected to and received via the radio transmitter-receiver 279 and, when the multivibrator 264 output signal goes from a "high" state to a "low" state, the binary coded data in the encoder 279 is connected to the radio transmitter-receiver 279 via the signal path 283 and transmitted via the vehicle antenna 18 for reception via the base station 22. The vehicle unit 16 transmission of binary coded data is terminated via the generation of the signal in the "high" state on the signal path 274.

The vehicle unit 16 decoder 174 receives and detects emergency codes and the encoder 240 is encoded with an emergency code bit in response to such a received, detected emergency code, the flip-flop network 256 providing the output signal in the "high" state until reset via a reset signal on the signal path 260 in this mode of operation as generally described before. The signals encoded with the emergency code bit are transmitted to the base station 22 and the base station 22 transmits a signal acknowledging reception of the signal encoded with the emergency code bit which is received by the vehicle unit 16 radio transmitter-receiver 279 and connected to an identification decoder 280 via a signal path 282.

The identification decoder 280 has a predetermined number of bit positions allocated for receiving message code bits and a predetermined number of bit positions for receiving vehicle identification codes or location codes. The bit positions allocated for receiving message code bits being diagrammatically shown in FIG. 9 and designated via the reference "MESSAGE BITS", the message bit positions also being utilized for receiving special codes via the signal path 232 and 258. The identification decoder 280 also includes a predetermined number of bit positions for receiving a vehicle identification code and the bit positions receiving the vehicle identification code or location code are symbolically shown in FIG. 9 and designated via the reference "VEHICLE ID BITS". It should be noted that certain bit positions in the portion of the identification decoder 280 are allocated for special codes in a manner and for reasons to be described below.

The signal generated and transmitted via the base station 22 acknowledging the reception of the signal encoded with the emergency code bit is encoded with a code bit in the "high" state and the code bit in the "high" state occupies a predetermined bit position in the MESSAGE BITS portion of the identification decoder 280, the signal path 284 being connected to the bit position in the identification decoder 280 receiving the code bit indicating the reception of the emergency code via the base station 22. The signal on the signal path 284 is connected to one of the inputs of an AND gate 286 and a signal path 288 is connected to the other input of the AND gate 286. The AND gate 286 provides the output signal in the "high" state on the signal path 260 in response to receiving signals on the signal paths 284 and 288 in the "high" state.

The signal received on the signal path 282 acknowledging the reception of the emergency code at the base station 22 is also encoded with a time division binary vehicle code uniquely identifying the particular vehicle unit 16 which transmitted the emergency signal, the received signal being decoded and the vehicle code encoded therein being stored in the VEHICLE ID BITS portion of the identification decoder 280. The vehicle code received via the identification decoder 280 is connected to a compare network 290 via parallel signal paths 292, only the first and the last parallel signal paths being shown in FIG. 9 and designated therein via the numeral references 292A and 292B. The vehicle code permanently encoded in the VEHICLE ID ENCODER portion of the encoder 240 is connected to the compare network 290 via parallel signal paths 294, only the first and the last parallel signal paths being shown in FIG. 9 and designated therein via the reference numerals 294A and 294B.

The compare network 290 is constructed to compare each bit of the vehicle code in the encoder 240 with each bit of the vehicle code in the identification decoder 280 and provide an output signal in the "high" state on the signal path 288 in response to identical vehicle codes received via the signal paths 292 and 294. Thus, the AND gate 286 output signal in the "high" state is provided only when the received vehicle code is identical with the vehicle code permanently encoded in the encoded 240 as indicated via the compare network 290 output signal in the "high" state and when the signal on the signal path 284 is in the "high" state indicating the reception of the emergency signal via the base station 22. One preferred embodiment of the compare network 290 is constructed exactly like the OR gates 192, the NAND gate 196 and the inverter 210 portion of the comparison logic network 190 described in detail before, the signal on the signal path 288 being produced in a manner like the signal on the signal path 204.

In one preferred embodiment, the vehicle unit 16 is constructed to report messages to the vehicle operator (sometimes referred to herein as "vehicle operator messages" or the "vehicle operator message code"), the vehicle operator messages being originated at the base station 22 and transmitted to the vehicle unit 16 via the transmitter portion of the base station receiver-transmitter in the form of time division binary coded messages. The vehicle code uniquely identifying the particular vehicle 20 is transmitted along with the vehicle operator message so the vehicle unit 16 can identify and verify the particular vehicle 20 designated to receive the vehicle operator message.

The transmitted operator message code and vehicle code is received via the vehicle antenna 18, connected to the transmitter-receiver 279 via the signal path 281 and connected to the vehicle unit 16 via the signal path 282, the vehicle operator message code and accompanying vehicle code more particularly being received via the identification decoder 280. The vehicle code received via identification decoder 280 is compared with the vehicle code permanently encoded in the encoder 240 via the compare network 290 in a manner described before, the compare network 290 output signal being "high" in response to received identical vehicle codes from the identification decoder 280 and the encoder 240. The vehicle operator message is received via the identification decoder 280 and, more particularly, the vehicle operator message is stored in the MESSAGE BITS portion of the identification decoder 280. Each of the received message bits of the vehicle operator message code is provided on one of a plurality of parallel signal paths 296 connected to the input of one of a plurality of AND gates 298 (only the first and the last of the AND gates 298 being shown in FIG. 9 and designated therein via the reference numerals 298A and 298B). Each AND gate 298 also receives the compare network 290 output signal on the signal path 288 and each AND gate 298 provides an output signal on one of a plurality of signal paths 300 (only the first and the last signal path 300 being shown in FIG. 9 and designated via the reference numerals 300A and 300B). The state ("high" or "low") of the signal on each signal path 300 corresponds to the state ("high" or "low") of the operator message code bit in the MESSAGE BITS portion of the identification decoder 280 when receiving an input signal in the "high" state on the signal path 288 connected thereto indicating the received vehicle code compares identically with the vehicle code stored in the encoder 240. Each AND gate 296 output signal on one of the signal paths 300 is connected to and received via an operator display 302 constructed to receive the vehicle operator message code and provide an operator-perceivable output indication thereof.

The vehicle unit 16 includes an operator unit 304 constructed to allow the vehicle operator to transmit a predetermined status message code to the base station 22. More particularly, the operator unit 304 includes a data entry assembly (not specifically shown in FIG. 9) comprising thumbwheels or push-buttons arranged to permit the vehicle operator to manually enter a binary status code into a predetermined portion of the LOCATION ENCODER portion of the encoder 240 (or between the LOCATION ENCODER and the VEHICLE ID ENCODER in some embodiments as desired in a particular application), the status code being provided on parallel signal paths 306 (only the first and the last signal path being shown in FIG. 9 and designated therein via the reference numerals 306A and 306B). The parallel signal paths 306 are each connected to the encoder 240 and the status code entered by the vehicle operator appearing on the signal paths 306 is encoded in the encoder 240. In addition, the operator unit 304 includes a portion arranged to permit the operator to manually cause a signal in the "high" state to appear on the signal path 252 connected to the operator unit 304 and the OR gate 246 causing the OR gate 246 to provide an output signal in the "high" state, thereby initiating the transmission of the vehicle code, the location code, and the status code in the encoder 240.

In a preferred embodiment, the vehicle unit 16 includes: a digital timer 308 which provides output pulses on a signal path 310 at a predetermined time rate; a digital counter 312 receiving the timer 308 output pulses via the signal path 310 and providing an output signal on a signal path 314 in response to receiving a predetermined number of input pulses connected thereto from the timer 308, the counter 312 output signal on the signal path 314 indicating a predetermined time lapse since the timer 308 produces the pulses at a predetermined time rate; and a one-shot multivibrator 316 receives the counter 312 output signal via the signal path 314 and provides an output signal having a predetermined time duration on the signal path 251 in response to the received counter 312 output signal. The counter 312 output signal on the signal path 314 is also connected to a predetermined bit position or bit positions in the LOCATION ENCODER portion of the encoder 240 for encoding a "time bit" or "time code" in the "high" state of the counter 312 output signal.

The OR gate 222 output signal is connected to and received by the digital counter 312 and provides what is sometimes referred to herein as the "counter 312 reset signal", the counter 312 being reset in response to a received reset signal on the signal path 224 in a manner similar to the counter 230. The counter 312 output signal is provided only when a predetermined time has lapsed and the vehicle unit 16 has not received a signpost code during the lapsed time period since the counter 312 is reset via the OR gate 222 output signal in the "high" state and the OR gate 222 output signal is produced in the "high" state in response to a received signal on any of the signal paths 214, 216 and 218 indicating the vehicle unit 16 is receiving one or more signpost codes. Thus, the time code provides an indication of the time which has lapsed since the vehicle 20 first entered into a particular coverage region, and the lapsed time reporting and the signpost unit 12 reporting are mutually exclusive in a manner similar to that described before with respect to the distance reporting.

In summary, the vehicle unit 16 receives signpost codes and the emergency codes via the vehicle radio antenna 18 and the vehicle receiver 170, and the vehicle unit 16 transmits the distance signal or the status signal or the emergency signal or the location signal via the vehicle radio antenna 18 and the existing vehicle radio transmitter-receiver 279. As mentioned before, it is contemplated that the vehicle unit 16 be interfaced and utilized in conjunction with an existing vehicle radio transmitter-receiver which is normally utilized for voice communication; however, in some applications, it may be necessary to install a separate or new radio transmitter-receiver unit. In any event, the vehicle unit 16 is constructed to interface with the vehicle radio transmitter-receiver 279 such that the operation of the vehicle unit 16 does not interfere with the voice communication operation of the radio transmitter-receiver 279.

In the automatic reporting mode, when the vehicle unit 16 is located within one of the coverage regions (the nearfield region 58, the far-field region 60 and the overlap region 66) established by the signpost units 12, the signpost codes transmitted via the signpost units 12 establishing the coverage regions are received and detected by the vehicle receiver 170, and the detected binary pulses comprising the received signpost codes are connected to the decoder 174 when the signal strength or power level of the received signal exceeds the predetermined threshold setting of the vehicle receiver 170. After a received support code has been determined to have a proper, predetermined code format, the received signpost code in the decoder 174 is compared with the previously received signpost code in the storage unit 184 via the comparison logic network 190, the comparison logic network 190 providing an output signal in the "high" state on the signal path 206 indicating the compared signpost codes are identical and providing an output signal in the "high" state on the signal path 208 indicating the compared signpost codes are different.

In the automatic reporting mode, when the vehicle unit 16 is located within the near-field region 58 or within the far-field region 60 of one of the signpost units 12, the vehicle unit 16 receives the same signpost code in a repetitive manner including the same power level bit. In this condition, the vehicle region logic network 212 receives a signal in the "high" state on the signal path 206 indicating the signpost code and accompanying power level bit received in the decoder 174 is identical to the previously received signpost code and accompanying power level bit in the storage unit 184. The vehicle region logic network 212 provides the output signal in the "high" state on the signal path 220 which is received via the decoder 174 resetting the decoder 174 to receive a new signpost code over the decoder 174 input signal path 172 and to receive the power level bit accompanying the newly received signpost code via the power level detector 178 output signal path 180. The vehicle region logic network 212 output signal paths 214, 216 and 218 are each in the "low" state in response to a received signpost code identical to the previously received signpost code, and thus the OR gate 222 output signal on the signal path 224 is in the "low" state. Thus, a new signpost code is not transmitted via the vehicle unit 16 and the received signpost code is not transferred to the storage unit 184 indicating the vehicle unit 16 has remained in the last reported location within the monitored area.

In the automatic reporting mode, when the vehicle unit 16 is moved from the near-field region 58 into the far-field region 60 of one of the signpost units 12 and when the vehicle unit 16 is moved from the far-field region 60 into the near-field region 58 of one of the signpost units 12, the signpost code and accompanying power level bit received in the decoder 174 are not the same as the signpost code and accompanying power level bit in the storage unit 184 (the signpost codes are identical; however, the power level bits are different since the power level bit is in the "high" state in response to a received signal having a signal strength above a predetermined minimum value indicating the location of the vehicle unit 16 within the near-field region 58 of the signpost unit 12 uniquely identified signpost code and the power level bit is in the "low" state in response to a received signal having a signal strength below the predetermined minimum value indicating the location of the vehicle unit 16 within the far-field region 60 of the signpost unit 12 uniquely identified via the received signpost code. In this condition, the comparison logic network 190 output signal on the signal path 208 is "high" in response to each received signpost code and accompanying power level bit different from the signpost code and accompanying power level bit in the storage unit 184. The vehicle region logic network 212 provides the output signal on the signal path 214 in the "high" state in response to the new signpost code and accompanying power level bit being received in a repetitive manner a predetermined number of times. The OR gate 222 receives the signal in the "high" state on the signal path 214 and provides an output signal in the "high" state on the signal path 224 which is received via the multivibrator 226, the multivibrator 226 providing an output signal on the signal path 186 conditioning the storage unit 184 to receive the signpost code and the accompanying power level bit from the decoder 174 via the signal paths 188. The multivibrator 226 output signal in the "high" state is received via the OR gate 246 and the OR gate 246 provides an output signal in the "high" state on the signal path 248 which is received via the flip-flop network 270 and causes the flip-flop network 270 output signal to be switched to the "high" state. If the ratio transmitter-receiver 279 is available for the transmission of binary coded data, the signal on the signal path 278 is in the "high" state and the AND gate 276 provides an output signal in the "high" state on the signal path 268 in response to the received signals in the "high" state on the signal paths 272 and 278, the AND gate 276 output signal being received via the one-shot multivibrator 264 causing the output signal therefrom on the signal path 266 to be changed from the "high" to the "low" state. The multivibrator 264 output signal in the "low" state is received via the ratio transmitter-receiver 279 and the vehicle code and the location code in the encoder 240 are transmitted via the vehicle unit 16 for reception via the base station 22.

In the automatic reporting mode, the signpost code and accompanying power level bit comprising the location code uniquely identify the location of the monitored vehicle within the near-field region 58 or the far-field region 60, depending on the state ("high" or "low") of the power level bit of one particular signpost unit 12 uniquely identified via the transmitted signpost code, and the particular reporting vehicle is uniquely identified via the transmitted vehicle code permanently encoded in the encoder 240, the radio transmitter-receiver 279 receiving the binary coded data from the encoder 240 via the signal path 283 and transmitting the binary coded data via the vehicle antenna 18. After the binary coded data via the vehicle antenna 18. After the binary coded data in the encoder 240 has been transmitted via the ratio trasmitter-receiver 279, the radio transmitter-receiver 279 provides the output signal on the signal path 274 in the "high" state indicating the end of the binary coded data transmission which is received via the flip-flop network 270 resetting the flip-flop network 270 and terminating the transmission of the binary coded data.

In the automatic reporting mode, when the vehicle unit 16 is moved into one of the overlap regions 66, the vehicle unit 16 recives the two signpost codes in an alternating manner transmitted via the signpost units 12 forming the overlap region 66 via the overlapping portions of the far-field regions 60. In this condition, the comparison logic network 190 alternatingly provides output signals in the "high" state on the signal paths 206 and 208, and the vehicle region logic network 212 provides an output signal in the "high" state on the signal path 216 indicating the signpost codes were alternatingly received a predetermined number of times, the signal in the "high" state on the signal path 216 encoding a predetermined bit position of the encoder 240 with a code indicating the signpost code in the encoder 240 was alternating with the last reported signpost code. The OR gate 222 output signal on the signal path 224 is in the "high" state in response to the received input signal in the "high" state on the signal path 216 and the multivibrator 226 produces the output signal on the signa path 186 in response to the received OR gate 222 output signal in the "high" state, the signal in the "high" state on the signal path 186 being received via the storage unit 184 conditioning the storage unit 184 to receive the binary coded data from the decoder 174 and the signal in the "high" state on the signal path 220 being provided to reset the decoder 174 to receive a new signpost code. The multivibrator 226 output signal in the "high" state is received via the OR gate 246 and the OR gate 246 provides the output signal in the "high" state on the signal path 248 which is received via the flip-flop network 270 and causes the flip-flop network 270 output signal to be switched to the "high" state. If the radio transmitter-receiver 279 is available for the transmission of binary coded data, the signal on the signal path 278 is in the "high" state and the AND gate 276 provides an output signal in the "high" state on the signal path 268, and the AND gate 276 output signal being received via the one-shot multivibrator 264 causing the output signal therefrom on the signal path 266 to be changed from the "high" to the "low" state. The multivibrator 264 output signal in the "low" state is received via the radio transmitter-receiver 279 and the vehicle code and the location code in the encoder 240 are transmitted via the vehicle unit 16 for reception via the base station 22. The signpost code and bit encoded via the vehicle region logic network 212 output signal in the "high" state on the signal path 216 identify the location of the monitored vehicle within the overlap region 66 formed via the signpost unit 12 uniquely identified via the transmitted signpost code and the signpost unit 12 uniquely identified via the previously transmitted signpost code, and the particular reporting vehicle is uniquely identified via the transmitted vehicle code permanently encoded in the encoder 240. After the binary coded data in the encoder 240 has been transmitted via the radio transmitter-receiver 279, the radio transmitter-receiver 279 provides the output signal on the signal path 274 in the "high" state which is received via the flip-flop network 270 resetting the flip-flop network 270 and terminating the transmission of the binary coded data.

In the automatic reporting mode, when the vehicle unit 16 is moved from one of the overlap regions 66, the vehicle unit 16 ceases to alternatingly receive two different signpost codes and begins to receive a single signpost code in a repetitive manner causing a series of pulses to appear on the comparison logic network 190 output signal path 206. In this condition, the vehicle region logic network 212 produces an output signal in the "high" state on the signal path 218 indicating that the vehicle unit 16 has been removed from the last reported overlap region 66, the signal on the signal path 216 being in the "low" state encoding a bit in the encoder 240 indicating the same signpost code is being received but the signpost code is not alternating in a manner previously reported when the vehicle unit 16 was located within the last reported overlap region 66. The OR gate 222 output signal on the signal path 224 is "high" in response to the received input signal in the "high" state on the signal path 218 and the multivibrator 226 produces an output signal on the signal path 186 in response to the received OR gate 222 output signal, the signal in the "high" state being received via the storage unit 184 conditioning the storage unit 184 to receive the binary coded data from the decoder 174 and the signal in the "high" state on the signal path 220 being provided to reset the decoder 174 to receive a new signpost code. The OR gate 246 produces the output signal in the "high" state in response to the received multivibrator 226 output signal and the signal path 248 is received via the flip-flop network 270 causing the flip-flop network 270 output signal to be switched to the "high" state. If the radio transmitter-receiver 279 is available for the transmission of binary coded data, the signal on the signal path 278 is in the "high" state and the AND gate 276 provides an output signal in the "high" state on the signal path 268, the AND gate 276 output signal being received via the multivibrator 264 causing the output signal therefrom on the signal path 266 to be changed from the "high" to the "low" state. The multivibrator 264 output signal in the "low" state is received via the ratio transmitter-receiver 279 and the binary coded data in the encoder 240 is transmitted via the vehicle unit 16 for reception via the base station 22. The transmitted signpost code and bit encoded via the "low" state of the signal path 216 identifying the location of the vehicle within the monitored area and the transmitted vehicle code permanently encoded in the encoder 240 uniquely identifing the reporting vehicle. After the binary coded data in the encoder 240 has been transmitted via the ratio transmitter-receiver 279, the radio transmitter-receiver 279 provides the output signal on the signal path 274 in the "high" state which is received via the flip-flop network 270 resetting the flip-flop network 270 and terminating the transmission of the binary coded data.

In the automatic reporting mode, when the vehicle unit 16 is moved from one of the overlap regions 66, the vehicle region logic network 212 will produce a signal in the "high" state on the signal path 214 if the last alternatingly received signpost code is identical to the repetitively received signpost code. In this event, the vehicle unit 16 operates to report the monitored vehicle location and vehicle code in a manner like that described before when the same signpost code was being received in a repetitive manner causing a signal in the "high" state to appear on the signal path 214. The production of the output signals in the "high" state on the signal paths 214 or 218 when the vehicle unit 16 is moved from one of the overlap regions 66 will be described in greater detail below in connection with the vehicle region logic network 212 shown in FIG. 10

Figure 10:
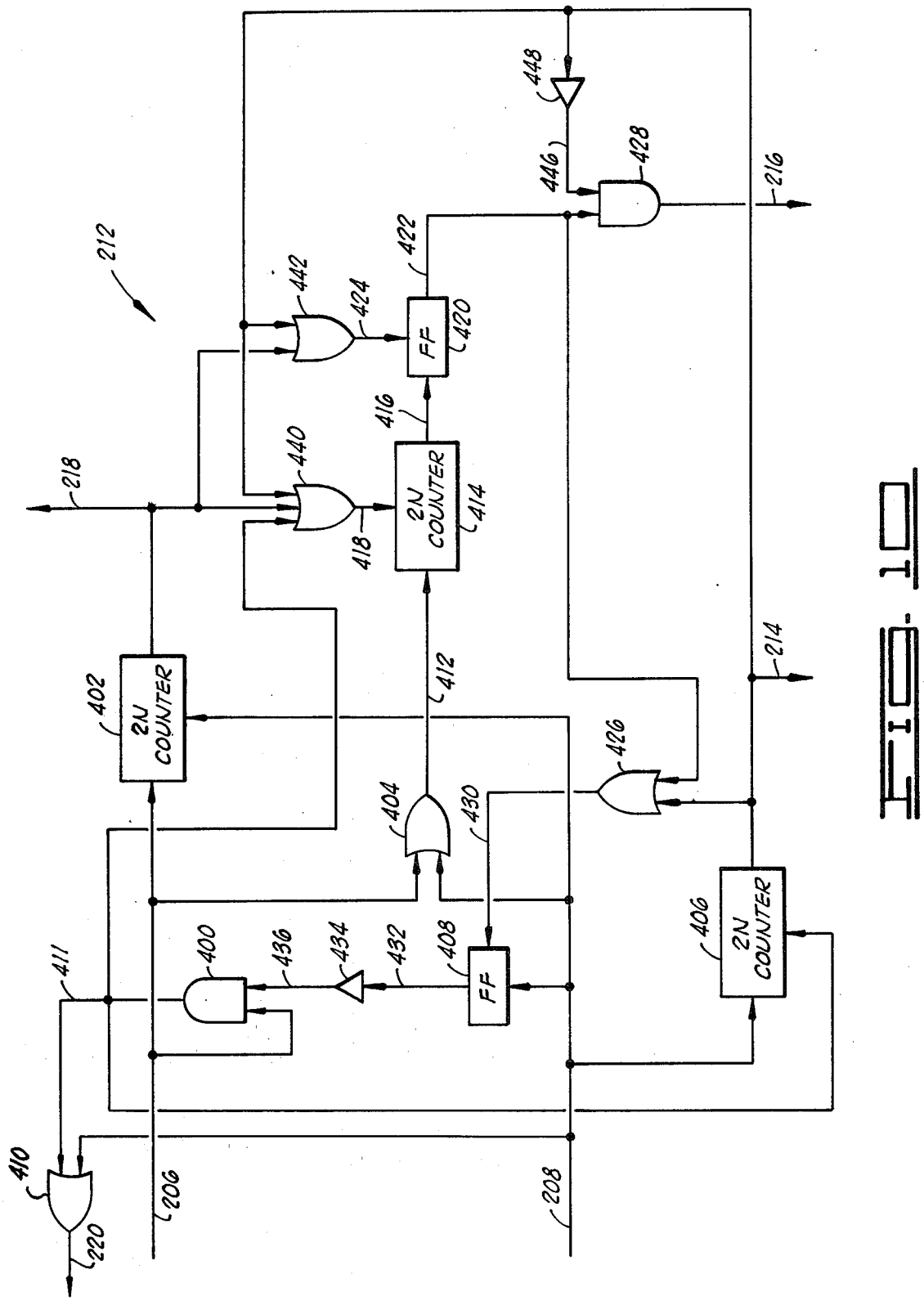
FIG. 10 is a schematic view showing one preferred embodiment of the vehicle region logic network of the vehicle unit shown in FIG. 9.

Embodiment of FIG. 10

Shown in FIG. 10 is one preferred embodiment of the vehicle region logic network 212 generally referred to before in connection with the description of FIG. 9. The comparison logic network 190 output signal on the signal path 206 is connected to the input of a first AND gate 400, to the input of a second counter 402 and to the input of a fourth OR gate 404. The comparison logic network 190 output signal on the signal path 208 is connected to the input of a first counter 406, to the input of a first flip-flop network 408, to the reset input of the counter 402, to the input of the OR gate 404 and to the input of a first OR gate 410.

The counter 406 provides an output signal in the "high" state on the signal path 214 in response to receiving a predetermined number (2N) of changes of state of the input signal on the signal path 208. The counter 406 also receives a signal on a signal path 411 and the counter 406 is reset in response to a received signal in the "high" state on the signal path 411 conditioning the counter 406 output signal in the "low" state for receiving the predetermined number (2N) of changes of state of the input signal on the signal path 208.

The OR gate 404 provides an output signal on a signal path 412 in the "high" state in response to receiving an input signal in the "high" state on either the signal path 206 or the signal path 208. The OR gate 404 output signal is connected to and received by a third counter 414, the counter 414 providing an output signal in the "high" state on a signal path 416 in response to receiving a predetermined number (2N) of changes of state of the input signal on the signal path 412, the counter 414 being reset in response to receiving a signal in the "high" state on a signal path 418 conditioning the counter 414 output signal in the "low" state for receiving the predetermined number (2N) of changes of state of the input signal on the signal path 418.

A second flip-flop network 420 receives the counter 414 output signal on the signal path 416 and the flip-flop network 420 output signal on a signal path 422 is changed from a "low" to a "high" state in response to receiving a counter 414 output signal in the "high" state on the signal path 416. The flip-flop network 420 also receives a signal on a signal path 424 and the flip-flop network 420 output signal is reset or changed from a "high" to a "low" state in response to receiving a signal in the "high" state on the signal path 424. The flip-flop network 420 output signal is connected to the input of a fifth OR gate 426 and to the input of a secnd AND gate 428.

The OR gate 426 receives the counter 406 output signal on the signal path 214 and the flip-flop network 420 output signal on the signal path 422 and provides an output signal on a signal path 430 in the "high" state in response to a received signal in the "high" state on either the signal path 416 or the signal path 422. The OR gate 426 output signal on the signal path 430 is connected to and received by the flip-flop network 408. The flip-flop network 408 receives the signal on the signal path 208 and provides an output signal on a signal path 432 in the "high" state in response to a received signal on the signal path 208 in the "high" state, the flip-flop network 408 being reset changing the output signal on the signal path 432 to the "low" state in response to a received signal in the "high" state on the signal path 430.

The vehicle region logic network 212 includes a first inverter 434 receiving the flip-flop network 408 output signal on the signal path 432 and providing an output signal on a signal path 436. The inverter 434 provides an output signal in the "high" state in response to a received signal in the "low" state on the signal path 432 and provides an output signal in the "low" state in response to a received signal in the "high" state on the signal path 432. Thus, the AND gate 400 receives the signal on the signal path 206 and the inverter 434 output signal on the signa path 436, the AND gate 400 providing the output signal on the signal path 411 in response to received signals in the "high" state on the signal paths 206 and 436.

The counter 402 receives the signals on the signal paths 208 and provides an output signal in the "low" state on the signal path 218 conditioning the counter 402 for receiving the predetermined number (2N) changes of state of the input signal on the signal path 206.

A second OR gate 440 receives the signal on the signal path 411, the counter 402 output signal on the signal path 218 and the counter 406 output signal on the signal path 214, the OR gate 440 providing an output signal in the "high" state on the signal path 418 in response to a received input signal in the "high" state on either the signal path 411 or the signal path 218 or the signal path 214. A third OR gate 442 receives the counter 402 output signal on the signal path 218 and the counter 406 output signal on the signal path 214, the OR gate 442 providing an output signal in the "high" state on the signal path 424 in response to a received input signal in the "high" state on either the signal path 218 or the signal path 214.

The AND gate 428 receives the flip-flop network 420 output signal onthe signal path 422 and a signal on a signal path 446, the AND gate 428 providing the output signal in the "high" state on the signal path 216 in response to received input signals in the "high" state on the signal paths 422 and 446. A second inverter 448 receives the counter 406 output signal on the signal path 214 and provides the signal on the signal path 446, the inverter 448 providing an output signal in the "high" state in response to a received signal on the signal path 214 in the "low" state and providing an output signal in the "low" state in response to a received signal on the signal path 214 in the "high" state.

When the vehicle unit 16 is located within the near-field region 58 of a signpost unit 12, the vehicle unit 16 receives the signpost code in a repetitive manner and the received signal has a signal strength or power level above the predetermined minimum power level as indicated via the power level bit stored in the decoder 174 along with the received signpost code. In this operating mode, the comparison logic network 190 output signal on the signal path 206 is a series of pulses (the output signal being in the "high" state in response to each received signpost code identical to the previously received signpost code as described before). The signal on the signal path 208 is in the "low" state and thus the flip-flop network 408 output signal is in the "low" state, the inverter 434 output signal being in the "high" state. The AND gate 400 receives the inverter 434 output signal in the "high" state and provides the output signal in the "high" state on the signal path 411 in response to each received signal or pulse in the "high" state on the signal path 206, the AND gate 400 providing a series of pulses on the signal path 411 corresponding to the series of pulses on the signal path 206 indicating that the same, identical signpost code is being received in a repetitive manner. The AND gate 400 output signal on the signal path 411 is connected to and received via the OR gate 410, the OR gate 410 also receiving the comparison logic network 190 output signal on the signal path 208. The OR gate 410 output signal on the signal path 220 resets the decoder 174 to receive a new incoming signpost code in a manner and for reasons described above and a signpost code is not transmitted to the base station 22 via the vehicle unit 16 since the vehicle unit 16 has remained within the same near-field region 58 previously reported to the base station 22. Further, the signals on the signal paths 214, 216 and 218 are each in the "low" state in this operating mode.

When the vehicle unit 16 is located within the far-field region 60 of a signpost unit 12, the vehicle unit 16 receives the signpost code in a repetitive manner and the received signal has a signal strength or power level below the predetermined minimum power level as indicated via the power level bit stored in the decoder 174 along with the received signpost code. In this operating condition, the signal on the signal path 208 is in the "low" state and a series of pulses are on the signal path 206, the OR gate 410 providing the output signal on the signal path 220 consisting of a series of pulses corresponding to the series of pulses on the signal path 206 for resetting the decoder 174 to receive a new signpost code (a signpost code is not transmitted to the base station 22 via the vehicle unit 16 in this operating mode in a manner like that described before with respect to the near-field regions 58). Further, the signals on the signa paths 214, 216 and 218 are each in the "low" state in this operating mode.

When the vehicle unit 16 moves from the far-field region 58 into the near-field region 60 of one of the signpost units 12, the signpost code received in the decoder 174 uniquely identifies the particular signpost unit 12 and includes the power level bit encoded in the decoder 174 via the "high" state of the power level detector 178 output signal on the signal path 180 and the code received in the decoder 174 is not the same as the previously received code stored in the storage unit 184 since the previously received code included the same signpost code along with the power level bit encoded in the decoder 174 via the "low" state of the power level detector 178 output signal on the signal path 180 indicating the location of the vehicle unit 16 within the far-field region 60 thereby causing a series of pulses to appear on the signal path 208 (the output signal on the signal path 208 producing a pulse, i.e. going from the "low" state to the "high" state and returning to the "low" state, in response to each received signpost code and power level bit dfferent fromthe previously received signpost code and power level bit as described before). The signal on the signal path 206 is in the "low" and the flip-flop network 408 is inverted (changed to the "high" state) in response to the first pulse appearing on the signal path 208 causing the inverter 434 output signal on the signal path 436 to be in the "low" state disenabling the AND gate 400 so the decoder 174 cannot be reset to receive a new signpost code by pulses on the signal path 206, the decoder 174 being reset only in response to a signal on the signal path 208. The counter 406 receives the input pulses on the signal path 208 and provides the output signal in the "high" state in response to a predetermined number (2N) changes in the state of the input signal on the signal path 208, the predetermined number (2N) being established such that the signpost code and the power level bit are repeatedly received a predetermined number of times before the counter 406 signal on the signal path 214 is switched to the "high" state. The counter 406 output signal in the "high" state on the signal path 214 operates to transfer the new signpost code and power level bit to the storage unit 184 and to cause the vehicle unit 16 to transmit the new signpost code and power level bit to the base station 22 depending on the reporting mode of the automatic vehicle monitoring apparatus 10 in a manner described before with respect to the vehicle unit 16 shown in FIG. 9. The counter 406 output signal in the "high" state on the signal path 214 is received via the OR gate 440 and the OR gate 440 provides the output signal in the "high" state on the signal path 418 resetting the counter 414, the counter 406 output signal in the "high" state also being received via the flip-flop network 420 resetting the flip-flop network 420 and causing the flip-flop network 420 output signal on the signal path 422 to be changed to the "low" state. The counter 406 output signal in the "high" state is received via the inverter 448 and the inverter 448 provides an output signal in the "low" state in response to the received counter 406 output signal in the "high" state, the AND gate 428 receiving the inverter 448 output signal on the signal path 446 in the "low" state and the flip-flop network 420 output signal on the signal path 422 in the "low" state and providing the output signal in the "low" state on the signal path 216 in response to the received signals on the signal paths 422 and 446. Further, the counter 406 output signal in the "high" state on the signal path 426 is received via the OR gate 426 and the flip-flop network 420 output signal in the "low" state on the signal path 422 is also received via the OR gate 426, the OR gate 426 providing an output signal in the "high" state on the signal path 430 resetting the flip-flop network 408 thereby causing the flip-flop network 420 output signal on the signal path 432 to be changed to the "low" state. The AND gate 400 receives the flip-flop network 420 output signal via the inverter 434 and thus receives a signal in the "high" state on the signal path 436 in response to the resetting of the flip-flop network 408 output signal, the AND gate 400 being conditioned to receive signals on the signal path 206 and provide the AND gate 400 output signal on the signal path 411 for reasons and in a manner described above. The OR gate 410 receives the signals in the "high" state on the signal path 208 and the signal in the "low" state on the signal path 206, the OR gate 410 providing the output signal in the "high" state on the signal path 438 resetting the counter 402. Thus, when the vehicle unit 16 is moved from the far-field region 58 into the near-field region 60 of one of the signpost units 12, the vehicle region logic network 212 receives signals on the signal path 208 and provides an output signal in the "high" state on the signal path 214 indicating the signpost code and accompanying power level bit were repeatedly received via the vehicle unit 16 a predetermined number of times and the output signal in the "high" state on the signal path 214 causes the signpost code and accompanying power level bit to be transferred to the storage unit 184 from the decoder 174, the "high" signal on the signal path 214 also causing the received signpost code and accompanying power level bit to be transmitted to the base station 22 depending on the reporting mode of the automatic vehicle monitoring apparatus 10. The vehicle region logic network 212 also provides the output signals on the signal paths 216, 218 and 220 in the "low" state in this operating mode of the vehicle unit 16.

When the vehicle unit 16 moves from the near-field region 60 into the far-field region 58 of one of the signpost units 12, the signpost code received in the decoder 174 uniquely identifies the particular signpost unit 12 and includes the power level bit encoded in the decoder 174 via the "low" state of the power level detector 178 output signal on the signal path 180 and the code received in the decoder 174 is not the same as the previously received code stored in the storage unit 184 since the previously received code included the same signpost code along with the power level bit encoded in the decoder 174 via the "high" state of the power level detector 178 output signal on the signal path 180 indicating the location of the vehicle unit 16 within the near-field region 58, thereby causing a series of pulses to appear on the signal path 208 (the output signal being in the "high" state in response to each received signpost code and power level bit different from the previously received signpost code and power level bit as described before). The signal on the signal path 206 is in the "low" state and the flip-flop network 408 is inverted (changed to the "high" state) causing the inverter 434 output signal on the signal path 436 to be in the "low" state disenabling the AND gate 400 and holding the signal on the signal path 411 in the "low" state so the decoder 174 cannot be reset by signals on the signal path 206. The counter 406 receives the input pulses on the signal path 208 and provides the output signal in the "high" state in response to a predetermined number (2N) changes in the state of the input signal on the signal path 208, the predetermined number (2N) being established such that the signpost code and the power level bit are repeatedly received a predetermined number of times before the counter 406 output signal on the signal post 214 is switched to the "high" state. The counter 406 output signal in the "high" state on the signal path 214 operates to transfer the new signpost code and power level bit to the storage unit 184 and to cause the vehicle unit 16 to transmit the new signpost code and power level bit to the base station 22 depending on the reporting mode of the automatic vehicle monitoring apparatus 10 in a manner described before with respect to vehicle unit 16 shown in FIG. 9. The counter 406 output sigal in the "high" state on the signal path 214 is received via the OR gate 440 and the OR gate 440 provides the output signal in the "high" state on the signal path 418 resetting the counter 414, the counter 406 output signal in the "high" state also being received via the flip-flop network 420 resetting the flip-flop network 420 and causing the flip-flop network 420 output signal on the signal path 422 to be changed to the "low" state. The counter 406 output signal in the "high" state is received via the inverter 448 and the inverter 448 provides an output signal in the "low" state in response to the received counter 406 output signal in the "high" state, the AND gate 428 receiving the inverter 448 output signal on the signal path 446 in the "low" state and the flip-flop network 420 output signal on the signal path 422 in the "low" state and providing the output signal in the "low" state on the signal path 216 in response to the received signals in the "high" state on the signal path 426 is received via the OR gate 426 and the flip-flop network 420 output signal in the "low" state on the signal path 422 is also received via the OR gate 426, the OR gate 426 providing an output signal in the "high" state on the signal path 430 resetting the flip-flop network 408 thereby causing the flip-flop network 420 output signal on the signal path 432 to be changed to the "low" state. The AND gate 400 receives the flip-flop network 420 output signal via the inverter 434 and thus receives a signal in the "high" state on the signal path 436 in response to the resetting of the flip-flop network 408 output signal, the AND gate 400 being conditioned to receive signals on the signal path 206 and provide the AND gate 400 output signal on the signal path 411 for reasons and in a manner described above. The signal on the signal path 208 resets the counter 402. Thus, when the vehicle unit 16 is moved from the near-field region 60 into the far-field region 58 of one of the signpost units 12, the vehicle region logic network 212 receives signals on the signal path 208 and provides an output signal in the "high" state on the signal path 214 indicating the signpost code and accompanying power level bit were repeatedly received via the vehicle unit 16 a predetermined number of times and the output signal in the "high" state on the signal path 214 causes the signpost code and accompanying power level bit to be transferred to the storage unit 184 from the decoder 174, the "high" signal on the signal path 214 also causing the received signpost code and accompanying power level bit to be transmitted to the base station 22 depending on the reporting mode of the automatic vehicle monitoring apparatus 10. The vehickle region logic network 212 also provides the output signals on the signal paths 216, 218 and 220 in the "low" state in this operating mode of the vehicle unit 16.

When the vehicle unit 16 is moved from the far-field region 60 of one of the signpost units 12 in the overlap region 66 formed by the overlapping far-field regions 60 of two of the signpost units 12, pulses or signals in the "high" state alternatingly appear on the vehicle region logic network 212 input signal paths 206 and 208 and are received via the OR gate 404, the OR gate 404 providing an output signal pulse in the "high" state on the signal path 412 in response to each of the alternatingly received input signals in the "high" state on the signal paths 206 and 208. The OR gate 404 output signals on the signal path 412 are received via the counter 414 and the counter 414 provides an output signal in the "high" state on the signal path 416 in response to a predetermined number (2N) changes of state of the input signal on the signal path 412, the predetermined number (2N) being established such that the signpost codes and accompanying power level bits are alternatingly received a predetermined number of times before the counter 414 output signal on the signal path 416 is switched to the "high" state. The counter 414 output signal in the "high" state is received via the flip-flop network 420 causing the flip-flop network 420 to produce an output signal in the "high" state on the signal path 422. The AND gate 444 receives the flip-flop network 420 output signal in the "high" state and the inverter 448 output signal on the signal path 446 and the AND gate 426 provides the output signal in the "high" state on the signal path 216 in response to the received flip-flop network 420 output signal in the "high" state when the inverter 448 output signal on the signal path 446 is in the "high" state, the inverter 448 providing an output signal in the "high" state in response to a received counter 406 output signal in the "low" state. The output signal on the signal path 216 in the "high" state causes the newly received signpost code and accompanying power level bit to be transferred from the decoder 174 into the storage unit 184 and causes an information bit to be encoded in the location encoder 240 indicating the newly received signpost code is alternating with the last received signpost code, the newly received signpost code and accompanying power level bit along with the information bit indicating the signpost codes were alternatingly received being transmitted to the base station 22 via the vehicle unit 16 in this operating mode. Further, in this operating mode, the signals on the signal paths 214, 218 and 220 are each in the "low" state until reset by a signal on the signal path 422.

When the vehicle unit 16 is moved from the overlap region 66 into one of the far-field regions 60, the vehicle region logic network 212 begins to repeatedly receive pulses on the signal path 206 indicating the same signpost code and accompanying power level bit are being repeatedly received via the vehicle unit 16. The counter 402 receives the input signal pulses on the signal path 206 and produces the output signal in the "high" state on the signal path 218 in response to a received predetermined number of changes of state of the input signal pulse on the signal path 206, the signal in the "high" state on the signal path 218 indicating that the vehicle unit 16 has moved from the overlap region 66 into one of the far-field regions 60. The output signal in the "high" state on the signal path 218 is received via the OR gate 440, the OR gate 440 providing the output signal in the "high" state on the signal path 418 resetting the counter 414 in response to the received input signal in the "high" state on the signal path 418. The counter 402 output signal in the "high" state is also received via the OR gate 442 and the OR gate 442 provides the output signal in the "high" state on the signal path 424 resetting the flip-flop network 420 to provide the output signal on the signal path 422 in the "low" state. Thus, the vehicle region logic network 212 produces the signal in the "high" state on the signal path 218 and the signal in the "low" state on the signal path 216 indicating the vehicle unit 12 has moved from the overlap region 66, in a manner described before with respect to the vehicle unit 16 shown in FIG. 9. In this operating condition, the signpost code transmitted to the base station 22 is identical to the previously transmitted signpost code; however, the code bit set via the signal path 216 is "low". The counter 406 output signal on the signal path 214 is in the "low" state and thus the inverter 448 output signal on the signal path 446 is in the "high" state. The AND gate 428 receives the inverter 448 output signal in the "high" state and the flip-flop network 422 output signal in the "low" state and produces the output signal in the "low" state on the signal path 216 in response to the received signals on the signal paths 446 and 422.

While the vehicle unit 16 is located within the overlap region 66, the vehicle unit 16 is alternatingly receiving signpost codes from two of the signpost units 12 and, when the vehicle unit 16 is moved from an overlap region 66 into the far-field region 60, it is possible that the last signpost code and accompanying power level bit received via the vehicle unit 16 while positioned within the overlap region 66 will not be identical to the signpost code and accompanying power level bit received via the vehicle unit 16 in the far-field region 60. In this event, a series of pulses will appear on the signal path 208 and the counter 406 will produce the output signal in the "high" state on the signal path 214 in response to receiving a predetermined number of input pulses on the signal path 208 and the vehicle region logic network 212 will not produce the output signal in the "high" state on the signal path 218; however, the new signpost code and accompanying power level bit transmitted via the vehicle unit 16 in response to the signal in the "high" state on the signal path 214 identifies the location of the vehicle unit 16 within the far-field region 60 of one particular signpost unit 12 uniquely identified via the received signpost code. It should be noted that the "high" output signal on the signal path 216 would not be produced via the vehicle region logic network 212 in this particular operation condition.

EMBODIMENT OF FIG. 11

In a preferred embodiment, the automatic vehicle monitoring apparatus of the present invention is constructed to be operated in multiple reporting modes, and the modified vehicle unit 16d (shown in FIG. 11) is constructed to be operated in the automatic reporting mode and a region or route reporting mode, the vehicle unit 16 (shown in FIG. 9) being constructed to be operated in the automatic reporting mode. The modified vehicle unit 16d is constructed exactly like the vehicle unit 16 (shown in FIG. 9) except as described below. In the automatic reporting mode, the vehicle unit 16d reports the location of the vehicle unit 16d when the monitored vehicles enter a new coverage region via the transmission of the vehicle codes and signpost codes to the base station 22 and, in the region reporting mode, a code identifying a particular region is transmitted from the base station 22 and only those monitored vehicles located within the coverage region identified via the transmitted code report the respective vehicles codes and locations. In the route reporting mode, a code identifying a particular route is transmitted from the base station 22 and only those monitored vehicles on the particular route identified via the transmitted code report the respective vehicle codes and locations.

It should be noted that, in the region reporting mode, each signpost unit 12 must be positioned at a predetermined, known position within the monitored area and the signpost code uniquely identifying each signpost unit 12 must be a predetermined, known signpost code. By the same token, in the route reporting mode, each signpost unit 12 must be positioned at a predetermined, known position along predetermined routes of travel and the signpost code uniquely identifying each signpost unit 12 must be a predetermined, known signpost code. Thus, in the region or reporting modes, the signpost units 12 are positioned at predetermined locations in accordance with the predetermined signpost configuration and the identity of each signpost code and accompanying location within the monitored area must be known and available at the base station 22 so a particular region or a particular route can be polled via the apparatus of the present invention cooperating with the modified vehicle unit 16d.

The vehicle unit 16d is constructed to be conditioned in the automatic reporting mode and in the region or route reporting mode via a signal transmitted from the base station 22, the region or route reporting mode being identified sometimes herein via the designation "region/route reporting mode". However, it should be particularly noted that a particular automatic vehicle monitoring apparatus may or may not include a region reporting mode or a route reporting mode depending on the requirements of a particular application.

The vehicle unit 16d receives a binary coded message via the radio transmitter-receiver 279 and the received message transmitted from the base station 22 includes an operating mode bit, the operating mode bit being "high" in one state indicating the vehicle unit 16d is to be conditioned or operated in the region reporting mode and the operating mode bit being "low" in one other state indicating the vehicle unit 16d is to be conditioned or operated in the automatic reporting mode. Thus, the conditioning of the vehicle unit 16d in one of the operating modes (the automatic reporting mode or the region/route reporting mode) is controlled via the base station 22 and, more particularly, a message code including the operating mode bit transmitted via the base station 22 and received via the vehicle unit 16d, in one preferred embodiment of the invention. It should be noted that, in an operational embodiment of the present invention, more than one bit may be utilized to condition the vehicle unit 16d in one of the operating modes and the reference herein to one operating mode bit is utilized solely for clarity of description.

The binary coded message is connected to the identification decoder 280 via the signal path 282 and an operating mode bit occupies a predetermined bit position in the identification decoder 280 referred to herein as the "operating mode bit position". The operating mode bit position in the identification decoder 280 is connected to an inverter 500 via a signal path 502. The inverter 500 receives the signal indicating the state of the operating mode bit ("high" or "low") and provides an output signal on a signal path 504, the inverter 500 output signal being "high" in response to a received "low" signal on the signal path 502 and "low" in response to a received "high" signal on the signal path 502.

The inverter 500 output signal on the signal path 502 is connected to one of the inputs of an AND gate 506 and the compare network 290 output signal on the signal path 288 is connected to the other input of the AND gate 506. The AND gate 506 provides an output signal on a signal path 408 in the "high" state in response to a compare network 290 output signal in the "high" state on the signal path 288 and a signal on the signal path 504 in the "high" state.

The AND gate 506 output signal on the signal path 508 is connected to and received by a flip-flop network 510 and the flip-flop network 510 provides an output signal in the "high" state on a signal path 512 in response to a received AND gate 506 output signal in the "high" state. The flip-flop network 510 output signal will remain in the "high" state until a signal in the "high" state on a signal path 514 is received via the flip-flop network 510. The signal path 514 is connected to a predetermined bit position (sometimes referred to herein as the "reset operating mode bit position") in the identification decoder 280 and the state ("high" or "low") of the reset operating mode bit position is determined via the code transmitted from the base station 22, the reset operating mode bit being "low" in one condition indicating the vehicle unit 16d is to be operated in the automatic reporting mode and the reset operating mode bit being "high" in one other condition indicating the vehicle unit 16d is to be conditioned in the region reporting mode.

An AND gate 516 receives the flip-flop network 510 output signal on the signal path 512 and the compare network 290 output signal on the signal path 288, the AND gate 516 providing an output signal in a "high" state on a signal path 518 in response to receiving signals on the signal paths 512 and 288 in the "high" state. An AND gate 520 receives the signal on the signal path 502 indicating the state of the operating mode bit and the compare network 290 output signal on the signal path 288, the AND gate 520 providing an output signal on a signal path 522 in the "high" state in response to receiving signals on the signal paths 502 and 288 in the "high" state. The AND gate 516 output signal on the signal path 518, the AND gate 520 and the OR gate 246 output signal on the signal path 248 are each received via an OR gate 524, and the OR gate 524 provides an output signal on a signal path 526 in the "high" state in response to receiving a signal in the "high" state on any one of the signal paths 518, 522 and 248.

The encoder 240 includes a predetermined number of bit positions permanently encoded with a vehicle code uniquely identifying the vehicle and a predetermined number of bit positions encoded with the vehicle location, as described before with respect to the vehicle unit 16 shown in FIG. 9. The state ("high" or "low") of each bit of the vehicle code appears on one of the parallel signal paths 294 in a manner described before with respect to the vehicle unit 16 shown in FIG. 9, and parallel signal paths 528 (only the first and the last of the parallel signal paths 528 being shown in FIG. 11 and designated therein via the reference numerals 528A and 528B) are connected to the bit positions encoded with the vehicle location of the encoder 240 in a manner similar to the parallel signal paths 294 and the vehicle code, each of the parallel signal paths 294 being connected to one bit position in the VEHICLE ID ENCODER portion of the encoder 240 and each of the parallel signal paths 528 being connected to one bit position of the LOCATION ENCODER portion of the encoder 240.

Figure 11:
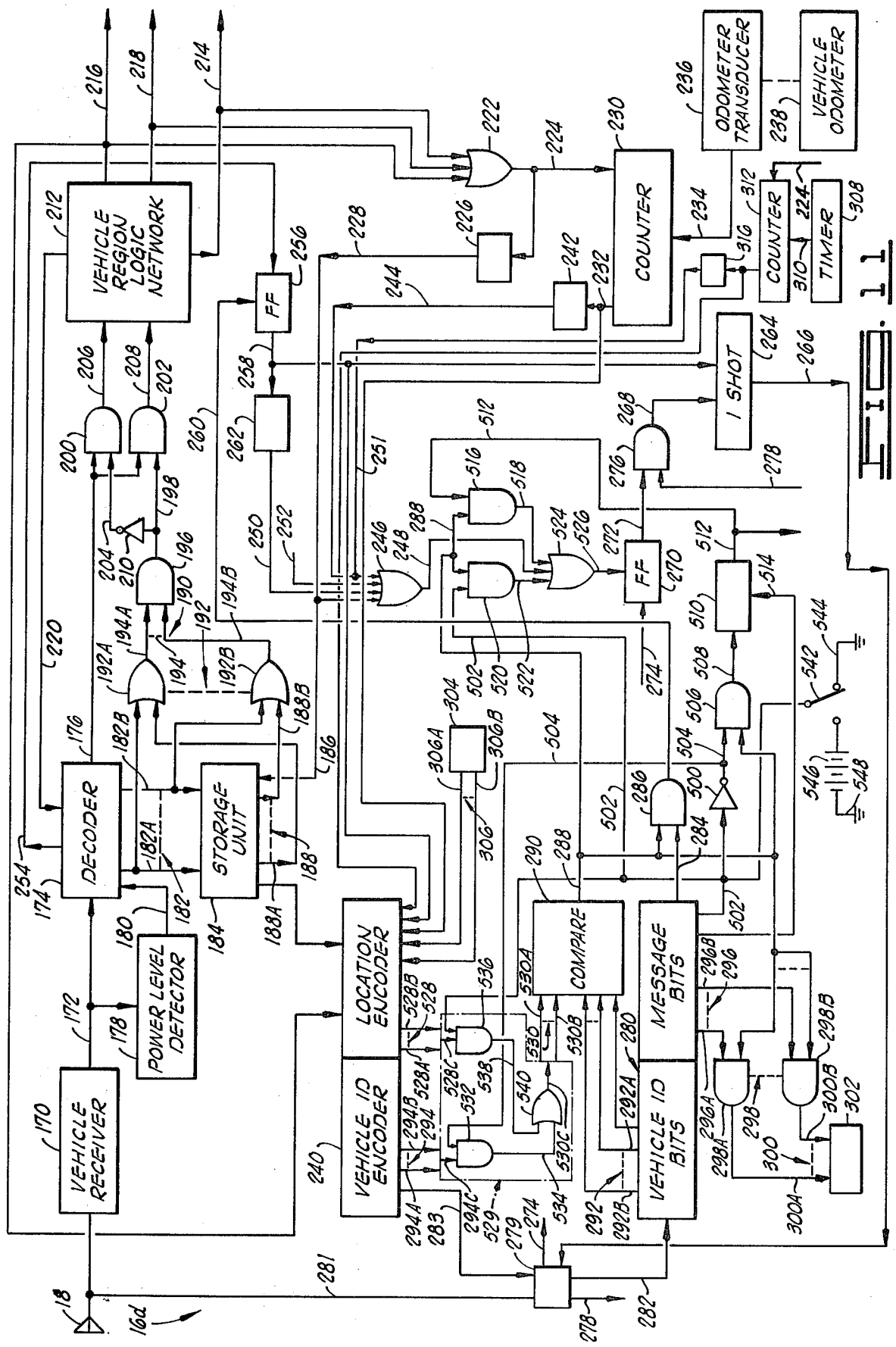
FIG. 11 is a schematic view, similar to FIG. 9, but showing a modified vehicle unit.

The parallel signal paths 294 and 528 are each connected to a select network 529 and the select network 529 is constructed to receive the signals on the signal paths 294 and 528 and to provide output signals via parallel signal paths 530 (only the first and the last of the parallel signal paths 530 being shown in FIG. 11 and designated therein via the reference numerals 530A and 530B), the signals on the signal paths 530 corresponding to the vehicle code in the automatic reporting mode of the vehicle unit 16d and the signals on the signal paths 530 corresponding to the vehicle location in the region reporting mode of the vehicle unit 16d. Each of the parallel signal paths 294 is connected to the input of one of a plurality of AND gates 532 (only one of the AND gates 532 being shown in FIG. 11 receiving one of the signal paths 294 designated via the reference numeral 294C) and each of the AND gates 532 also receives the inverter 500 output signal on the signl path 504, each AND gates 532 providing an output signal via a signal path 534. Each of the parallel signal paths 528 is connected to the input of one of a plurality of AND gates 536 (only one of the AND gates 536 being shown in FIG. 11 receiving one of the signal paths 528 designated via the reference numeral 528C) and each of the AND gates 532 also receives the signal on the signal path 502 corresponding to the state of the operating mode bit, each AND gate 536 providing an output signal on a signal path 538.

Each AND gate 532 output signal on the signal path 534 is connected to one of a plurality of OR gates 540 and each AND gate 536 output signal on the signal path 538 is connected to one of the OR gates 540, each OR gate 540 receiving the signal on one of the signal paths 534 and the signal on one of the signal paths 538 and providing an output signal on one of the signal paths 530. Only one of the OR gates 540 is shown in FIG. 11 providing an output signal on the one signal path 530 connected thereto and designated in FIG. 11 via the reference numeral 530C. The parallel signal paths 530 are each connected to and received via the compare network 20.

In the automatic reporting mode, the operating mode bit in the identification decoder 280 is in the "low" state and the inverter 500 output signal on the signal path 504 is in the "high" state since the inverter 500 is receiving the signal on the signal path 502 having a state corresponding to the state of the operating mode bit.

Assuming a vehicle code has not been transmitted via the base station 22 and received via the identication decoder 280, the signal paths 292 are each in the "low" state indicating the absence of a code and thus the compare network 290 output signal on the signal path 288 is in the "low" state. The AND gate 506 receives the signals on the signal paths 504 and 288, and provides an output signal in the "low" state on the signal paths 508 since the signal on the signal path 288 is in the "low" state. The flip-flop network 510 receives the AND gate 506 output signal in the "low" state and the flip-flop network 510 output signal on the signal path 512 remains in the "low" state, assuming a signal in the "high" state is not on the signal path 514. Since the flip-flop network 510 output signal is in the "low" state, the AND gate 516 output signal on the signal path 518 is in the "low" state, the AND gate 520 also providing an output signal in the "low" state on the signal path 522 since the received signals on the signal paths 288 and 502 are each in the "low" state. In this condition of the vehicle unit 16d, the output signal on the signal path 526 is controlled via the OR gate 246 output signal on the signal path 248, and the OR gate 524 provides an output signal on the signal path 526 in the "high" state when receiving an OR gate 246 output signal in the "high" state, the OR gate 524 providing an output signal on the signal path 526 in the "low" state when receiving an OR gate 246 output signal in the "low" state. Thus, the OR gate 246 functions to reset the flip-flop network 270 and the vehicle unit 16d operates in a manner like that described before with respect to the vehicle unit 16 shown in FIG. 9 to receive signpost codes and transmit signals indicating the location of the vehicle unit 16d within the monitored area.

Further, assuming the operating mode bit in the vehicle identification decoder 280 is in the "low" state indicating the vehicle unit 16d is to be operated in the automatic reporting mode and assuming the base station 22 has transmitted a vehicle code which has been received in the identification decoder 280 indicating that the location of a particular vehicle identified via the vehicle code is desired, the signals on the signal paths 292 represent the vehicle code received in the identification decoder 280 and, if the vehicle code on the signal paths 292 compares identically with the vehicle code on the signal paths 294, the compare network 290 output signal on the signal path 288 is in the "high" state. The AND gate 506 receives the inverter 500 output signal in the "high" state since the operating mode bit is still in the "low" state and the compare network 290 output signal in the "high" state on the signal path 288, the AND gate 506 providing an output signal in the "high" state on the signal path 508 in response to receiving the input signals in the "high" state on the signal paths 504 and 288. The flip-flop network 510 provides an output signal in the "high" state on the signal path 512 in response to receiving the AND gate 506 output signal in the "high" state. The AND gate 520 receives the signal on the signal path 288 in the "high" state and the signal on the signal path 502 in the "low" state, the AND gate 520 providing an output signal on the signal path 522 in the "low" state. The AND gate 516 receives the signal on the signal path 288 in the "high" state and the signal on the signal path and the flip-flop network 510 output signal in the "high" state, the AND gate 516 providing an output signal in the "high" state on the signal path 518 causing the OR gate 524 to provide an output signal in the "high" state on the signal path 526. The OR gate 524 output signal on the signal path 526 in the "high" state resets the flip-flop network 270 causing the vehicle unit 16d to transmit a signal encoded with the vehicle code and the vehicle location in a manner like that described before the connection with the vehicle unit 16 shown in FIG. 9.

When the identification decoder 280 receives a signal encoded with a location code identifying a predetermined region within the monitored area along with a signal transmitted via the base station 22 encoded with an operating mode bit in the "high" state indicating the vehicle unit 16d is to be operated in the region reporting mode, the signal on the signal path 502 is in the "high" state and the inverter 500 output signal is in the "low" state, the AND gate 506 receiving the inverter 500 output signal in the "low" state and providing an output signal on the signal path 508 in the "low" state. The flip-flop network 510 output signal on the signal path 512 is in the "low" state. The AND gate 516 receives the flip-flop network 510 output signal in the "low" state and provides an output signal in the "low" state on the signal path 518. The AND gate 520 receives the signal on the signal path 502 in the "high" state and the compare network 290 output signal on the signal path 288, the compare network 290 output signal being in the "high" state when the location code transmitted from the base station 22 is identical to the location code encoded in the encoder 240. In the "high" state of the compare network 290 output signal, the AND gate 516 provides the output signal in the "high" state on the signal path 518 causing the OR gate 524 output signal on the signal path 526 to be in the "high" state resetting the flip-flop network 270 so the vehicle unit 16d can transmit the vehicle code and the location code in a manner described before in connection with the vehicle unit 16 shown in FIG. 9.

In the region reporting mode, each AND gate 532 receives a signal in the "low" state on the signal path 504 and thus the vehicle code in the encoder 240 is connected to the compare network 290 via the select network 529. However, each AND gate 536 receives a signal in the "high" state on the signal path 502 since the operating mode bit is in the "high" state. Thus, each AND gate 536 provides an output signal on one of the signal paths 528 corresponding to one of the bits of the location code, i.e. the signal on each of the signal paths 538 has a state ("high" or "low") identical to the state of the signal path 528 connected to the particular AND gate 536 providing the output signal. Each OR gate 540 output signal on one of the signal paths 530 has a state ("high" or "low") corresponding to the state ("high" or "low") of the signal on the signal path 538 connected thereto, the output signals from the OR gates 540 on the signal paths 530 corresponding to the location code in the encoder 240. The compare network 290 receives the signals on the signal paths 530 corresponding to the location code in the encoder 240 and the signals on the signal paths 292 corresponding to the location code in the identification encoder 280, the compare network 290 providing the output signal in the "high" state on the signal paths 288 when the received location codes are identical.

Thus, in the region reporting mode, each vehicle unit 16d located within the region identified via the location code encoded in the signal transmitted via the base station 22 reports or transmits a signal encoded with the vehicle code and the location code for reception via the base station 22. In the event the location code encoded in the signal transmitted via the base station 22 and received via the identification decoder 280 is not identical to the location code in the encoder 240, the compare network 290 output signal on the signal path 288 would be in the "low" state and the AND gate 520 would not provide the output signal in the "high" state for resetting the flip-flop network 270 via the OR gate 524. Thus, only the vehicle units 16d located within the region identified via the location code encoded in the signal transmitted via the base station 22 report or transmit signals in response to the received base station 22 signal in the region reporting mode of the vehicle unit 16d.

Assuming the vehicle unit 16d has been conditioned in the region reporting mode, the vehicle unit 16d is returned to the automatic reporting mode by transmitting from the base station 22 a signal encoded with a message code including a reset operating mode bit in the "high" state indicating the vehicle unit 16d is to be operated in the automatic reporting mode, the operating mode bit on the signal path 502 being in the "low" state. In this condition, the signal on the signal path 514 connected to the reset operating mode bit position of the identification decoder 280 is in the "high" state and the flip-flop network 510 is reset changing the flip-flop network 510 output signal on the signal path 512 in the "high" state and conditioning the vehicle unit 16d to be operated in the automatic reporting mode.

It should be noted that the operating mode of the vehicle unit 16d can be controlled via a switch located in the monitored vehicles and connected to the operating mode bit position in the identification decoder 280 and the switch position controls the state ("high" or "low" ) of the operating mode bit position, thereby controlling the state of the signal on the signal path 502. More particularly, the switch (shown in FIG. 11 and designated via the reference numeral 542) in the monitored vehicle is connected to the signal path 502 and the switch 542 is positionable in one position connecting the signal path 502 to ground via a signal path 544, thereby providing a signal in the "low" state on the signal path 502, the switch 542 being positionable in one other position connecting the signal path 502 to an electrical power supply 546 via a signal path 548, thereby providing a signal in the "high" state on the signal path 502. In the preferred embodiment of the invention, the state ("high" or "low") is controlled via a predetermined operation mode bit encoded in a signal transmitted via the base station 22, rather than an operator-controlled switch such as the switch 542.

Figure 12:
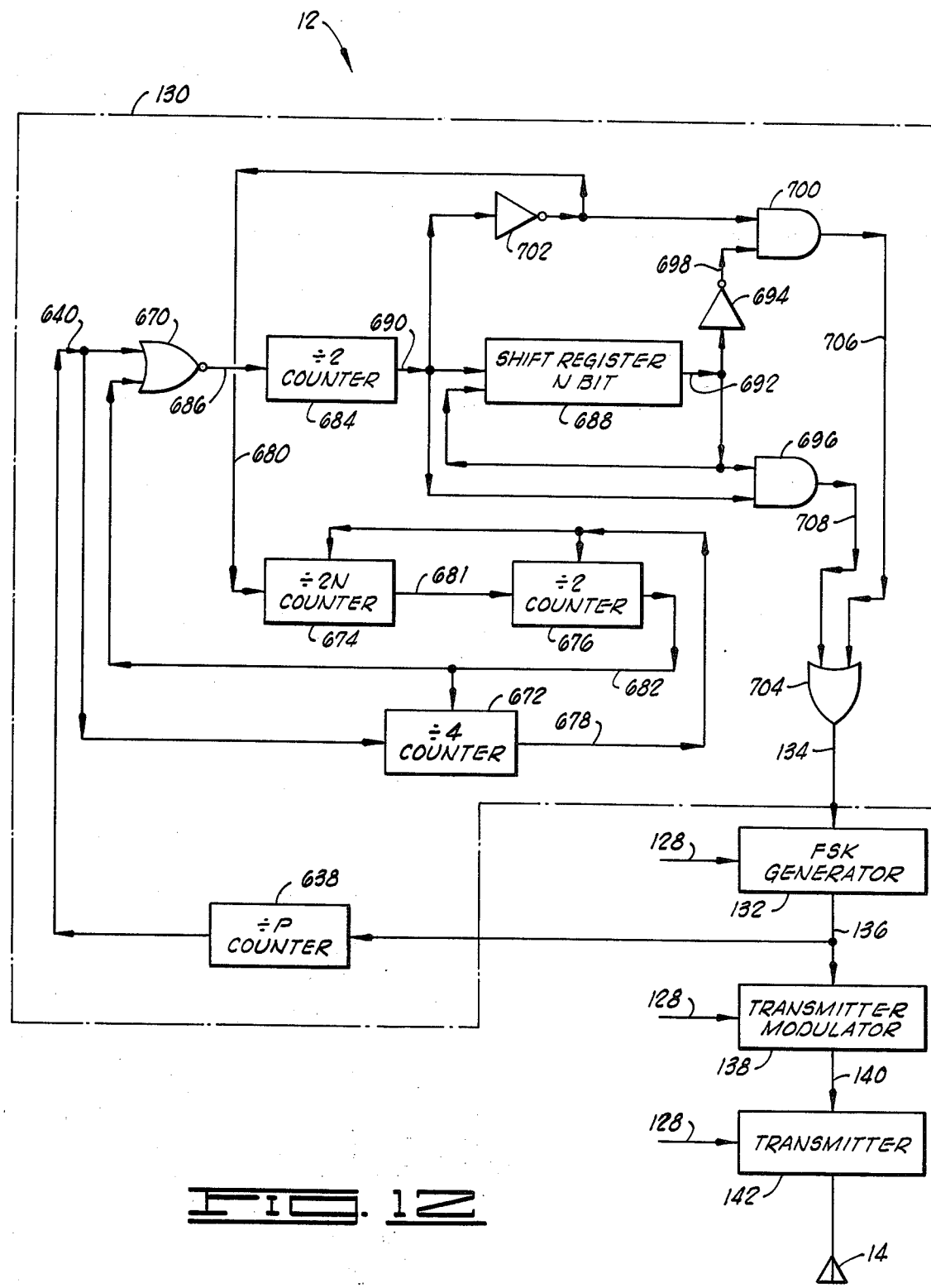
FIG. 12 is a schematic view showing one preferred embodiment of the signpost encoder shown in FIGS. 1 and 7.
Figure 13:
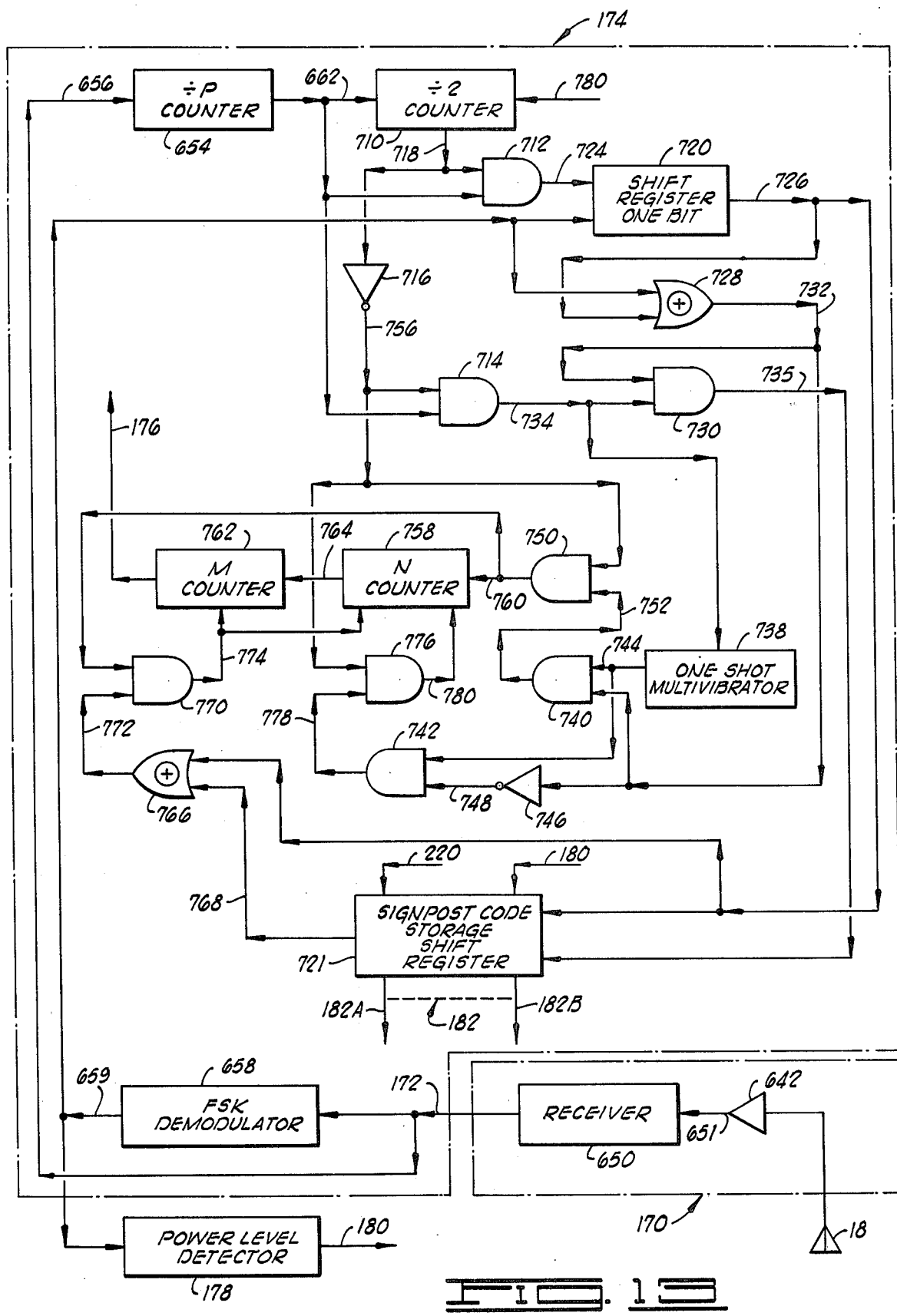
FIG. 13 is a schematic view showing one preferred embodiment of the decoder of the vehicle unit shown in FIGS. 9 and 11.

Embodiment of FIGS. 12 and 13

Shown in FIG. 12 is one preferred embodiment of the signpost unit 12 and shown in FIG. 13 are the vehicle receiver 170 and the decoder 174 of the vehicle unit 16 for receiving the signpost codes generated and transmitted via the signpost units 12.

In general, the apparatus shown in FIGS. 12 and 13 provides one preferred system for communicating the time division binary signpost codes between the signpost units 12 and the vehicle unit 16 utilizing frequency shift key (FSK) encoding and decoding techniques wherein a logical "zero" is transmitted at one frequency ($f_s$) and a logical "one" is transmitted at a second, distinct frequency ($f_m$), as referred to before. The signpost code has a predetermined number (N) of logical "ones" and logical "zeros" arranged in a predetermined code format, in this embodiment of the invention. In a preferred form, a "synchronization bit" comprising a predetermined logical "one" or a logical "zero" is generated and transmitted prior to generation and transmission of the signpost code and, in a preferred form, the synchronization bit is generated and transmitted twice prior to the generation and transmission of the signpost code, the synchronization bit being identical to the first signpost bit in the (N) bit signpost code for reasons to be described in greater detail below.

The signpost encoder 130 generates each signpost code bit followed by the complement of the previously generated signpost code bit (referred to sometimes herein as the signpost code bit complement) for each signpost code bit of the (N) bit signpost code, and generates synchronization bits having the same logic level or value as the first signpost code bit of the signpost code, in one preferred form. The synchronization bits are generated via the signpost encoder 130 prior to the generation of the (N) bit signpost code. The synchronization bits and the signpost code bits generated via the signpost encoder 130 are connected via the signal path 134 to the control input of the FSK generator 132.

The FSK generator 132 has an "off" condition and an "activated" or "on" condition and generates an output signal having one of two distinct frequencies ($f_s$) or ($f_m$) in response to the received signpost encoder 130 output signal, the FSK generator 132 generating an output signal having a frequency ($f_s$) in response to a received signpost encoder 130 output signal having a voltage level representing a logical "zero" and generating an output signal having a frequency ($f_m$) in response to a received signpost encoder 130 output signal having a voltage level representing a logical "one". The FSK generator 132 receives the multivibrator 124 output signal on the signal path 128 and is conditioned in the "on" condition in response to receiving a multivibrator 124 output signal, the FSK generator 132 being conditioned in the "off" condition in the "off" condition of the multivibrator 124.

The output signal of the FSK generator 132 is connected via the signal path 36 to the transmitter modulator 138 and the output signal of the transmitter modulator 138 is connected to the transmitter 142 via the signal path 140, the transmitter modulator 138 supplying the drive voltage for operating the transmitter 142.

The transmitter 142 generates an output signal having a predetermined frequency which is selected considering the particular data link utilized for the transmission of data between the signpost unit 12 and the vehicle unit 16. The FSK generator 132 output signal has a frequency of either ($f_s$) or ($f_m$), and the data link carrier signal is modulated by a frequency of either ($f_s$) or ($f_m$) depending upon the logic level of the data bit being transmitted.

The FSK generator 132 output signal is connected to the input of a P-counter 638, which provides an output signal pulse in response to a received, predetermined number (P) changes of state of the input signal on the signal path 136. The output signal of the P-counter 638 provides the clock pulses on an output signal path 640 for operating the signpost encoder 130, the P-counter 638 output signal more particularly providing the transmitter master clock signal derived from the FSK generator 132 output signal.

The transmitter modulator 138 is operative in the "on" condition of the multivibrator 124 modulating the data link carrier signal for transmission over the data link and the transmitter modulator 138 is rendered inoperative in the "off" condition of the multivibrator 124.

The vehicle receiver 170 includes an amplifier 642 connected to the vehicle antenna 18 and receiving the transmitted signpost code and synchronization signal. The amplified output signal from the amplifier 642 is connected to a receiver 650 via a signal path 651. The receiver 650 detects or separates the received FSK frequencies ($f_s$) and ($f_m$) from the data link carrier signal, and the signal frequency of the receiver 650 output signal, having a frequency of ($f_s$) or ($f_m$), is connected to the input of a P-counter 654 via the signal path 172, the received FSK signal frequency on the signal path 172 also being connected to the input of the FSK demodulator 658 which provides an output signal on a signal path 659.

The P-counter 654 provides an output signal pulse in response to a predetermined number (P) received input pulses, the P-counter 654 output signal being provided on a signal path 662. The predetermined number (P) of the P-counter 654 located in the vehicle unit 16 is exactly the same as the predetermined number (P) of the P-counter 638 located in the signpost unit 12 and thus the signal on the signal path 172 corresponds to the signal on the signal path 136 (i.e., the FSK generator 132 output signal). The P-counter 654 provides the "receiver master clock signal".

The FSK demodulator 658 receives the receiver 650 output signal via the signal path 172 and demodulates the received FSK signals. The FSK demodulator 658 converts the received FSK signals into a binary coded data type of output signal which is provided on the signal path 659.

Referring more particularly to the construction of the signpost unit 12 shown in FIG. 12, the transmitter master clock signal on the signal path 640 is connected to one of the inputs of a NOR gate 670 to the input of a counter 672. The counter 672 provides an output signal pulse in the "high" state in response to two (2) input pulses connected thereto via the signal path 640 [the counter 672 being shown in the drawings as a divide-by-four counter since the counter 672 output signal changes state in response to 4 changes in state of the input signal].

The counter 672 output signal is connected to the reset input of a divide-by-(2N) counter 674 and to the reset input of a counter 676 via a signal path 678, the counter 672 providing a reset signal for resetting the counters 674 and 676. The counters 674 and 676 are constructed such that each counter 674 and 676 is in the "operative" condition counting the input signal pulses in the "low" state of the reset signal on the signal path 678, and each counter 674 and 676 is in the "non-operative" or "off" condition in the "high" state of the reset signal on the signal path 678.

The counter 674 is constructed to provide an output signal pulse in response to each predetermined number (N) input pulses connected to the input thereof via a signal path 680, i.e. in response to (2N) changes in the state of the input signal connected thereto as indicated in FIG. 12 via the designation (2N). The counter 674 output signal is connected to the input of the counter 676 via a signal path 681. The counter 676 provides an output signal pulse in response to a received predetermined number [1] pulses connected to the input thereof via the signal path 644, i.e. in response to 2 changes in the state of the input signal connected thereto. The output signal of the counter 676 is connected to the input of the NOR gate 670 and to the reset input of the counter 672 via a signal path 682, the counter 672 being in the "operative" condition in the "low" state of the signal on the signal path 682 and being in the "non-operative" or "off" condition in response to a "high" signal on the signal path 682.

The NOR gate 670 receives signals connected to the inputs thereof via the signal paths 640 and 682 and provides an output signal corresponding to the transmitter master clock signal received via the signal path 640 when the signal on the signal path 682 is in the "low" state. Thus, in the "low" state of the signal on the signal path 682, the transmitter master clock pulse is connected to the input of a counter 684 via the NOR gate 670 and a signal path 686 connects the output of the NOR gate 670 to the input of the counter 684. The counter 684 provides an output signal pulse in response to a received predetermined number of input pulses connected thereto via the signal path 686 and, more particularly, in response to 1 received input pulse connected to the input thereof via the signal path 686. The counter 684 output signal provides a clock signal for operating a shift register 688, the counter 684 output signal being connected to the shift register 688 via a signal path 690 and sometimes referred to herein as the "shift register clock signal".

The signpost code is clocked from the shift register 688 in a serial manner via a signal path 692 in response to the shift register clock signal pulses received on the signal path 690. The shift register 688 output signal is connected to the shift register 688 register 688 input, connected to the input of an inverter 694 and connected to the input of an AND gate 696 via the signal path 692. Since the shift register 688 output signal is connected to the shift register 688 input, the binary coded data (the signpost code) clocked from the shift register 688 in a serial manner is also clocked back into the shift register 688 via the signal path 692 and the shift register clock signal on the signal path 690. In this manner, the binary coded data (the signpost code) is cyclically clocked from the N-bit shift register 688 in a serial manner in the "on" condition of the multivibrator 124 activating the FSK generator 132.

The inverter 694 provides an output signal via the signal path 698 which is in the "high" state in response to a received signal in the "low" state on the signal path 692 and provides an output signal in the "low" state in response to a received signal in the "high" state on the signal path 692, the inverter 694 output signal being connected via a signal path 698 to the input of an AND gate 700. The counter 684 output signal or, in other words, the shift register clock signal on the signal path 690 is connected to the input of the AND gate 696 and is also connected to an inverter 702. The inverter 702 provides an output signal in the "high" state in response to a received signal in the "low" state on the signal path 690 and provides an output signal in the "low" state in response to a received input signal in the "high" state on the signal path 690, the inverter 702 output signal being connected to the input of the AND gate 700 and to the input of the counter 674 via the signal path 680.

The output signal of the AND gate 700 is connected to the input of an OR gate 704 via a signal path 706. The output signal of the AND gate 696 is connected to the input of the OR gate 704 via a signal path 708.

The signpost code bits are permanently encoded in the shift register 688 in the predetermined sequence or code format comprising the signpost code. In the "on" condition, the FSK generator 132 generates the output signal which is connected to the transmitter modulator 138 and the P-counter 638 (zero crossing pulse generator). Thus, the output signal of the P-counter 638 has a frequency of (1/P) times the frequency of the FSK generator 132 output signal or, in other words, the P-counter 638 output signal provides a series of pulses occurring at a rate of (1/P) times the rate of the FSK generator 132 output signal, the P-counter 638 output signal providing the transmitter master clock signal which is derived from and coherently related to the FSK generator 132 output signal frequency by a factor of (1/P).

The transmitter master clock signal is connected to the counter 684 via the NOR gate 670 when the signal on the signal path 682 is in the "low" state, the signal on the signal path 682 being switched to the "high" state after the predetermined number (N) pulses representing the signpost code bits and the predetermined number (N) signpost code bit complements have been generated and transmitted by the signpost unit 12. When the counter 674 is incremented (2N) times in response to (N) received input pulses, (N) signpost code bits and (N) signpost code bit complements have been connected to the output signal path 134 since the signpost code bits are connected to the output signal path 134 when the shift register clock signal is "high" and the signpost code bit complements are connected to the output signal path 134 when the shift register clock signal is "low".

The counter 676 output signal on the signal path 682 is changed to the "high" state in response to the signpost code bit-signpost code bit complement sequence generation just described being repeated a predetermined number of times; more particularly, twice with respect to the divide-by-two counter 676 shown in FIG. 12. The divide value of the counter 676 can be changed to provide a signpost code bit-signpost code bit complement sequence generation repeatable a number of times greater than 2 if desired in a particular operational embodiment of the invention, the particular divide value of the counter 674 being selected in each instance to cooperate with the predetermined time period the multivibrator 124 is conditioned in the "on" condition and to set the number of times the signpost code is repeatedly transmitted in the "on" condition of the particular signpost unit 12 for reasons described before with respect to the timing diagram shown in FIG. 4.

The output signal of the counter 684 provides a series of pulses occurring at a rate of (1/2P) times the rate of the FSK generator 132 output signal or, in other words, one-half (½) the rate of the transmitter master clock signal on the signal path 640. The counter 684 output signal is connected to the N-bit shift register 688 and provides the shift register clock signal for clocking data into and from the N-bit shift register 688. The shift register clock signal on the signal path 690 thus operates at a rate or, in other words, has a frequency of (1/2P) times the frequency of the FSK generator 132 output signal independent of the frequency of the FSK generator 132 output signal, i.e. the shift register clock signal has a frequency (1/2P) times the frequency of the FSK generator 132 output signal even if the frequency of the FSK generator 132 output signal is changed. The operation of the signpost unit 12 is thus completely self-synchronizing without the necessity of providing a stable master clock and regardless of the frequency of the FSK generator 132 output signal.

The signpost code bits are clocked from the N-bit shift register 688 in a serial manner at a rate determined by the shift register clock signal on the signal path 690 and the signpost code bits clocked from the N-bit shift register 688 are also clocked back into the N-bit shift register 688 in a serial manner via the signal path 692 connected to the N-bit shift register 688 input. The signpost code bits clocked from the N-bit shift register 688 are connected to the AND gate 696 and the shift register clock signal on the signal path 690 is also connected to the AND gate 696. Thus, the shift register clock signal on the signal path 690 and the signpost code bit on the signal path 692 are each simultaneously connected to the AND gate 696 causing the signpost code bit to be connected to the OR gate 704 via the AND gate 696 output signal on the signal path 708.

The shift register clock signal on the signal path 690 is connected to the AND gate 700 via the inverter 702 and the N-bit shift register 688 output signal is connected to the AND gate 700 via the inverter 694. Thus, when a "high" signpost code bit is clocked from the N-bit shift register 688 and a shift register clock pulse appears on the signal path 690 (the signpost N-bit shift register 688), the two input signals connected to the AND gate 700 are each produced in the "low" state via the inverters 702 and 694. In this condition, a "low" output signal is produced from the AND gate 700 and the AND gate 696 output signal on the signal path 708 controls the OR gate 704 output signal on the signal path 134 or, in other words, the signpost encoder 130 output signal, and the signal on the signal path 622 represents one of the signpost code bits clocked from the N-bit shift register 688.

When the shift register clock signal on the signal path 690 is in the "low" state, the inverter 702 output signal on the signal path 680 is in the "high" state. Since the shift register clock signal on the signal path 690 is in the "low" state, the OR gate 704 output signal on the signal path 134 is controlled by the AND gate 700 output signal on the signal path 706 and thus the OR gate 704 output signal on the signal path 134 corresponds to or represents the signpost code bit complement. The shift register clock signal on the signal path 690 and the control gates 696 and 700 cooperate with the gate 704 to produce each signpost code bit of the N-bit signpost code followed by the signpost code bit complement.

The signal path 682 is normally in the "low" state. The inverter 704 output signal is connected to the input of the counter 674 via the signal path 680 and thus, after (N) shift register clock pulses are produced on the signal path 680, the counter 674 output signal is changed to the "high" state or, in other words, produces an output pulse on the signal path 681 connected to the counter 676 input. The counter 676 is changed to the "high" state or, in other words, produces an output pulse 2 changes in the state of the input signal] connected thereto from the counter 674 via the signal path 681 or, in other words, after (N) shift register clock pulses [(2N) changes of state of the shift register clock signal] are produced on the signal path 680.

The counter 676 output signal is connected to the reset input of the counter 672 and, when the counter 676 produces a "high" output signal pulse, the counter 672 is allowed to count the transmitter master clock pulses connected thereto via the signal path 640, the counter 672 being in the "activated" or "on" condition in the "high" state of the signal on the signal path 682. Further, when the counter 676 produces an output signal pulse, the signal on the signal path 682 is in the "high" state and the output signal of the NOR gate 670 to the counter 684 is in the "low" state regardless of the transmitter master clock signal on the signal path 640. After 2 transmitter master clock pulses [corresponding in time to 2 shift register clock signal pulses] have been produced on the signal path 640 connected to the counter 672, the counter 672 output signal is returned to the "high" state resetting the counters 674 and 676 and returning the counter 676 output signal to the "low" state, thereby resetting or deactivating the counter 672.

After (N) signpost code bits and (N) signpost code bit complements have been generated, the counter 672 output signal is in the "high" state causing the first signpost code bit to be connected to the FSK generator 132 via the signal path 134 for the next two cycles of the transmitter master clock signal. In this condition, the first signpost code bit is on the signal path 692 and the first signpost code bit remains on the signal path 692 for 2 cycles of the transmitter master clock signal thereby producing the two synchronization bits identical to the first signpost code bit prior to the subsequent generation and transmission of the signpost code bits and the signpost code bit complements in a serial manner. The number of synchronization bits which will be produced preceding the first signpost code bit will be 2 less than the divider value of the counter 672. If the divider value of the counter 672 is 4, as shown in FIG. 12, there will be two synchronization bits produced having a total time duration corresponding to the time duration of two transmitter master clock pulses: the first two transmitter master clock pulses applied on signal path 640 are counted by the counter 672 allowing the two synchronization bits to be produced; the third transmitter master clock pulse on signal path 640 is counted by the counter 672 allowing the first signpost code bit to be produced; and the fourth transmitter master clock pulse on signal path 640 is counted by the counter 672 thereby causing the output signal on the signal path 678 to change from the "low" state to the "high" state with the above-described result of allowing the transmitter master clock pulse to pass through the NOR gate 670 and initiate the generation of the first signpost code bit. Thus, the logic level of the synchronization bits is identical to the logic level of the first signpost code bit of the signpost code in the N-bit shift register 688, and the number of the synchronization bits is determined by the counter 672.

After the transmission of the (N) signpost code bits and the (N) signpost code bit complements has been repeated cyclically a predetermined number of times, the multivibrator 128 output signal on the signal path will change to the "low" state and will remain in the "low" state for the predetermined period of time in a manner and for reasons described before. In this manner, the transmitter modulator 138 and the FSK generator 132 are each rendered inoperative for the predetermined period of time during which the multivibrator 124 is in the "off" condition.

Thus, the signpost encoder 130 operates to first connect each signpost code bit followed by the signpost code bit complement in a serial manner to the input of the FSK generator 132, the synchronization bits being connected to the FSK generator 132 immediately following the transmission of the (N) signpost code bits and the (N) signpost code bit complements. The FSK generator 132 produces a signal on the signal path 136 having a frequency ($f_s$) when the signal level on the signal path 134 from the signpost encoder 130 represents a logical "zero" and to produce an output signal on a signal path 136 having a frequency ($f_m$) when the signpost encoder 130 output signal on the signal path 134 has a signal level representing or corresponding to a logical "one". The signpost encoder 130 output signal on the signal path 130 representing one of the signpost code bits stored in the N-bit shift register 688 generated via the signpost encoder 130 remains on the signal path 134 for (1/2P) cycles of the FSK generator 132 output signal on the signal path 136 and the signpost code bit complement on the signal path 134 also remains on the signal path 134 for (1/2P) cycles of the FSK generator 132 output signal on the signal path 136. The time required to transmit a signpost code bit is $$(\frac{1}{f_s} + \frac{1}{f_m})$$

when the logic value of the signpost code bit corresponds to a logical "zero" or $$(\frac{1}{f_m} + \frac{1}{f_s})$$

when the signpost code bit corresponds to a logical "one". Thus, the time required to transmit either a signpost code bit and its signpost code bit complement having a logical value of "one" is the same as the time required to transmit a signpost code bit and its signpost code bit complement having a logical value of "zero", thereby allowing the signpost encoder 130 to be coherently related to the FSK generator 132 and yet transmit a signpost code at a fixed BAUD rate.

Referring more particularly to the decoder 174 of the vehicle unit 16 shown in FIG. 13, the P-counter 654 output signal (the receiver master clock signal) is connected to the input of a divide-by-two counter 710 via the signal path 622, the signal path 662 also being connected to the input of an AND gate 712 and to the input of an AND gate 714. The counter 710 is constructed to provide an output pulse in response to each 2 received input pulses connected thereto via the signal path 662, the counter 710 output signal being connected to an inverter 716 and to the AND gate 712 via a signal path 718. As previously mentioned, the signpost unit 12 generates and transmits a signpost code bit complement immediately following the generation and transmission of each signpost code bit and thus every other or every second data bit or logic level received via the decoder 174 represents the complement of the preceding signpost code bit. The counter 710 output signal applied to the signal path 718 functions as a decoder control clock signal allowing only every other received data bit (received logic level) to be clocked into a one-bit shift register 720 and then to an N-bit signpost code storage shift register 721, thereby assuring that only the signpost code bits and not the signpost code bit complements are clocked into the shift registers 720 and 721 during the operation of the decoder 714.

The signal on the signal path 172 is the received FSK signal and corresponds to the FSK generator 132 output signal on the signal path 136. The P-counter 654 is thus operated by the same FSK signal as the P-counter 638, and the receiver master clock signal on the signal path 662 produces clock pulses at a rate (1/P) times the frequency rate of the received FSK signal connected to the P-counter 654 via the signal path 659, the receiver master clock signal and the transmitter master clock signal each producing clock pulses at an identical rate related to the FSK generator 132 output signal. Therefore, the receiver master clock signal and the transmitter master clock signal are frequency coherent since both are similarly derived from the FSK generator 132 output signal.

The decoder control clock signal on the signal path 718 produces clock pulses at a rate (1/2P) times the frequency rate of the FSK signal on the signal path 659 or, in other words, the decoder control clock signal produces clock pulses at ½ the rate clock pulses are produced via the receiver master clock signal. The decoder control clock signal of the vehicle unit 16 and the shift register clock signal on the signal path 690 of the signpost unit 12 are thus frequency coherent since both produce clock pulses at a rate of (1/2P) times the frequency rate of the FSK generator 132 output signal, both signals being frequency coherent with the FSK generator 132 output signal.

The AND gate 712 output signal is connected to the input of the one-bit shift register 720 and provides the one-bit shift register clock signal for clocking data into the one-bit shift register 720 when connected thereto via the signal path 724 connected between the AND gate 712 and the shift register 720. The output signal of the one-bit shift register 720 is connected to the input of the N-bit key code storage shift register 721 via a signal path 726, the signal path 726 also being connected to the input of an exlusive OR gate 728. The other input of the exclusive OR gat 728 is connected to the FSK demodulator 658 output signal on the signal path 659, and the output signal of the exclusive OR gate 728 is connected to the input of an AND gat 730 via a signal path 732. The output signal of the AND gate 714 is connected to the other input of the AND gate 730 via a signal path 734 and the output signal of the AND gate 730 is connected to the N-bit key code storage shift register 721 via a signal path 734 providing the N-bit key code storage shift register clock signal for clocking data received on the signal path 726 into the N-bit key code storage shift register 721. The one-bit shift register clock signal on the signal path 724 and the N-bit shift register clock signal on the signal path 735 are each derived from the decoder control clock signal 718 and both are frequency coherent and coherently related to the FSK generator 132 output signal of the signpost unit 12 received via the decoder 174.

The AND gate 714 output signal is also connected to the input of a one-shot multivibrator 738 via the signal path 734, the output signal of the one-shot multivibrator 738 being connected to the input of an AND gate 740 and to the input of an AND gate 742 via a signal path 744. The exclusive OR gate 728 output signal is also connected to one of the inputs of the AND gate 742 via the signal path 732. The exclusive OR gate 728 output signal is connected to one of the inputs of the AND gate 742 via the signal path 732 and an inverter 746, the inverter 746 output signal being more particularly connected to one of the inputs of the AND gate 742 via a signal path 748. The AND gate 740 output signal is connected to one of the inputs of an AND gate 750 via a signal path 752 and the other input of the AND gate 750 is connected to receive the inverter 716 output signal via a signal path 756, the inverter 716 output signal also being connected to one of the inputs of the AND gate 714 via the signal path 756.

The AND gate 750 output signal is connected to an N-counter 758 via a signal path 760, the N-counter 758 providing an output signal for each predetermined number (N) input signal pulses connected thereto via the signal path 760. The N-counter 758 output signal is connected to the input of an M-counter 762 via a signal path 764, the M-counter 762 being constructed to provide an output signal in response to each predetermined number (M) input pules connected thereto via the signal 176. The M-counter output signal 762 provides the valid data signal via the signal path 176.

The N-bit key code storage shift register 721 output signal is connected to one of the inputs of an exclusive OR gate 766 via the signal path 768 and the other input of the exclusive OR gate 766 is connected to the one-bit shift register output signal on the signal path 726. The exclusive OR gate 766 output signal is connected to one of the inputs of an AND gate 770 via a signal path 772 and the other input of the AND gate 770 is connected to the signal path 760 for receiving the AND gate 750 output signal. The AND gate 770 output signal is connected to the reset input of the M-counter 762 and to the reset input of the N-counter 758 via a signal path 774, the AND gate 770 output signal providing a reset signal for resetting the M-counter 762 and the N-counter 758.

The AND gate 742 output signal is connected to one of the inputs of an AND gate 776 via a signal path 778 and the other input of the AND gate 776 is connected to the signal path 756 for receiving the inverter 716 output signal. The AND gate 776 output signal is connected to the reset input of the N-counter 758 via a signal path 780, the signal path 780 also being connected to the reset input of the divide-by-two counter 710. The AND gate 776 output signal thus provides a reset signal for resetting the N-counter 758, and the divide-by-two counter 710.

The N-bit key code storage shift register 721 is constructed to receive a binary coded signpost code in a serial manner, the binary coded data on the signal path 726 being clocked into the N-bit key code storage shift register 721 via the N-bit shift register clock signal on the signal path 735. The binary coded signpost code in the N-bit key code storage shift register 721 is clocked from the key code storage shift register 721 on the signal path 768 in a serial manner.

The decoder 174 is constructed to check the received, transmitted signpost code and count the number of times the correct transmitted signpost code has been received, the decoder 174 being particularly constructed to determine that the transmitted signpost code has been received a predetermined number (M) times prior to the generation of the valid data signal on a signal path 176. Further, the decoder 174 provides a frequency coherent FSK communication type of apparatus and thus requires no oscillators to generate a receiver master clock signal for operating the decoder 174. The incoming, received FSK signal is utilized by the decoder 174 to provide the receiver master clock signal since this signal oscillates at exactly the same frequency as the transmitter master clock signal derived from the FSK generator 132 output signal on the signal path 136, described before with respect to the signpost unit 12.

The transmitted code data (the FSK signal imposed on the carrier signal) is received via the receiver 650 and the receiver 650 is constructed to detect the incoming signal providing an output signal corresponding to the FSK signal of the received transmitted code data signal, the FSK signal representing the received transmitted code data being provided via the receiver 650 output signal on the signal path 656. Only every other received logic level of the received transmitted logic levels represents a signpost code bit since each signpost code bit is followed by a complement signpost code bit, as described before, Therefore, only every other received logic level or, in other words, only the received signpost code bits are clocked into the shift registers 720 and 721, the received signpost code bit complements being utilized as a means for automatically detecting errors in the received signals received (each received signpost code bit must be followed by the signpost code bit complement before the received signpost code bits are clocked into the N-bit key code storage shift register 721.

The FSK demodulator 658 output on the signal path 659 is connected to the input of the one-bit shift register 720 and to one of the inputs of the exclusive OR gate 728, the signal on the signal path 659 being the demodulated, received FSK signal which included the transmitted signpost code bits, the transmitted signpost code bit complements, and the transmitted synchronization bits, i.e. the transmitted logic levels. The one-bit shift register 720 output signal 726 is connected to the other input of the exclusive OR gate 728 and thus the exclusive OR gate 728 compares the one-bit shift register 720 output signal with the FSK demodulator 658 output signal on the signal path 659.

The decoder control clock signal is connected to the AND gate 712 via the signal path 718 and produces clock pulses at ½ the frequency rate of the clock pulses produced via the receiver master clock signal on the signal path 662. When the decoder control clock signal on the signal path 718 is in the "high" state, the signal on the signal path 622 is in the "high" state and the AND gate 712 provides an output signal in the "high" state via the signal path 724, the AND gate 712 output signal providing the one-bit shift register clock signal for clocking data received via the FSK demodulator 658 output signal path 659 into the one-bit shift register 720. By the same token, when the decoder control clock signal on the signal path 718 is in the "low" state and the receiver master clock signal on the signal path 662 is in the "high" state, the one-bit shift register clock signal is not connected to the one-bit shift register 720 via the signal path 724 since the AND gate 712 does not provide an output signal in this condition (the gate 712 output signal is in the "low" state). Thus, the one-bit shift register clock signal on the signal path 724 is controlled via the AND gate 712 such that data received via the FSK demodulator 658 output signal path 659 is clocked into the one-bit shift register 720 at ½ the frequency rate of the receiver master clock signal on the signal path 662 or, in other words, only every other logic level on the FSK demodulator 658 output signal path 659 is clocked into the one-bit shift register 720, thereby maintaining synchronization of the operation of the one-bit shift register 720 such that only the signpost code bits are clocked into the one-bit shift register 720.

When a signpost code bit is clocked into the one-bit shift register 720 in a manner described before, the one-bit shift register 720 output signal on the signal path 726 has a logic level identical to the logic level of the FSK demodulator 658 output signal on the signal path 659 and thus the exclusive OR gate 728 output signal on the signal path 732 is in the "low" state. In this condition, the AND gate 730 is inhibited which inhibits the N-bit shift register clock signal on the signal path 735, and data is not clocked into the N-bit shift register 721.

When the complement signpost code bit logic level is on the FSK demodulator 658 output signal path 659, the decoder control clock signal on the signal path 718 is in the "low" state and the one-bit shift register 720 clock signal is not connected to the one-bit shift register 729 via the signal path 724, the signal on the signal path 724 being in the "low" state. Thus, the signpost code bit complement is not clocked into the one-bit shift register 720 and the one-bit shift register 720 output signal on the signal path 726 has a logic level corresponding to the logic level of the signpost code bit. In this condition, one of the inputs on the signal path 726 to the exclusive OR gate 728 has a logic level corresponding to the signpost code bit and the other input on the signal path 659 to the exclusive OR gate 728 has a logic level corresponding to the complement signpost code bit, the exclusive OR gate 728 output signal 732 being in the "high" state. When the exclusive OR gate 728 output signal on the signal path 732 is in the "high" state, an N-bit shift register clock signal is connected to the N-bit signpost code storage shift register 721 via the gates 714 and 730, and thus the signpost code bit stored in the one-but shift register 720 and appearing on the signal path 726 is clocked into the N-bit key code shift register 721. Thus, after a signpost code bit has been validated against the signpost code bit complement, the exclusive OR gate 728 output signal on the signal path 732 is in the "high" state and this signal will remain in the "high" state during the signpost code bit complement time period and allow the AND gate 714 to operate providing an output signal via the signal path 734 and, when the signal on the signal path 734 changes from a "high" to a "low" state as controlled by the signal on the signal path 718, an N-bit shift register clock signal pulse is produced on the signal path 735 clocking the signpost code bit into the N-bit signpost code storage shift register 721.

The one-shot multivibrator 728 generates an output signal pulse on the signal path 744 when a "high" to "low" transition occurs via the signal on the signal path 734, the one-shot multivibrator 738 output signal 744 remaining in the "high" state for a predetermined period of time such as for example 1/10 of a receiver master clock signal pulse width. When the one-shot multivibrator 738 output signal is in the "high" state and the output signal of the exclusive OR gate 728 on the signal path 732 is in the "high" state, the AND gate 740 operates providing an output signal via the signal path 752 during the period of time the one-shot multivibrator 738 output signal remains in the "high" state. Thus, when the signpost code bit complement is on the signal path 659, a relatively short duration pulse occurs on the signal path 752 which will be clocked through the AND gate 750 when the inverter 716 output signal on the signal path 756 is in the "high" state.

The AND gate 750 output signal pulse is connected to the N-counter 758 via the signal path 760 and the N-counter 758 is incremented one count indicating that a signpost code bit has been clocked into the N-bit signpost code storage shifr register 721 and the signpost code bit clocked into the N-bit signpost code storage shift register 721 has been followed by its complement (signpost code bit complement). When the predetermined number (N) pulses have been counted by the N-counter 758 prior to the N-counter 758 being reset via a reset signal on the signal path 780, an N-counter 758 output signal is connected to the input of the M-counter 762 via the signal path 764. When the predetermined numer (M) pulses have been connected to the M-counter 762 via the signal path 764 prior to a reset signal being connected to the M-counter 762 via the signal path 774, an M-counter 762 output signal in the "high" state is connected to the signal path 659, the M-counter 762 output signal in the "high" state on the signal path 176 being the valid data signal.

If the signpost code bit complement is not present on the signal path 659 during that time when the signal on the signal path 756 is in the "high" state, the inverter 746 output signal on the signal path 748 will be in the "high" state allowing the AND gate 742 to be operative providing an output signal in the "high" state via the signal path 778 and the AND gate 740 is inoperative (no output signal) in this condition. Thus, one of the input signals to the AND gate 776 is in the "high" state (the signal on the signal path 778) and the other input connected to the AND gate 776 via the signal path 756 is also in the "high" state thereby allowing the AND gate 776 to operate (provide an output signal) and provide the control AND gate 776 output signal on the signal path 788 which is connected to the N-counter 758. The AND gate 776 output signal on the signal path 780 provides both a reset signal causing the N-counter 758 to be reset thereby signaling that an error has been detected or that a synchronization bit is present on the FSK demodulator 658 output signal on the signal path 659, and the N-counter 758 has already counted the pedetermined number (N) signpost code bits clocked into the N-bit signpost code storage shift register 721 (except where the decoder 174 is receiving the first synchronization bit of a new transmission of data). In either event, the N-counter 758 is reset to increment the M-counter 762 when the predetermined number (N) signpost code bits have been received or so that an N-counter 758 output signal is not connected to the M-counter 762 via the signal path 764 for a period of time allowing another predetermined number (N) signpost code bits to be received and clocked into the N-bit key code storage shift register 721 to avoid an error (an erroneous signpost code bit being clocked into the N-bit key code storage shift register 721).

The reset signal on the signal path 780 is also connected to the reset input of the counter 710. When the counter 710 is reset via a received reset signal on the signal path 780 indicating that a signal on the signal path 659 is not the complement of the signpost code bit on the one-bit shift register 720 output signal, the one-bit shift register clock signal on the signal path 724 is inhibited and the N-bit shift register clock signal on the signal path 735 is also inhibited. In this manner, the decoder 174 is self-synchronizing since the first bit of every signpost code is transmitted from the signpost unit 12 and then repeated without the signpost code bit complement prior to initiating the signpost code bit and the signpost code bit complement sequence produced by the signpost encoder 130.

In essence, the transmission of at least two synchronization bits which have the same logic level as the first subsequent signpost code bit "forces" an error condition which resets the decoder 174 so that it is in a proper condition to detect the first signpost code bit. Since the divide-by-two counter 710 produces a one-bit shift register clock signal via the signal path 718, the AND gate 712 produces a "high" signal on the signal path 724 every alternate receiver master clock signal pulse and at least one of the synchronization bits will be clocked into the one-bit shift register 720. It is assured, therefore, that at least one error condition will be detected and the decoder 174 reset, since at least one of the bits immediately subsequent to the synchronization bit is the same logic level as the bit stored in the one-bit shift register 720. As a consequence, the one-bit shift register 720 is inhibited from clocking until after the signpost code bit complement of the first signpost code bit (i.e. the bit stored in the one-bit shift register 720 since the logic level of the stored synchronization bit is the same as that of the first signpost code bit) has been applied to the exclusive OR gate 728 vvia the signal path 659. Similarly, the N-bit key code storage shift register 721 is also prevented from clocking by the error condition until the signpost code bit complement of the first signpost code bit has been applied to the exclusive OR gate 728 via the signal path 659. Once the signpost code bit complement is detected by the exclusive OR gate 728, the AND gate 730 allows the generation of an N-bit shift register clock signal on the signal path 735 under the control of the AND gate 714 as described above. The exclusive OR gate 728, therefore, maintains the decoder 174 in a reset condition so that the N-counter 758 initiates counting as soon as the first signpost code bit has been correctly validated against the following signpost code bit complement.

The signpost code storage shift register 721 also receives the reset signal on the signal path 220 and is reset or conditioned to receive a new, subsequently transmitted signpost code in response to receiving the reset signal in the "high" state, the reset signal on the signal path 220 being provided via the vehicle region logic network 212 in a manner described before. Further, the signpost code storage shift register 721 receives the power level bit via the signal path 180 connected to a predetermined bit position in the signpost code storage shift register 721, the power level bit being encoded in the predetermined bit position of the signpost code storage shift register 721 for reasons described in detail before. The signpost code and the power level bit in the signpost code storage shift register 721 are connected to the comparision logic network 190 via the parallel signal paths 182, each of the parallel signal paths 182 being connected to one predetermined bit position in the signpost code storage shift register 721.

The hand unit 30 is constructed exactly like the signpost unit 12, except the hand unit 30 includes the data entry assembly 150 which is connected to the signpost encoder 130 by the predetermined number of parallel data entry signal paths 150, as described before in connection with FIG. 7. The data entry assembly 150 is constructed to permit the prdetermined signpost code bits comprising the signpost code to be manually entered into the data entry assembly 150 in the predetermined code format (the sequence of "ones" and "zeros" comprising the signpost code) and connected to the shift register 688 of the signpost encoder 130 via the data entry signal paths 152, the data entry assembly 150 comprising thumbwheel switches, push-buttons or other similar decimal-to-binary code converters well-known in the art. With respect to the hand unit 30, the signpost encoder 130 also receives a strobe signal indicating the binary coded data in the signpost encoder 130 has been transmitted a predetermined number of times, the strobe signal conditioning the shift register in the signpost encoder 130 for receiving binary coded data via the data entry assembly 150.

A transmitter and a receiver for communicating time division binary codes utilizing the frequency shift key (FSK) technique in a manner just described with respect to the decoder 174 and the signpost encoder 130 shown in FIGS. 12 and 13 are disclosed in detail in the Applicant's co-pending patent application entitled "A COHERENT, FIXED BAUD RATE, FSK COMMUNICATION METHOD AND APPRATATUS", Ser. No. 458,330, filed Apr. 5, 1974, and referred to in the Applicant's other co-pending patent application entitled "ACCESS CONTROL ASSEMBLY", Ser. No. 468,486, filed May 9, 1974. In a preferred embodiment of the present invention, it also is contemplated that the binary coded data transmitted via the vehicle unit 16 and received via the base station 22 and the binary coded data transmitted via the base station 22 and received via the vehicle unit 16 be communicated between the vehicle unit 16 and the base station 22 utilizing the frequency shift key (FSK) and the transmitter and the receiver apparatus of the type described above with respect to the decoder 174 and the signpost encoder 130 and described in detail in the Applicant's co-pending patent applications referred to above. In this preferred embodiment, the encoder 240 is constructed similar to the signpost encoder 130 and the binary coded data is clocked from the shift register in a serial manner for transmission to the base station 22 in a manner described in detail in the Applicant's co-pending applications referred to above, the base station 22 receiver being constructed similar to the vehicle receiver 170 and the decoder 174 described before and disclosed in greater detail in the Applicant's co-pending patent applications referred to above. By the same token, the identification decoder 280 is constructed similar to the vehichle receiver 170 and the decoder 174 described in detail before and disclosed in detail in the Applicant's co-pending patent applications referred to above for receiving binary coded data transmitted via the base station 22, and the base station 22 transmitter is constructed similar to the signpost unit 12 described before and disclosed in detail in the Applicant's co-pending patent applications referred to above for communicating binary coded data utilizing the frequency shift key (FSK) technique. In view of the foregoing detailed description with respect to FIGS. 12 and 13 and considering the detailed disclosure contained in the Applicant's co-pending patent applications referred to above, further detailed discussion of the details of receivers and transmitters for communicating binary coded data utilizng the frequency shift key (FSK) technique is not deemed necessary herein.

Embodiment of FIG. 14

In many applications, the vehicles to be monitored via the automatic vehicle monitoring apparatus of the present invention now have existing two-way radios utilized for voice communication between the vehicle and the base station. The present invention includes an interface unit 800 connected between the existing two-way radio and the vehicle unit 16 or 16d of the present invention, only portions of the existing two-way radio being shown in FIG. 14 and the existing two-way radio including the interface unit 800 being diagrammatically shown in FIGS. 9 and 11 and designated therein as the radio transmitter-receiver 279.

The signals received via the vehicle unit 16 or 16d are connected to the interface unit 800 via the radio auxiliary speaker output jack (diagrammatically shown in FIG. 14 and designated therein via the reference numeral 801), the received signal being provided on a signal path 802. A digital detector 804 receives the signal on the signal path 802 and converts the received signal on a logic signal voltage which is provided on the digital detector 804 output signal path 282 (the signal path 282 being the signal path between the radio transmitter-receiver 279 and the identification decoder 280 shown in FIGS. 9 and 11).

The signal path 282 is connected to one of the inputs of an OR gate 806 and the signal path 266 is connected to the other input of the OR gate 806. The OR gate 806 provides an output signal in the "high" state on a signal path 808 in response to receiving an input signal in the "high" state on the signal path 282 or the signal path 266, the OR gate 806 output signal on the signal path 808 being received via a retriggerable one-shot multivibrator 810 (the signal on the signal path 266 being the multivibrator 264 output signal shown in FIGS. 9 and 11).

The multivibrator 810 provides an output signal on a signal path 812 in the "high" state in response to receiving the OR gate 806 output signal in the "high" state. The multivibrator 810 output signa remains in the "high" state for a predetermined period of time, the multivibrator 810 output signal being returned to the "low" state at the end of the predetermined period of time.

The multivibrator 810 output signal is received via a NOR gate 814 and the NOR gate 814 also receives a signal on a signal path 816. The NOR gate 814 provides an output signal on the signal path 278, the NOR gate 814 output signal being in the "low" state in response to receiving a multivibrator 810 output signal in the "high" state or a signal in the "high" state on the signal path 816 (the signal on the signal path 278 being the radio transmitter-receiver 279 output signal indicating the radio transmitter-receiver 279 is being utilized for voice communication in the "low" state thereof and indicating the radio transmitter-receiver 279 is available for the communication of binary coded data in the "high" state thereof, as shown in FIGS. 9 and 11).

The signal path 266 is connected to an inverter 818 and the inverter 818 provides an output signal on a signal path 820 in the "high" state in response to a received signal in the "low" state on the signal path 266, the inverter 818 providing an output signal in the "low" state in response to receiving a signal in the "high" state. The signal path 266 is also connected to the input of a linear amplifier 822, the linear amplifier 822 also receiving an input signal on the signal path 283 (the signal path 283 receiving the binary coded data in the encoder 240 and connecting the coded data to the radio transmitter-receiver 279 for transmitting to the base station 22, as shown in FIGS. 9 and 11).

The inverter 818 output signal on the signal path 820 is connected to the input of another linear amplifier 824 and to the input of an AND gate 826. The AND gate 826 also receives a signal via a signal path 828 and provides an output signal on the signal path 816 in the "high" state in the response to receiving signals in the "high" state on the signal paths 820 and 828. The signal path 828 is connected to the existing radio microphone (diagrammatically shown in FIG. 14 and designated via the reference numeral 830), a signal path 832 also being connected to the radio microphone 830. The signals on the signal paths 828 and 832 are each in the "high" state when the existing radio transmitter-receiver is being utilized for voice communication and in the "low" state when the existing radio transmitter-receiver is available for the communication of binary coded data.

The linear amplifier 824 receives the signal on the signal path 832 and the inverter 818 output signal on the signal path 820, and provides an amplified output signal on a signal path 834 in the "high" state of the inverter 818 output signal. The linear amplifier 822 provides an amplified output signal on the signal path 834 in the "high" state of the signal on the signal path 266.

An OR gate 836 receives the AND gate 826 output signal on the signal path 816 and the signal on the signal path 266, the OR gate 836 providing an output signal on a signal path 838 in the "high" state in response to receiving signals in the "high" state on the signal paths 816 and 266. The amplifier 824 output signal on the signal path 834 is connected to and received by the existing radio microphone input jack (diagrammatically shown in FIG. 14 and designated via the reference numeral 840), the OR gate 836 output signal on the signal path 838 also being connected to and received by the radio microphone input jack 840.

An inverter 842 receives the OR gate 838 output signal on the signal path 838 and provides an output signal on the signal path 274 in the "high" state in response to receiving an input signal in the "low" state, the inverter 842 providing an output signal in the "low" state in response to receiving an input signal in the "high" state. The inverter 842 output signal in the "high" state on the signal path 274 indicating the termination of the communication of binary coded data, as described before in connection with FIGS. 9 and 11.

When the vehicle radio transmitter-receiver is being utilized for voice communication, the signal paths 828 and 832 each have a signal in the "high" state thereon, and when the vehicle unit 16 or 16d is not transmitting binary coded data, the signal on the signal path 266 is in the "low" state, the AND gate 826 receiving signals in the "high" state on the input signal paths 828 and 820 (the inverter 818 output signal on the signal path 820 being in the "high" state since the inverter 818 is receiving a signal in the "low" state on the signal path 266). The AND gate 826 provides the output signal in the "high" state on the signal path 816 in response to the received signals in the "high" state and the NOR gate 814 provides the output signal in the "low" state on the signal path 278 in response to the received signal in the "high" state on the signal path 816, the NOR gate 814 providing the output signal in the "low" state if either or both of the input signals on the signals paths 812 and 816 are in the "high" state. The signal in the "low" state on the signal path 278 indicates that the radio transmitter-receiver is being utilized for voice communication and is not available for the communication of binary coded data, the signal in the "low" state on the signal path 278 rendering the AND gate 276 inoperative preventing the AND gate 276 output signal in the "high" state from operating the multivibrator 264 to provide the signal in the "high" state on the signal path 266 (the AND gate 276 and the multivibrator 264 including the connecting signal paths being shown in FIGS. 9 and 11). If a signal is received via the radio auxiliary speaker output 801 and the signal paths 802 and 282, while the radio transmitter-receiver is being utillized for voice communication, the OR gate 806 produces an output signal on the signal path 808 in the "high" state causing the multivibrator 810 output signal to be produced in the "high" state, the NOR gate 814 output signal on the signal path 278 remaining in the "low" state indicating the radio transmitter-receiver is being utilized for voice communication, signals cannot be transmitted or received via the radio transmitter-receiver, and the voice signals from the radio microphone 830 are amplified via the amplifier 824 and via the AND gate 826 output signal in the "high" state causing the OR gate 836 output signal on the signal path 838 to be in the "high" state, the amplified voice signals being connected to the radio microphone input jack 840 via the signal path 834 for transmission (the amplifier 824 amplifying the voice signals on the signal path 832 since the inverter 818 output signal on the signal path 820 is in the "high" state).

When the vehicle radio transmitter-receiver is not being utilized for voice communication, the radio microphone 830 output signals on the signal paths 828 and 832 are each in the "low" state and thus the AND gate 826 provides the output signal on the signal path 816 in the "high" state which is received via the NOR gate 814, the NOR gate 814 providing an output signal in the "low" state if the multivibrator 810 output signal on the signal path 812 is in the "low" state. The multivibrator 810 is produced in the "high" state in response to a received signal via the radio auxiliary speaker output 801 and the signal paths 802 and 282.

Assuming the radio transmitter-receiver is not receiving signals via the radio auxiliary speaker output 801 and the radio transmitter-receiver is not being utilized for voice communication, the OR gate 806 produces an output signal in the "high" state on the signal path causing the multivibrator 812 to produce the output signal in the "high" state on the signal path 812 when the multivibrator 264 produces an output signal in the "high" state on the signal path 266 indicating binary coded data is to be transmitted, and the NOR gate 814 produces the output signal in the "low" state on the signal path 278 in response to a received signal in the "high" state on the signal path 812 indicating the radio transmitter-receiver is available for the transmission of the binary coded data. The binary coded data in the encoder 240 is connected to the radio transmitter-receiver via the signal path 283 and the received signal is amplified via the amplifier 282 since the signal on the signal path 266 is in the "high" state, the amplified signal being connected to the radio microphone input jack 840 along with the signal in the "high" state on the signal path 838 for transmission (the OR gate 836 receives the AND gate 826 output signal in the "low" state on the signal path 816 and the signal in the "high" state on the signal path 266). The inverter 842 receives the signal in the "high" state on the signal path 838 and provides the output signal in the "low" state on the signal path 274, the signal on the signal path 274 returning to the "high"

state when the transmission of the binary coded data is completed.

When the vehicle radio transmitter-receiver is not being utilized for voice communication and a signal in the "low" state is being received via the signal path 266, signals encoded with binary coded data are received via the radio auxiliary speaker output 801 and connected to the radio interface 800 via the signal path 802 causing the OR gate 806 to produce an output signal in the "high" state on the signal path 808, the multivibrator 810 producing an output signal in the "high" state on the signal path 812 in response to the received signal in the "high" state. The AND gate 826 produces an output signal in the "low" state in resonse to the received signal in the "high" state. The AND gate 826 produces an output signal in the "low" state in response to the received signal in the "low" state on the signal path 828 and the OR gate 836 produces an outut signal in the "low" state in response to received signals in the "low" state on the signal paths 816 and 266, the inverter 842 producing an output signal in the "low" state on the signal path 274. The NOR gate 814 receives the signal in the "high" state on the signal path 812 and the signal in the "low" state on the signal path 816 and produces the signal on the signal path 278 in the "low" state indicating the vehicle radio transmitter-receiver is not available for the communication of binary coded data, the binary coded data being connected to the identification decoder 280 via the signal path 282 in this condition. The multivibrator 810 output signal remains in the "high" state for a predetermined period of time and thus, if a signal is not received on the signal path 282 within the predetermined period of time, the multivibrator 801 output signal on the signal path 812 returns to the "high" state indicating the vehicle radio transmitter-receiver is available for the communication of binary coded data or for voice communication.

The time required for the vehicle unit 16 or 16d to transmit the binary coded data in the encoder 240 and the time required for the vehicle unit 16 or 16d to receive binary coded data in the identification decoder 280 are each relatively short [such as (20) milliseconds, for example] and thus the radio transmitter-receiver is available for voice communication in a relatively short period of time in the event the vehicle unit 16 or 16d is transmitting or receiving binary coded data when the vehicle operator attempts to utilize the vehicle radio transmitter-receiver for voice communication. The interface unit 800 thus provides an interface between an existing two-way radio and the vehicle unit of the present invention such that the existing two-way radio can be utilized for the transmission and the reception of binary coded data on a substantially non-interfering basis with the voice communication function of the two-way radio. When the radio transmitter-receiver is being utilized for the communication of binary coded data the voice communication audio signal path 832 is disengaged and the signal on the signal path 828 connects the binary coded data on the signal path 283 to the radio transmitter-receiver for transmission via the amplifier 822.

Changes may be made in the construction and the operation of the various components and assemblies and in the steps of the method described herein without departing from the spirit and the scope of the invention as defined in the following claims.

What is claied is:

1. Apparatus for use in monitoring objects within a predetermined monitored area comprising:
   at least two signpost units, each signpost unit being positioned within the monitored area and each signpost unit having a predetermined signpost code encoded therein identifying the signpost unit and providing an output signal encoded with the signpost code, each signpost unit outut signal establishing a far-field region extending a distance generally from the signpost unit, each signpost unit being positioned with respect to at least one other signpost unit so a portion of the far-field region of each signpost unit overlaps a portion of the far-field region of at least one other signpost unit, thereby forming an overlap region encompassing a predetermined coverage region with the monitored area;
   means in the monitored object receiving the signpost unit output signals having a portion detecting the signpost code encoded in the received signpost unit output signal and providing an output signal in response to the received signpost unit output signal for indicating the location of the monitored object as being within the far-field region of the signpost unit identified via the signpost code corresponding to the signpost code encoded in the received signpost unit output signal; and
   means in the monitored object for determining and indicating the location of the monitored object as being within one of the overlap regions.

2. The apparatus of claim 1 wherein the means in the monitored object for determining and indicating the location of the monitored object within one of the overlap regions is defined further to include a portion comparing each received signpost code with the previously received signpost code for determining the reception of at least two different signpost codes and for indicating the location of the monitored object within the overlap region formed via the overlapping portions of the far-field regions of the two signpost units identified via the two different received signpost codes.

3. The apparatus of claim 1 wherein each signpost unit is defined further as providing the output signal with the signpost code encoded therein establishing a near-field region extending a distance from the signpost unit, the far-field region extending a distance from the signpost unit greater than the distance of the near-field region from the signpost unit, and the strength of the signpost unit output signal within the near-field region being greater than the strength of the signpost unit output signal in the far-field region; and wherein the means in the monitored object for indicating the location of the monitored object within the far-field region is defined further as having a portion detecting the strength of the received signpost unit output signal and providing one output signal in response to a received signpost unit output signal having a signal strength less than a predetermined signal strength level thereby indicating the location of the monitored object within the near-field region of the signpost unit identified via the signpost code encoded in the received signpost unit output signal, and providing another output signal in response to a received signpost unit output signal having a signal strength level greater than the predetermined signal strength level thereby indicating the location of the monitored object within the far-field region of the signpost unit identified via the signpost code encoded in the received signpost unit output signal.

4. The apparatus of claim 3 defined further to include a plurality of signpost units positioned within the monitored area, the far-field region and the near-field region of each signpost unit encompassing predetermined coverage regions within the monitored area, the coverage regions encompassing some of the space within the monitored area and the remaining space within the coverage region defining open regions, the signpost units being spaced within the monitored area to substantially assure the passing of the monitored object from at least one of the coverage regions upon entering one of the open regions and to substantially assure the passing of the monitored object into at least one of the coverage regions upon leaving one of the open regions during the movement of the monitored object within the monitored area.

5. The apparatus of claim 3 defined further to include a plurality of signpost units positioned within the monitored area, the far-field region and the near-field region of each signpost unit encompassing predetermined coverage regions within the monitored area and the signpost units being spaced within the monitored area to substantially assure the passing through at least one of the coverage regions by a monitored object entering and leaving the monitored area.

6. The apparatus of claim 3 wherein the means in the monitored object for providing the output signals indicating the location of the monitored object within the near-field and the far-field regions is defined further to include:
- a receiver for receiving the signpost unit output signals and providing a receiver output signal encoded with the signpost code encoded in the received signpost unit output signal; and
- a power level detector receiving the receiver output signal and providing a power level signal in one state in response to a received receiver output signal having a signal strength less than the predetermined signal strength level thereby indicating the location of the monitored object within the far-field region of the singpost unit identified via the signpost code encoded in the received signpost unit output signal and providing a power level signal in anothr state in response to a received receiver output signal having a signal strength greater than the predetermined signal strength level thereby indicating the location of the monitored object within the near-field region of the signpost unit identified via the signpost code encoded in the received signpost unit output signal.

7. The apparatus of claim 6 wherein the means in the monitored object for providing the output signals indicating the location of the monitored object within the near-field and the far-field regions is defined further to include:
- a decoder receiving the receiver output signal and providing the signpost code encoded in the received receiver output signal via a decoder output signal, the decoder receiving the power level signal provided via the power level detector and providing the received power level signal along with the signpost code via the decoder output signal, the state of the power level signal indicating the location of the monitored objection within the near-field region of the signpost unit identified via the signpost code encoded in the receiver output signal in one state of the power level signal and indicating the location of the monitored object within the far-field region of the signpost unit identified via the signpost code encoded in the receiver output in one other state of the power level signal.

8. The apparatus of claim 7 wherein the decoder is defined further as providing a valid data signal in response to receiving a signpost code via the receiver output signal having a predetermined code format.

9. The apparatus of claim 7 wherein each signpost unit is defined further as repeatably providing a time division binary signpost code uniquely identifying the signpost unit; and wherein the decoder is defined further as providing a valid data signal in response to receiving a signpost code via the receiver output signal having the predetermined code format and repeatable a predetermined number of times.

10. The apparatus of claim 7 defined further to include a plurality of signpost units positioned within the monitored area, the far-field region and the near-field region of each signpost unit encompassing predetermined coverage regions and a portion of the far-field of some of the signpost units overlapping a portion of the far-field region of at least one other signpost unit, the overlapping portions of the far-field regions defining predetermined overlap regions encompassing predetermined coverage regions within the monitored area and the signpost units having the far-field regions forming each overlap region providing the signpost codes in an alternating manner for reception within each overlap region.

11. The apparatus of claim 10 wherein the means in the monitored object for indicating the location of the monitored object within one of the overlap regions is defined further to include:
- means receiving the signpost codes and accompanying power level signals via the decoder output signal, storing the received signpost codes and accompanying power level signal, and comparing each of the received signpost codes and accompanying power level signals with the last received signpost code and accompanying power level signal for determining the reception of at least two different signpost codes in an alternating manner each having an accompanying power level signal indicating the location of the monitored object within a far-field region, said means providing an output signal indicating the location of the monitored object in the overlap region formed via the overlapping portions of the far-field regions of the signpost units identified via the received signpost codes.

12. The apparatus of claim 11 wherein the decoder is defined further as providing the signpost code and accompanying power level signal via a plurality of parallel signal paths, each bit of the signpost code being provided on one of the parallel signal paths and the power level signal being provided on one of the parallel signal paths, other than the parallel signal paths having the signpost code bits provided thereon; and wherein the means storing and comparing the received signpost codes and accompanying power level signals is defined further to include:
- a storage unit receiving the signpost codes and accompanying power level signal provided by the decoder on the parallel signal paths, the storage unit storing each received signpost code and accompanying power level signal in one condition of the storage unit, the storage unit providing the signpost code and accompanying power level signal stored therein via a plurality of parallel signal paths in one other condition of the storage unit, each bit of the signpost code and the accompanying power level signal being provided on one of the parallel signal paths; and a comparison logic network receiving the signpost code provided by the decoder on the parallel signal paths and the signpost code and accompanying power level signal provided by the storage unit on the parallel signal paths, the comparison logic network comparing the signpost code and accompanying power level signal from the decoder with the signpost code and accompanying power level signal from the storage unit, and providing an output signal in response to the signpost code and accompanying power level signal received in the decoder being identical to the signpost code and accompanying power level signal provided via the storage unit, and another output signal in response to the signpost code and accompanying power level signal received in the decoder being different than the signpost code and accompanying power level signal in the storage unit.

13. The apparatus of claim 12 wherein each signpost unit repeatably provides the time division binary signpost code identifying the signpost unit; and wherein the decoder provides a valid data signal in response to receiving a signpost code via the receiver output signal having the predetermined code format; and wherein the comparison logic network is defined further to include:
a plurality of exclusive OR gates, each exclusive OR gate receiving the signal on one of the parallel signal paths provided via the decoder and the signal on one of the parallel signal paths provided via the storage unit, each exclusive OR gate providing an output signal in the "low" state in response to indentical received signals and an output signal in the "high" state in response to different received signals; and
a NAND gate receiving each of the output signals from exclusive OR gates, and providing an output signal in the "high" state in response to receiving a signal in the "high" state from any of the exclusive OR gates thereby indicating a signpost code and accompanying power level signal in the decoder different from the signpost code and accompanying power level signal in the storage unit, and providing an output signal in the "low" state in response to receiving a signal in the "low" state from each of the exclusive OR gates thereby indicating a signpost code and accompanying power level signal in the decoder identical with the signpost code and accompanying power level signal in the storage unit.

14. The apparatus of claim 13 wherein the decoder provides the valid data signal in the "high" state in response to receiving a signpost code having a predetermined code format and the valid data signal in the "low" state in response to receiving a signpost code having a code format other than the predetermined code format; and wherein the comparison logic network is defined further to include:
an inverter receiving the NAND gate output signal, and providing an output signal in the "high" state in response to receiving a NAND gate output signal in the "low" state, and providing an output signal in the "low" state in response to receiving a NAND gate output signal in the "high" state;
a first NAND gate receiving the valid data signal and the inverter output signal, and providing an output signal in the "high" state in response to receiving a valid data signal in the "high" state and an inverter output signal in the "high" state, and providing an output signal in the "low" state in response to receiving a valid data signal in the "low" state, and providing an output signal in the "low" state in response to receiving an inverter output signal in the "low" state, the first AND gate providing the comparison logic network output signal in the "high" state indicating a signpost code and accompanying power level signal in the decoder identical with the signpost code and accompanying power level signal in the storage unit; and
a second AND gate receiving the valid data signal and the NAND gate output signal, and providing an output signal in the "high" state in response to receiving a valid data signal in the "high" state and a NAND gate output signal in the "high" state, and providing an output signal in the "low" state in response to receiving a valid data signal in the "low" state, and providing and output signal in the "low" state in response to receiving a NAND gate output signal in the "low" state, the second AND gate output signal providing the comparison logic network output signal in the "high" state indicating a signpost code and accompanying power level signal in the decoder different from the signpost code and accompanying power level signal in the storage unit.

15. The apparatus of claim 12 defined further to include:
a vehicle region logic network in the monitored object receiving the output signals from the comparison logic network, and providing an output signal in response to received output signals from the comparison logic network for indicating a signpost code and accompanying power level signal different from the signpost code and accompanying power level signal in the storage unit being consecutively received a predetermined number of times via the decoder, the vehicle region logic network providing another output signal in response to received output signals from comparison logic network for indicating two diferent signpost codes and accompanying power level signals being received via the decoder in an alternating manner a predetermined number of times.

16. The apparatus of claim 15 wherein the vehicle region logic network is defined further as providing a reset signal in response to received output signals from the vehicle region logic network for indicating the same signpost code and accompanying power level signal being received via the decoder; and wherein the decoder is defined further as receiving the reset signal provided via the vehicle region logic network, the decoder receiving a signpost code and accompanying power level signal in one condition and the decoder being conditioned for receiving a signpost code and accompanying power level signal in response to receiving the reset signal provided via the vehicle region logic network.

17. The apparatus of claim 16 wherein the comparison logic network is defined further as providing an output signal in the "high" state for indicating a signpost code and accompanying power level signal received in the decoder identical with the signpost code and accompanying power level signal in the storage unit, and an output signal in the "high" state indicating a signpost code and accompanying power level signal in the decoder different from the signpost code and accompanying power level signal in the storage unit.

18. The apparatus of claim 17 wherein the vehicle region logic network is defined further to include:
a first flip-flop network receiving the comparison logic network output signal indicating different signpost codes and accompanying power level signals in the decoder and the storage unit and providing an output signal in the "low" state in response to a received comparison logic network output signal in the "low" state;
a first inverter receiving the first flip-flop network output signal and providing an output signal in the "low" state in response to a received first flip-flop network output signal in the "high" state, and providing an output signal in the "high" state in response to receiving a first flip-flop network output signal in the "low" state;
an AND gate receiving the comparison logic network output signal indicating the identical signpost codes and accompanying power level signals in the decoder and the storage unit and receiving the first inverter output signal, the first AND gate providing an output signal in the "high" state in response to receiving a comparison logic network output signal in the "high" state and in the "high" state of the first inverter output signal, the first AND gate providing an output signal in the "low" state in response to receiving a comparison logic network output signal in the "low" state and providing an outut signal in the "low" state in response to receiving a first inverter output signal in the "low" state; and
a first OR gate receiving the first AND gate output signal and the comparison logic network output signal indicating different signpost codes and accompanying power level signals in the decoder and storage unit, the first OR gate providing the reset signal in the "high" state in response to receiving a comparison logic network output signal in the "high" state and providing the reset signal in the "high" state in response to receiving a first inverter output signal in the "high" state.

19. The apparatus of claim 15 wherein the comparison logic network is defined further as providing an output signal in the "high" state for indicating a signpost code and accompanying power level signal received in the decoder identical with the signpost code and accompanying power level signal in the storage unit, and an output signal in the "high" state indicating a signpost code and accompanying power level signal in the decoder different from the signpost code and accompanying power level signal in the storage unit; and wherein the vehicle region logic network is defined further to include:
a first flip-flop network receiving the comparison logic network output signal indicating different signpost codes and accompanying power level signals in the decoder and the storage unit and providing an output signal in the "low" state in response to a received comparison logic network output signal in the "low" state;
a first inverter receiving the first flip-flop network output signal and providing an output signal in the "low" state in response to a received first flip-flop network output signal in the "high" state, and providing an output signal in the "high" state in response to receiving a first flip-flop network output signal in the "low" state;
an AND gate receiving the comparison logic network output signal indicating the identical signpost codes and accompanying power leverl signals in the decoder and the storage unit and receiving the first inverter output signal, the first AND gate providing an output signal in the "high" state in response to receiving a comparison logic network output signal in the "high" state and in the "high" state of the first inverter output signal, the first AND gate providing an output signal in the "low" state in response to receiving a comparison logic network output signal in the "low" state and providing an output signal in the "low" state in response to receiving a first inverter output signal in the "low" state; and
a first counter receiving the comparison logic network output signal indicating different signpost codes and accompanying power level signals and providing the vehicle region logic network output signal in the "high" state in response to receiving a predetermined number of pulses for indicating a signpost code and accompanying power level signal different from the signpost code and accompanying power level signal in the storage unit being consecutively received a predetermined number of times via the decoder, the counter receiving the first AND gate output signal and being reset in response to a received first AND gate output signal in the "high" state.

20. The apparatus of claim 19 wherein the vehicle region logic network is defined further to include:
a second counter receiving the comparison logic network output signal indicating a signpost code and accompanying power level signal received in the decoder identical to the signpost code and accompanying power level signal in the storage unit, and providing an output signal in the "high" state in response to receiving a predetermined number of pulses for providing a vehicle region logic network output signal in the "high" state indicating the moving of a monitored object from one of the coverage regions within the monitored area, the second counter receiving and being reset in response to a "high" state of the comparison logic network output signal indicating different signpost codes and accompanying power level signals in the decoder and the storage unit;
a second OR gate receiving the second counter output signal, the first AND gate output signal and the counter output signal, the second OR gate providing an output signal in the "high" state in response to receiving a signal in the "high" state;
a third OR gate receiving the first counter output signal and the second counter output signal and providing an output signal in the "high" state in response to receiving a signal in the "high" state;
a fourth OR gate receiving each of the comparison logic network output signals and providing an output signal in the "high" state in response to a received comparison logic network output signal in the "high" state;
a third counter receiving the fourth OR gate output signal and providing an output signal in the "high" state in response to receiving a predetermined number of fourth OR gate output signal pulses, the third counter receiving the second OR gate output signal and being reset in response to a received second OR gate output signal;
- a second flip-flop network receiving the third counter output signal and providing an output signal in the "high" state in response to a received second flip-flop network output signal in the "high" state, the second flip-flop network receiving the third OR gate output signal and being reset in response to receiving a third OR gate output signal in the "high" state;
- a second inverter receiving the first counter output signal, and providing an output signal in the "high" state in response to receiving a first couter output signal in the "low" state and providing an outut signal in the "low" state in response to receiving a first counter output signal in the "high" state; and
- a second AND gate receiving the second inverter output signal and the second flip-flop network output signal, and providing an output signal in the "high" state in response to receiving a second inverter output signal in the "high" state and a second flip-flop network output signal in the "high" state, the second AND gate providing the vehicle region logic network output signal indicating two different signpost codes and accompanying power level signals being received via the decoder in an alternating manner a predetermined number of times.

21. The apparatus of claim 20 wherein the vehicle region logic network is defined further to include:
- a fifth OR gate output signal receiving the first counter output signal and the second flip-flop network output signal, and providing an output signal in the "high" state in response to receiving one of the first counter output signals and the second flip-flop network output signal in the "high" state, the fifth OR gate output signal being received via the first flip-flop network and the first flip-flop network output signal being reset in response to receiving a fifth OR gate output signal in the "high" state.

22. The apparatus of claim 15 wherein the storage unit is defined further as receiving a signal for conditioning the storage unit to provide the signpost code and accompanying power level signal via the storage unit parallel signal paths in the "high" state of the received signal; and wherein the apparatus is defined further to include:
- a location encoder in the monitored object receiving the signpost code and accompanying power level signal from the storage unit via the storage unit parallel signal paths in one condition of the storage unit; and
- means in the monitored object receiving the vehicle region logic network output signal indicating a signpost code and accompanying power level signal received in the decoder identical with the signpost code and accompanying power level signal in the storage unit in the "high" state and receiving the vehicle region logic network output signal indicating a signpost code and accompanying power level signal in the decoder different from the signpost code and accompanying power level signal in the storage unit in the "high" state, said means providing the output signal in the "high" state for conditioning the storage unit to provide the signpost code and accompanying power level signal via the storage unit parallel signal paths for storin the location encoder in the "high" state of any one of the vehicle region logic network output signals received via said means.

23. The apparatus of claim 22 wherein the encoder is defined further as receiving the vehicle region logic network output signal indicating two different signpost codes and accompanying power level signals being received via the decoder in an alternating manner, the encoder storing the vehicle region logic network output signal indicating two different signpost codes and accompanying power level signals being received via the decoder in an alternating manner and the stored vehicle region logic network output signal along with the signpost codes and accompanying power level signals identifying an overlap region.

24. The apparatus of claim 22 wherein the location encoder is defined further as receiving the vehicle region logic network indicating two different signpost codes and accompanying power level signals being received via the decoder in an alternating manner and the state of predetermined bit positions of the signpost code stored in the location encoder being changed in response to the vehicle region logic network output signal received via the location encoder for providing a pseudo-signpost code uniquely identifying the overlap region formed via the four-field regions identified via the two different signpost codes received in an alternating manner.

25. The apparatus of claim 22 wherein the apparatus is defined further to include:
- means in the monitored object connected to the location encoder for receiving and transmitting the codes stored in the location encoder in response to the location encoder receiving a code from the storage unit in an automatic reporting mode, said means having a portion for receiving a code identifying one of the coverage regions within the monitored area and comparing the received code with the code stored in the location encoder identifying one of the coverage regions, and transmitting the codes stored in the location encoder in response to an identical comparison of the received code with the code stored in the location encoder identifying one of the coverage regions in a region reporting mode.

26. The apparatus of claim 22 wherein the location encoder is defined further as having a vehicle code stored therein for identifying the monitored object; and wherein the apparatus is defined further to include:
- means in the monitored object connected to the location encoder for receiving and transmitting the codes stored in the location encoder in response to the location encoder receiving a code from the storage unit in an automatic reporting mode, said means having a portion for receiving a vehicle code identifying one of the monitored objects and comparing the received vehicle code with the vehicle code stored in the location encoder, and transmitting the codes stored in the location encoder in response to an identical comparison of the received vehicle code with the vehicle code stored in the location encoder in a vehicle polling mode.

27. The apparatus of claim 26 wherein the means for transmitting the codes in the location encoder is defined further as having a portion for receiving a code identifying one of the coverage regions within the monitored area and comparing the received code with the code stored in the location encoder identifying one of the coverage regions and transmitting the codes stored in the location encoder in response to an identical comparison of the received code with the code stored in the location encoder identifying one of the coverage regions in a region reporting mode.

28. The apparatus of claim 27 defined further to include:
  means in the monitored object for receiving operating mode bits and conditioning the means for transmitting the codes in the location encoder in the automatic reporting mode in response to one received predetermined operating mode bit, and conditioning the means for transmitting the codes in the vehicle reporting mode in response to another received predetermined operating mode bit, and conditioning the means for transmitting the codes in the region reporting mode in response to one other received predetermined operating mode bit.

29. The apparatus of claim 22 defined further to include:
  means in the monitored object for transmitting the codes stored in the location encoder in one condition; and
  means in the monitored object for conditioning the means for transmitting the codes in the condition for transmitting the codes stored in the location encoder.

30. The apparatus of claim 22 wherein the monitored object includes a vehicle transmitter-receiver for two-way voice communication, the vehicle transmitter-receiver being available for transmitting and receiving codes except when the vehicle transmitter-receiver is being utilized for voice communication; and wherein the apparatus is defined further to include:
  an interface unit in the monitored object connected to the vehicle transmitter-receiver and to the location encoder for connecting the codes in the location encoder to the vehicle transmitter-receiver for transmission via the vehicle transmitter-receiver when the vehicle transmitter-receiver is available for transmitting and receiving codes.

31. The apparatus of claim 15 defined further to include:
  means in the monitored object for providing an output signal pulse in response to the movement of the object a predetermined distance;
  a counter in the monitored object receiving the output signal pulses from the means for providing an output signal pulse in response to the movement of the object a predetermined distance, the counter providing an output signal pulse in response to a predetermined number of input signal pulses received from the means for providing an output signal pulse in response to the movement of the object, the counter output signal pulses indicating the movement of the object a predetermined distance, the counter having a portion for receiving a reset signal and the counter being reset in response to a received reset signal;
  means in the monitored object receiving the vehicle region logic network output signal indicating identical signpost codes being repeatedly received via the decoder and providing an output signal in the "high" state in response thereto, and receiving the vehicle region logic network output signal indicating different signpost codes received in an alternating manner via the decoder and providing an output signal in the "high" state in response thereto, the counter receiving the output signals from said means and the counter being reset in response to a received output signal from said means in the "high" state, the counter providing an output signal indicating the movement of the object a predetermined distance unless reset via said means output signal in the "high" state;
  a location encoder in the monitored object receiving and storing the counter output signal; and
  means in the monitored object for transmitting the counter signal stored in the location encoder.

32. The apparatus of claim 15 defined further to include:
  a timer in the monitored object providing output signal pulses at a predetermined rate;
  a counter in the monitored object receiving the timer output signal pulses and providing an output signal in response to a received predetermined number of timer output signal pulses, the counter output signal indicating a predetermined time lapse, and the counter receiving a signal and being reset in response to a received signal in the "high" state;
  means in the monitored object receiving the vehicle region logic network output signal indicating identical signpost codes being repeatedly received via the decoder and providing an output signal in the "high" state in response thereto, and receiving the vehicle region logic network output signal indicating different signpost codes received in an alternating manner via the decoder and providing an output signal in the "high" state in response thereto, the counter receiving the output signal from said means and being reset in response to a received signal from said means in the "high" state, the counter output signal indicating the time lapsed since the object entered one of the coverage regions;
  a location encoder in the monitored object receiving and storing the counter output signal; and
  means in the monitored object for transmitting the counter signal stored in the location encoder.

33. The apparatus of claim 6 wherein the means in the monitored object for indicating the location of the monitored object within one of the overlap regions is defined further to include:
  means storing the received signpost and accompanying power level signals, and comparing each of the received signpost codes and accompanying power level signals with the previously received signpost code and accompanying power level signal for determining the reception of at least two different signpost codes each having an accompanying power level signal indicating the location of the monitored object within a far-field region, thereby indicating the location of the monitored object in the overlap region formed via the overlapping portions of the far-field regions of the signpost units identified via the received signpost codes.

34. The apparatus of claim 33 wherein each signpost unit is defined further to include:
  a signpost encoder encoded with a time division binary signpost code, having an "on" condition and an "off" condition, the signpost encoder receiving a signal and being conditioned in the "on" condition in response thereto, the signpost encoder providing the signpost code via an output signal in the "on" condition of the signpost encoder;

means, having an "on" condition, an "off" condition and providing an output signal in the "on" condition, said means being conditioned in the "on" condition for a predetermined "on" period of time and being conditioned in the "off" condition for a predetermined "off" period of time, the output signal of said means being connected to the signpost encoder for conditioning the signpost encoder in the "on" condition, the ratio of the "on" period of time to the sum of the "on" and the "off" periods of time (the cycle period of time) defining the duty cycle and the "off" period of time being greater than the "on" period of time of said means for lowering the duty cycle;

means receiving the signpost encoder output signal for transmitting a signpost unit output signal encoded with the signpost code.

35. The apparatus of claim 34 wherein the means for conditioning the signpost encoder in the "on" condition of some of the signpost units is defined further as conditioning the signpost encoders in the "on" condition for a first period of time sufficient to provide the signpost code a predetermined number of times via the signpost encoder output signal in the "on" condition of the signpost encoder for operating some of the signpost units at a first pulse repetition frequency; and wherein the means for conditioning the signpost encoder in the "on" condition of the remaining signpost units is defined further as conditioning the signpost encoders in the "on" condition for a second period of time sufficient to provide the signpost code a predetermined number of times via the signpost encoder output signal in the "on" condition of the signpost encoder for operating the remaining signpost units at a second pulse repetition frequency, the second pulse repetition frequency being different than the first pulse repetition frequency.

36. The apparatus of claim 34 wherein the means for conditioning the signpost encoder in the "on" condition of some of the signpost units is defined further as conditioning the signpost units in the "on" condition and the "off" condition for a predetermined first cycle period of time; and wherein the means for conditioning the signpost encoder in the "on" condition of the remaining signpost units is defined further as conditioning the signpost units in the "on" condition and "off" condition for a predetermined second cycle period of time, the second cycle period of time being greater than the first cycle period of time.

37. The apparatus of claim 36 wherein the means for conditioning the signpost encoder in the "on" condition of some of the signpost units is defined further as conditioning the signpost units in the "on" condition for a predetermined period of time for providing a first duty cycle; and wherein the means for conditioning the signpost encoder in the "on" condition of the remaining signpost units is defined further as conditioning the signpost units in the "on" condition for a predetermined period of time for providing a second duty cycle, the second duty cycle being approximately equal to the first duty cycle.

38. The apparatus of claim 37 wherein the means for conditioning the signpost encoder in the "on" condition of some of the signpost units and the means for conditioning the signpost encoder in the "on" condition of the remaining signpost units are each defined further as conditioning the signpost encoders in the "on" and the "off" conditions to provide a ratio of the first cycle period of time to the second cycle period of time at least equal to the period of time required to provide the signpost code stored in any of the signpost units via the signpost encoder output signal.

39. The apparatus of claim 38 wherein the period of time required to transmit the signpost code one time via the signpost units having the first cycle period of time is approximately equal to the period of time required to transmit the signpost code one time via the signpost units having the second cycle period of time.

40. The apparatus of claim 34 wherein the means for transmitting the signpost codes is defined further to include:

a transmitter for transmitting the signpost codes provided via the signpost encoder output signal in the relatively high frequency range to produce a radiation pattern establishing a relatively steep radiation field gradient thereby establishing a near-field region extending a predetermined distance from the signpost unit and a far-field region extending a predeterming distance from the near-field region, the strength of the transmitted signal within the near-field region being greater than the strength of the transmitted signal within the far-field region.

41. The apparatus of claim 34 wherein the means for transmitting the signpost codes is defined further to include:

an FSK generator, having an "on" condition and an "off" condition, receiving the signpost encoder output signal and receiving the output signal provided via the means for conditioning the signpost encoder in the "on" condition, the FSK generator being conditioned in the "on" condition in response to receiving the output signal provided via the means for conditioning the signpost encoder in the "on" condition and the FKS generator providing an output signal having one frequency ($f_s$) in response to receiving a signpost code bit representing a logical "zero" and another frequency ($f_m$) in response to receiving a signpost code bit representing a logial "one" in the "on" condition of the FSK generator;

a transmitter modulator, having an "on" condition and an "off" condition, receiving the output signal provided via the means for conditioning the signpost encoder in the "on" condition and the transmitter modulator being conditioned in the "on" condition in response thereto providing a transmitter modulator output signal; and a transmitter receiving the output signal provided via the means for conditioning the signpost encoder in the "on" condition and receiving the transmitter modulator output signal, the transmitter providing an output signal having a predetermined frequency and the transmitter output signal being modulated via the transmitter modulator output signal.

42. The apparatus of claim 6 wherein the signpost units are each defined further as having an "on" and an "off" condition and wherein each signpost unit provides the output signal encoded with the signpost code in the "on" condition, some of the signpost units being conditioned in the "on" condition and the "off" condition for a predetermined first cycle period of time and as being conditioned in the "on" condition for a predetermined first period of time sufficient to provide the signpost code a predetermined number of times via the signpost unit output signal thereby operating the signpost units at a first pulse repetition frequency; and wherein at least some of the remaining signpost units are each defined further as being conditioned in the "on" condition and the "off" condition for a predetermined second cycle period of time and as being conditioned in the "on" condition for a predetermined second period of time sufficient to provide the signpost code a predetermined number of times via the signpost unit output signal thereby operating the signpost units at a second pulse repetition frequency, the second pulse repetition frequency being greater than the first pulse repetition frequency and at least one more signpost code being provided during the first period of time as compared to the number of times the signpost code is provided during the second period of time.

43. The apparatus of claim 42 wherein each signpost unit is defined further to include:
 a signpost encoder encoded with a time division binary signpost code, having an "on" condition and an "off" condition, the signpost encoder receiving a signal and being conditioned in the "on" condition in response thereto, the signpost encoder providing the signpost code via an output signal in the "on" condition of the signpost encoder;
 means, having an "on" condition, an "off" condition and providing an output signal in the "on" condition, said means being conditioned in the "on" condition for a predetermined "on" period of time and being conditioned in the "off" condition for a predetermined "off" period of time, the output signal of said means being connected to the signpost encoder for conditioning the signpost encoder in the "on" condition, the ratio of the "on" period of time to the sum of the "on" and the "off" periods of time (the cycle period of time) defining the duty cycle and the "off" period of time being greater than the "on" period of time of said means for lowering the duty cycle;
 a battery type electrical operating power supply connected to the means for conditioning the signpost encoder in the "on" condition, the operating life of the battery type electrical operating power supply being increased via the lowering of the duty cycle; and
 means receiving the signpost encoder output signal for transmitting a signpost unit output signal encoded with the signpost code.

44. A method for monitoring objects within a predetermined monitored area utilizing signpost units wherein each signpost unit transmits an output signal having a signpost code encoded therein uniquely identifying the signpost unit and establishing a far-field region extending a distance generally from the signpost unit and wherein each monitored object is capable of receiving the signpost unit output signals, the method comprising:
 positioning the signpost units in the monitored area;
 positioning at least one of the signpost units with respect to at least one of the other signpost units so a portion of the far-field region of at least one signpost units overlaps a portion of the far-field region of at least one of the other signpost units for forming an overlap region encompassing a predetermined coverage region within the monitored area receiving the signpost unit output signals at the monitored objects;
 detecting the signpost code encoded in the signpost unit output signals received at the monitored objects;
 providing an output signal in response to the signpost unit output signal received at the monitored object for indicating the location of the monitored object as being within the far-field region of the signpost unit identified via the signpost code corresponding to the signpost code encoded in the signpost unit output signal received at the monitored object; and
 determining and indicating at the monitored object the location of the monitored object as being within one of the overlap regions.

45. The method of claim 44 wherein the step of determining and indicating the location of the monitored object within one of the overlap regions is defined further to include the step of:
 comparing ech received signpost code with the previously received signpost code for determining the reception of at least two different signpost codes and for indicating the location of the monitored object within the overlap region formed via the overlapping portions of the far-field regions of the two signpost units identified via the two different signpost codes received at the monitored object.

46. The method of claim 45 defined further to include the steps of:
 providing the output signal of one of the signpost units forming an overlap region at a first pulse repetition frequency; and
 providing the output signal of the other signpost unit forming an overlap region at a second pulse repetition frequency, the first pulse rate frequency being different than the second pulse rate frequency for providing the output signal of one of the signpost units in an alternating manner with respect to the output signal of the other signpost unit forming an overlap region.

47. The method of claim 46 wherein the step of comparing each received signpost code with the previously received signpost code is defined further as determining the reception of at least two different signpost codes in an alternating manner for indicating the location of the monitored object within the overlap region formed via the overlapping portions of the far-field regions of the two signpost units identified via the two different signpost codes received in an alternating manner at the monitored object.

48. The method of claim 47 wherein each of the signpost units repeatably provides a time division binary signpost code uniquely identifying the signpost unit encoded in the signpost unit output signal, and wherein the method is defined further to include the steps of:
 determining the reception of a signpost code at the monitored object repeatable a predetermined number of times before comparing the received signpost code with the previously received signpost code.

49. The method of claim 45 defined further to include the steps of:
 transmitting the signpost code provided via one of the signpost units forming an overlap region for a predetermined period of time during a first cycle period of time; and
 transmitting the support code provided via the other signpost unit forming an overlap region for a predetermined period of time during a second cycle period of time, the second cycle period of time being greater than the first cycle period of time.

50. The method of claim 49 wherein the step of transmitting the signpost codes during the first cycle period of time is defined further as transmitting the signpost code repetitively a predetermined number of times during each first cycle period of time; and wherein the step of transmitting the signpost codes during the second cycle period of time is defined further as transmitting the signpost code repetitively a predetermined number of times during each second cycle period of time, the number of times the signpost code is repetitively transmitted during the second cycle period of time being different than the number of times the signpost code is repetitively transmitted during the first cycle period of time, the ratio of the first cycle period of time to the second cycle period of time being at least equal to the time required to transmit the signpost code one time during the first cycle period of time and at least equal to the time required to transmit the signpost code one time during the second cycle period of time, and the time required to transmit the signpost code one time during the first cycle period of time being approximately equal to the time required to transmit the signpost code one time during the second cycle period of time.

51. The method of claim 49 wherein the step of transmitting the signpost codes during the first cycle period of time is defined further as transmitting the signpost codes for a first period of time during the first cycle period of time; and wherein the step of transmitting the signpost codes during the second cycle period of time is defined further as transmitting the signpost codes for a second period of time different from the first period of time.

52. The method of claim 51 wherein the step of transmitting the signpost codes during the first cycle period of time is defined further as transmitting the signpost code a predetermined number of times during each first cycle period of time; and wherein the step of transmitting the signpost codes during the second cycle period of time is defined further as transmitting the signpost code a predetermined number of times during each second cycle period of time different than the number of times the signpost code is transmitted during the first cycle period of time.

53. The method of claim 52 wherein the step of transmitting the signpost codes during the second cycle period of time is defined further as transmitting the signpost codes for the second period of time during the second cycle period of time, the ratio of the second period of time to the second cycle period defining the duty cycle and the duty cycle being approximately equal to the ratio of the first period of time to the first cycle period of time.

* * * * *

UNITED STATES PATENT OFFICE
CERTIFICATE OF CORRECTION

Patent No. 4,112,421　　　　　　　　Dated September 5, 1978

Inventor(s) Jiri J. Hovorka

It is certified that error appears in the above-identified patent and that said Letters Patent are hereby corrected as shown below:

In Column 8, Line 28, "is" should be --as--.
In Column 8, Line 44, "hardward" should be --hardware--.
In Column 42, Line 34, "ratio" should be --radio--.
In Column 42, Line 45, "ratio" should be --radio--.
In Column 42, Lines 61 and 62, delete the words "After the binary coded data via the vehicle antenna 18."
In Column 44, Line 26, after the word "signal" and before the word "path", add the words --on the signal--.
In Column 44, Line 38, "ratio" should be --radio--.
In Column 44, Line 47, "ratio" should be --radio--.
In Column 47, Line 56, before the word "and" add the word --state--.
In Column 49, Line 36, "post" should be --path--.
In Column 55, Line 7, "20" should be --290--.
In Column 56, Line 58, "528" should be --538--.
In Column 60, Line 44, after the numeral "688", delete the words "register 688".
In Column 68, Line 20, "729" should be --720--.
In Column 68, Line 38, "but" should be --bit--.
In Column 90, Line 19, "ech" should be --each--.

Signed and Sealed this

First Day of May 1979

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,112,421                    Dated September 5, 1978

Inventor(s) Charles C. Freeny, Jr.

It is certified that error appears in the above-identified patent and that said Letters Patent are hereby corrected as shown below:

In Column 8, Line 28, "is" should be --as--.
In Column 8, Line 44, "hardward" should be --hardware--.
In Column 42, Line 34, "ratio" should be --radio--.
In Column 42, Line 45, "ratio" should be --radio--.
In Column 42, Lines 61 and 62, delete the words "After the binary coded data via the vehicle antenna 18."
In Column 44, Line 26, after the word "signal" and before the word "path", add the words --on the signal--.
In Column 44, Line 38, "ratio" should be --radio--.
In Column 44, Line 47, "ratio" should be --radio--.
In Column 47, Line 56, before the word "and" add the word --state--.
In Column 49, Line 36, "post" should be --path--.
In Column 55, Line 7, "20" should be --290--.
In Column 56, Line 58, "528" should be --538--.
In Column 60, Line 44, after the numeral "688", delete the words "register 688".
In Column 68, Line 20, "729" should be --720--.
In Column 68, Line 38, "but" should be --bit--.
In Column 90, Line 19, "ech" should be --each--.

This certificate supersedes Certificate of Correction issued May 1, 1979.

Signed and Sealed this

Fourteenth Day of August 1979

[SEAL]

Attest:

LUTRELLE F. PARKER
Attesting Officer    Acting Commissioner of Patents and Trademarks